United States Patent
Uenaka et al.

(10) Patent No.: US 12,444,448 B2
(45) Date of Patent: Oct. 14, 2025

(54) MEMORY DEVICE WITH MEMORY ARRAY CONNECTED TO CIRCUITS IN DIFFERENT STACKED SUBSTRATES

(71) Applicant: Kioxia Corporation, Tokyo (JP)

(72) Inventors: Tsuneo Uenaka, Yokkaichi Mie (JP); Tomoya Inden, Yokkaichi Mie (JP); Shigehiro Yamakita, Yokkaichi Mie (JP)

(73) Assignee: Kioxia Corporation, Tokyo (JP)

( * ) Notice: Subject to any disclaimer, the term of this patent is extended or adjusted under 35 U.S.C. 154(b) by 92 days.

(21) Appl. No.: 18/179,265

(22) Filed: Mar. 6, 2023

(65) Prior Publication Data
US 2023/0420007 A1  Dec. 28, 2023

(30) Foreign Application Priority Data

Jun. 23, 2022 (JP) ................................. 2022-100918
Dec. 12, 2022 (JP) ................................. 2022-198049

(51) Int. Cl.
*G11C 7/10* (2006.01)
*G11C 7/06* (2006.01)
*G11C 7/18* (2006.01)

(52) U.S. Cl.
CPC .............. *G11C 7/1039* (2013.01); *G11C 7/06* (2013.01); *G11C 7/18* (2013.01)

(58) Field of Classification Search
CPC ........... G11C 7/1039; G11C 7/06; G11C 7/18; G11C 16/0483; G11C 5/025; G11C 8/12
See application file for complete search history.

(56) References Cited

U.S. PATENT DOCUMENTS

| 11,908,520 | B2* | 2/2024 | Takekida ............... H10B 43/20 |
| 2005/0226068 | A1 | 10/2005 | Brandon |
| 2014/0267756 | A1* | 9/2014 | Gousev ................ H10F 39/804 |
| | | | 438/54 |
| 2018/0261623 | A1 | 9/2018 | Higashi |
| 2019/0363129 | A1 | 11/2019 | Yokoyama |

(Continued)

FOREIGN PATENT DOCUMENTS

| CN | 220041401 U | 11/2023 |
| JP | 2018152419 A | 9/2018 |

(Continued)

OTHER PUBLICATIONS

Semiconductor Device (Year: 2021).*

(Continued)

*Primary Examiner* — Sultana Begum
(74) *Attorney, Agent, or Firm* — Kim & Stewart LLP

(57) ABSTRACT

According to one embodiment, a memory device includes a first silicon substrate, a second silicon substrate, and a memory cell array. A first CMOS circuit is formed on the first silicon substrate. The second silicon substrate is provided above the first silicon substrate in a stacking direction. A second CMOS circuit is formed on the second silicon substrate. The memory cell array is provided above the second silicon substrate in the stacking direction. The memory cell array is connected to the first CMOS circuit and the second CMOS circuit and includes a plurality of memory cells arranged in the stacking direction of the first silicon substrate and the second silicon substrate.

20 Claims, 42 Drawing Sheets

(56) References Cited

U.S. PATENT DOCUMENTS

| | | |
|---|---|---|
| 2020/0098776 A1 | 3/2020 | Sugisaki |
| 2020/0328186 A1 | 10/2020 | Liu |
| 2021/0074362 A1 | 3/2021 | Itano |
| 2021/0375901 A1 | 12/2021 | Oh |
| 2022/0139855 A1* | 5/2022 | Hwang .................. H01L 25/18 |
| | | 257/314 |
| 2023/0014841 A1 | 1/2023 | Kobayashi |

FOREIGN PATENT DOCUMENTS

| | | | |
|---|---|---|---|
| JP | 2023045099 A | * | 4/2023 |
| TW | 202013684 A | | 4/2020 |
| TW | 202119601 A | | 5/2021 |
| TW | 202141762 A | | 11/2021 |

OTHER PUBLICATIONS

Park Sang-Soo, "Sony's back-illuminated CMOS sensor is 'three-story', DR expansion with twice the saturation signal amount", IT Media, Dec. 17, 2021, 4 pages (with translation), https://monoist.itmedia.co.jp/mn/articles/2112/17/news062.html.
Chinese Office Action dated Jul. 9, 2025, mailed in counterpart Chinese Application No. 202310166883.2, 13 pages.

* cited by examiner

MEMORY DEVICE WITH MEMORY ARRAY CONNECTED TO CIRCUITS IN DIFFERENT STACKED SUBSTRATES

CROSS-REFERENCE TO RELATED APPLICATION(S)

This application is based upon and claims the benefit of priority from Japanese Patent Application No. 2022-100918, filed Jun. 23, 2022, and Japanese Patent Application No. 2022-198049, filed Dec. 12, 2022, the entire contents of which are incorporated herein by reference.

FIELD

Embodiments described herein relate generally to a memory device.

BACKGROUND

A NAND flash memory capable of storing data in a non-volatile manner is known.

DETAILED DESCRIPTION

Figure 1:
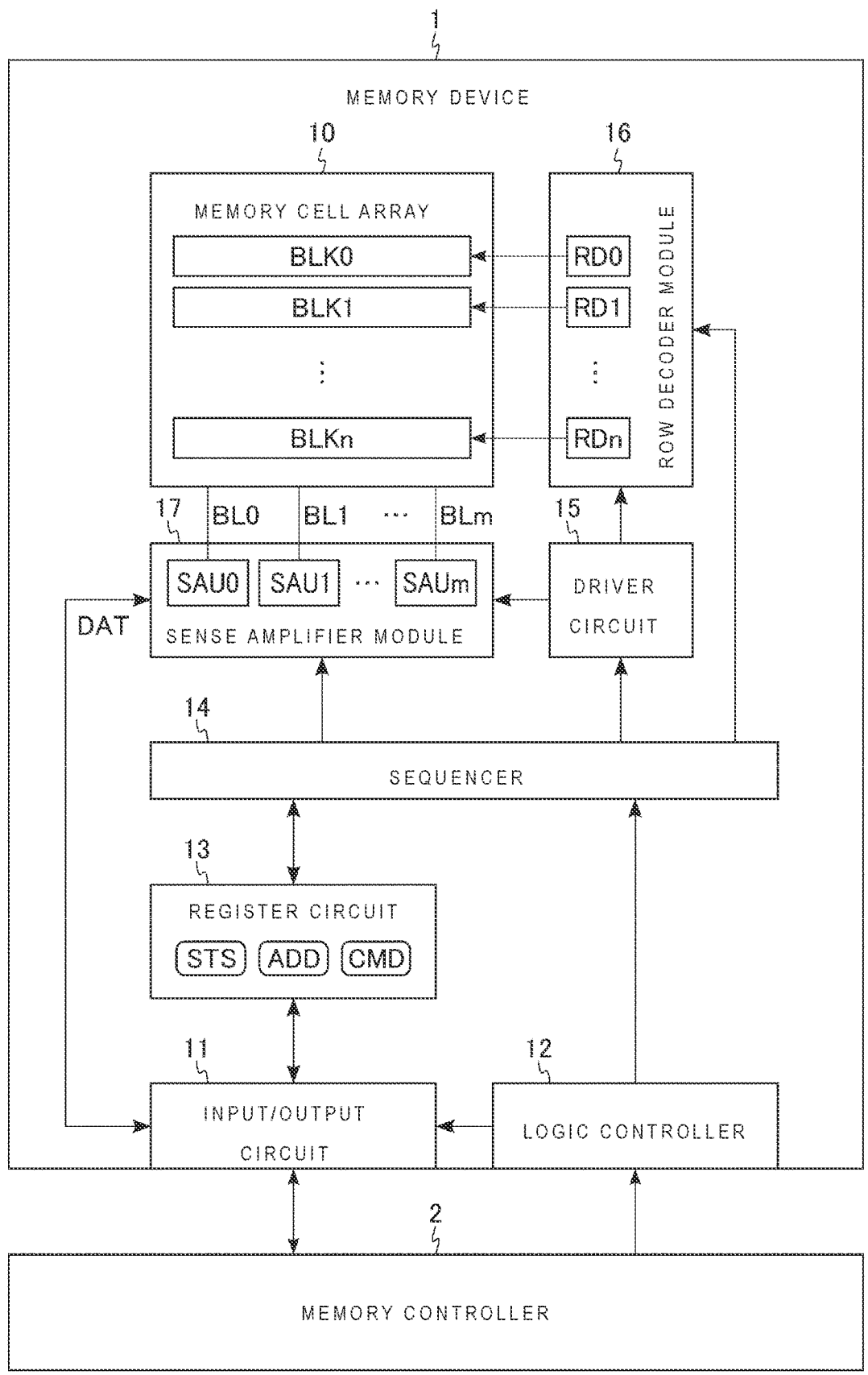
FIG. 1 is a block diagram of a memory system including a memory device according to a first embodiment.

Embodiments relate to memory devices having a reduced production cost.

In general, according to one embodiment, a memory device includes a first silicon substrate, a second silicon substrate, and a memory cell array. A first CMOS circuit is formed on the first silicon substrate. The second silicon substrate is provided above the first silicon substrate in a stacking direction. A second CMOS circuit is formed on the second silicon substrate. The memory cell array is provided above the second silicon substrate in the stacking direction. The memory cell array is connected to the first CMOS circuit and the second CMOS circuit and includes a plurality of memory cells arranged in the stacking direction of the first silicon substrate and the second silicon substrate.

Hereinafter, certain example embodiments will be described with reference to the drawings. Each embodiment exemplifies a device and a method for embodying the technical idea of this disclosure. The drawings however are schematic or conceptual. As such, depicted dimensions, proportions, and the like of components, elements, or aspects in the drawings are not necessarily the same as those in an actual implementation. The illustration of certain configurational aspects is omitted as appropriate for clarity. The hatching added to certain plan views is not necessarily related to any differences in a material or characteristics of an element, but may be added to clearly delineate aspects. In the following description, elements having substantially the same function and configuration are denoted by the same reference symbols. Numbers, characters, and the like may be added as suffixes to the base reference symbols to distinguish otherwise substantially similar elements in description which might otherwise be referred to by the same reference numeral.

[1] First Embodiment

A memory device 1 according to a first embodiment includes a memory cell and a CMOS circuit for accessing to the memory cell. The memory device 1 has a structure in which CMOS circuits are disposed on a plurality of stacked substrates. Details of the first embodiment will be described below.

[1-1] Overall Configuration of Memory Device 1

FIG. 1 is a block diagram showing an example of an overall configuration of the memory device 1 according to the first embodiment. As shown in FIG. 1, the memory device 1 is controlled by an external memory controller 2. The memory device 1 is, for example, a NAND flash memory capable of storing data in a non-volatile manner. The memory device 1 includes a memory cell array 10, an input/output circuit 11, a logic controller 12, a register circuit 13, a sequencer 14, a driver circuit 15, a row decoder module 16, and a sense amplifier module 17.

The memory cell array 10 is a storage circuit including a plurality of blocks BLK0 to BLKn ("n" is an integer of 1 or more). Each block BLK is a set including a plurality of memory cells. The block BLK corresponds to a unit (minimum unit size) for data erases. The block BLK includes a plurality of pages. Each page corresponds to a unit (minimum unit for data reads and data read writes. The memory cell array 10 is provided with a plurality of bit lines BL0 to BLm ("m" is an integer of 1 or more) and a plurality of word lines WL. Each memory cell is associated with one bit line BL and one word line WL. A block address is assigned to each block BLK. A column address is assigned to each bit line BL. A page address is assigned to each word line WL.

The input/output circuit 11 is an interface circuit that controls transmission and reception of an input/output signal to and from the memory controller 2. The input/output signal includes, in this example, data DAT, status information STS, address information ADD, and a command CMD. The input/output circuit 11 can input/output the data DAT between the sense amplifier module 17 and the memory controller 2. The input/output circuit 11 can output, to the memory controller 2, the status information STS transferred from the register circuit 13. The input/output circuit 11 can output, to the register circuit 13, the address information ADD and the command CMD which are transferred from the memory controller 2.

The logic controller 12 is a circuit that controls the input/output circuit 11 and the sequencer 14 based on a control signal input from the memory controller 2. For example, the logic controller 12 controls the sequencer 14 to enable the memory device 1. The logic controller 12 notifies the input/output circuit 11 that the input/output signal received by the input/output circuit 11 is the command CMD, the address information ADD, or the like. The logic controller 12 instructs the input/output circuit 11 to input or output the input/output signal.

The register circuit 13 is a circuit that temporarily stores the status information STS, the address information ADD, and the command CMD. The status information STS is updated under the control of the sequencer 14 and is transferred to the input/output circuit 11. The address information ADD includes a block address, a page address, a column address, and the like. The command CMD includes instructions regarding various operations of the memory device 1.

The sequencer 14 is a controller that controls an operation of the entire memory device 1. The sequencer 14 executes a read operation, a write operation, an erase operation, and the like based on the command CMD and the address information ADD which are stored in the register circuit 13.

The driver circuit 15 is a circuit that generates a voltage to be used in the read operation, the write operation, the erase operation, and the like. The driver circuit 15 supplies the generated voltage to the row decoder module 16, the sense amplifier module 17, and the like.

The row decoder module 16 is a circuit used for selecting the block BLK to be operated and transferring a voltage to a wiring such as the word line WL. The row decoder module 16 includes a plurality of row decoders RD0 to RDn. The row decoders RD0 to RDn are associated with the blocks BLK0 to BLKn, respectively.

The sense amplifier module 17 is a circuit used for transferring a voltage to each bit line BL and reading data. The sense amplifier module 17 includes a plurality of sense amplifier units SAU0 to SAUm. The sense amplifier units SAU0 to SAUm are associated with the plurality of bit lines BL0 to BLm, respectively.

A combination of the memory device 1 and the memory controller 2 may constitute one semiconductor device. Examples of such a semiconductor device include a memory card such as an SD™ card and a solid-state drive (SSD). A set (unit or group) including the memory cell array 10, the row decoder module 16, and the sense amplifier module 17 can be called a "plane PL". The memory device 1 may include a plurality of planes PL.

[1-2] Circuit Configuration of Memory Device 1

Next, a circuit configuration of the memory device 1 according to the first embodiment will be described.

[1-2-1] Circuit Configuration of Memory Cell Array 10

Figure 2:
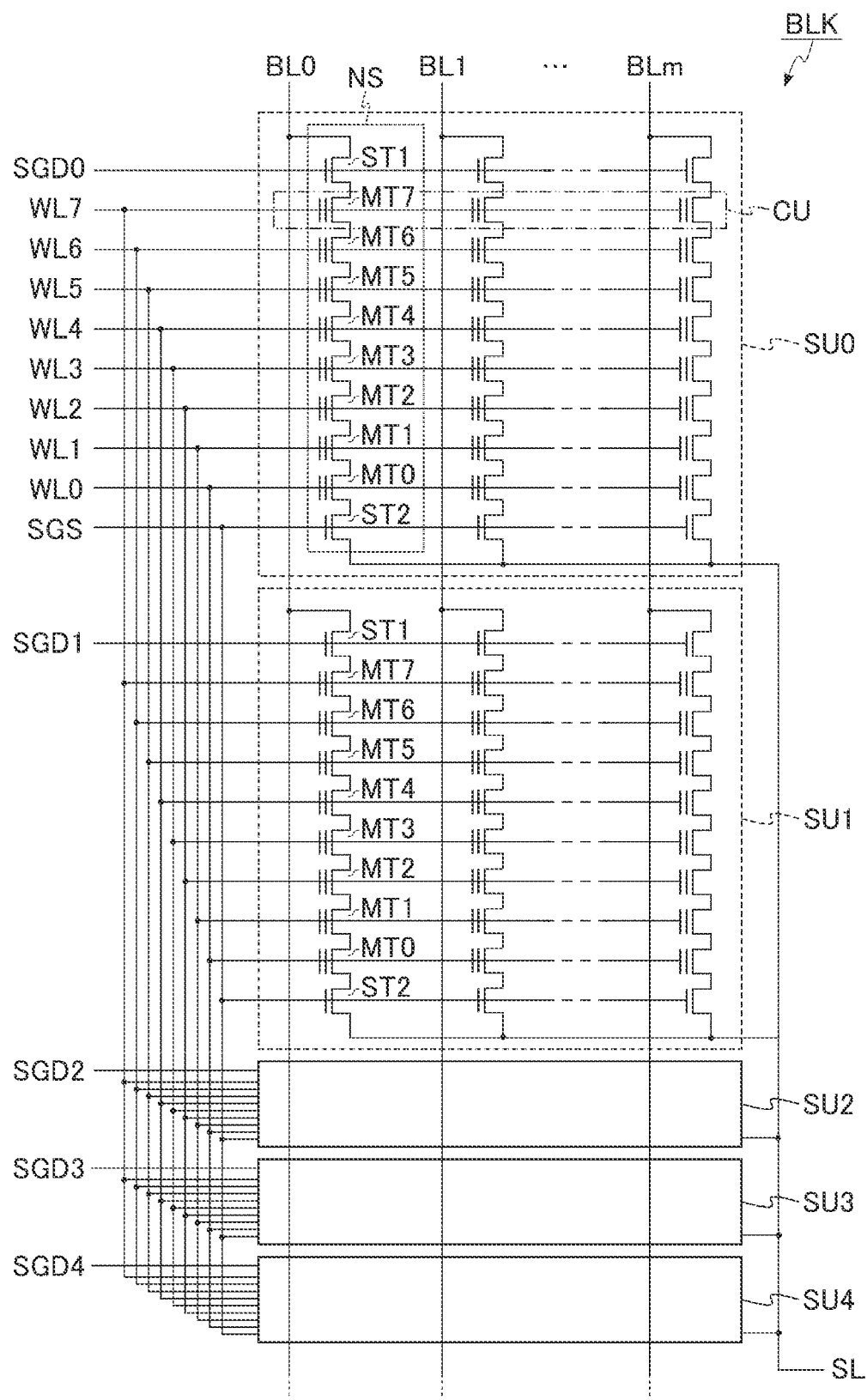
FIG. 2 is a circuit diagram showing an example of a circuit configuration of a memory cell array in a memory device according to a first embodiment.

FIG. 2 is a circuit diagram showing an example of a circuit configuration of the memory cell array 10 in the memory device 1 according to the first embodiment. FIG. 2 shows one block BLK among the plurality of blocks BLK in the memory cell array 10. A shown in FIG. 2, the block BLK includes five string units SU0 to SU4. Select gate lines SGD0 to SGD4 and SGS and word lines WL0 to WL7 are provided for each block BLK. The bit lines BL0 to BLm and a source line SL are shared by the plurality of blocks BLK.

Each string unit SU includes a plurality of NAND strings NS. The plurality of NAND strings NS are associated with the bit lines BL0 to BLm, respectively. That is, each bit line BL is shared by the NAND strings NS to which the same column address is assigned between the plurality of blocks BLK. Each NAND string NS is connected between the bit line BL and the source line SL which are associated with each other. Each NAND string NS includes memory cell transistors MT0 to MT7 and select transistors ST1 and ST2. Each memory cell transistor MT is a memory cell having a control gate and a charge storage layer, and latches (stores) data in a non-volatile manner. Each of the select transistors ST1 and ST2 is used for selecting the string unit SU.

In each NAND string NS, the select transistor ST1, the memory cell transistors MT7 to MT0, and the select transistor ST2 are connected in series in this order. Specifically, a drain and a source of the select transistor ST1 are connected to the associated bit line BL and a drain of the memory cell transistor MT7, respectively. A drain and a source of the select transistor ST2 are connected to a source of the memory cell transistor MT0 and the source line SL, respectively. The memory cell transistors MT0 to MT7 are connected in series between the select transistors ST1 and ST2.

The select gate lines SGD0 to SGD4 are associated with the string units SU0 to SU4, respectively. The select gate lines SGD are connected to respective gates of the plurality of select transistors ST1 in the associated string unit SU. The select gate line SGS is connected to each gate of the plurality of select transistors ST2 in the associated block BLK. The word lines WL0 to WL7 are connected to control gates of the memory cell transistors MT0 to MT7, respectively.

A set (group or unit) including a plurality of memory cell transistors MT connected to the same word line WL in the same string unit SU is called a "cell unit CU". For example, a storage capacity of the cell unit CU when each memory cell transistor MT stores 1-bit data is defined as "one-page data". The cell unit CU may have a storage capacity equal to or greater than two-page data according to the number of bits of data that can be stored in each memory cell transistor MT.

The circuit configuration of the memory cell array 10 in the memory device 1 according to the first embodiment may be another configuration. For example, the number of string units SU in each block BLK, the number of memory cell transistors MT in each NAND string NS, and the number of select transistors ST1 and ST2 may be any number.

[1-2-2] Circuit Configuration of Row Decoder Module 16

Figure 3:
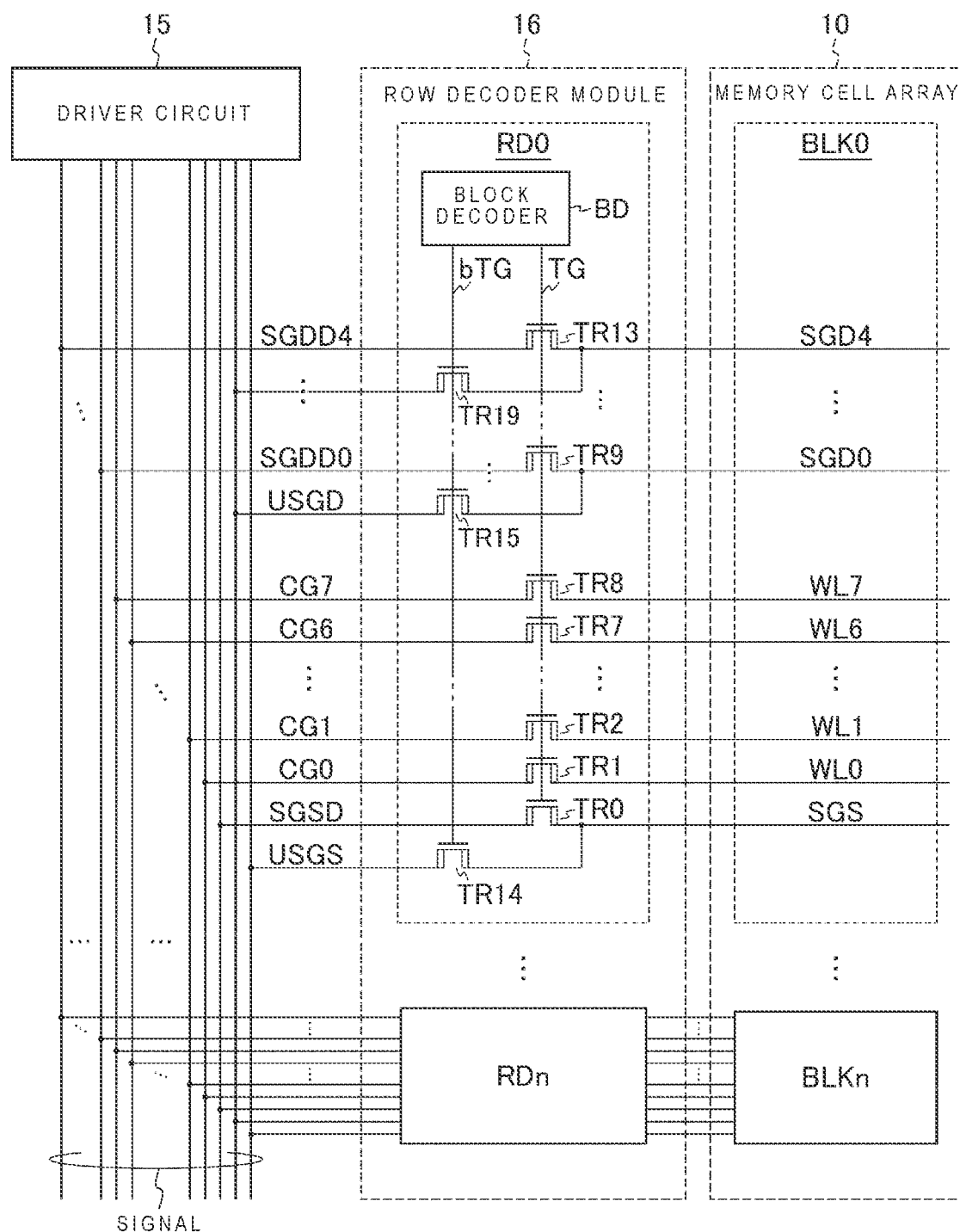
FIG. 3 is a circuit diagram showing an example of a circuit configuration of a row decoder module in a memory device according to a first embodiment.

FIG. 3 is a circuit diagram showing an example of a circuit configuration of the row decoder module 16 in the memory device 1 according to the first embodiment. FIG. 3 shows a connection relation between the row decoder module 16 and the driver circuit 15, a connection relation between the row decoder module 16 and the memory cell array 10, and a detailed circuit configuration of the row decoder RD0. As shown in FIG. 3, the row decoders RD are connected to the driver circuit 15 via signal lines CG0 to CG7, SGDD0 to SGDD4, SGSD, USGD, and USGS. The row decoder RD is connected to the associated block BLK via the word lines WL0 to WL7 and the select gate lines SGS and SGD0 to SGD4.

Hereinafter, a connection relation between elements of the row decoder RD and the driver circuit 15 and a connection relation between elements of the row decoder RD and the block BLK will be described by directing attention to the row decoder RD0. Configurations of other row decoders RD are the same as that of the row decoder RD0 except that the associated blocks BLK are different. The row decoder RD0 includes, for example, transistors TR0 to TR19, transfer gate lines TG and bTG, and a block decoder BD.

Each of the transistors TR0 to TR19 is a high breakdown voltage N-type MOS transistor (hereinafter, also referred to as a "high-voltage (HV) transistor"). A drain and a source of the transistor TR0 are connected to the signal line SGSD and the select gate line SGS, respectively. Drains of the transistors TR1 to TR8 are connected to the signal lines CG0 to CG7, respectively. Sources of the transistors TR1 to TR8 are connected to the word lines WL0 to WL7, respectively. Drains of the transistors TR9 to TR13 are connected to the signal lines SGDD0 to SGDD4, respectively. Sources of the transistors TR9 to TR13 are connected to the select gate lines SGD0 to SGD4, respectively. A drain and a source of the transistor TR14 are connected to the signal line USGS and the select gate line SGS, respectively. Drains of the transistors TR15 to TR19 are connected to the signal line USGD. Sources of the transistors TR15 to TR19 are connected to the select gate lines SGD0 to SGD4, respectively. Gates of the transistors TR0 to TR13 are connected to the transfer gate line TG. Gates of the transistors TR14 to TR19 are connected to the transfer gate line bTG.

The block decoder BD is a circuit having a function of decoding a block address. The block decoder BD applies a predetermined voltage to each of the transfer gate lines TG and bTG based on a decoding result for the block address. Specifically, the block decoder BD corresponding to the selected block BLK applies a voltage having an "L" level and a voltage having an "H" level to the transfer gate lines TG and bTG, respectively. The block decoder BD corresponding to the unselected block BLK applies a voltage having an "L" level and the voltage having an "H" level to the transfer gate lines TG and bTG, respectively. Accordingly, voltages at the signal lines CG0 to CG7 are transferred to the word lines WL0 to WL7 of the selected block BLK, respectively, voltages at the signal lines SGDD0 to SGDD4 and SGSD are transferred to the select gate lines SGD0 to SGD4 and SGS of the selected block BLK, respectively, and voltages at the signal lines USGD and USGS are transferred to the select gate lines SGD and SGS of the unselected block BLK, respectively.

The row decoder module 16 may have other circuit configurations. For example, the number of transistors TR in the row decoder module 16 may be changed according to the number of wirings provided in each block BLK. Each signal line CG may be called a "global word line" because the signal line CG is shared by the plurality of blocks BLK. Each word line WL may be called a "local word line" because the word line WL is provided for each block. The signal lines SGDD and SGSD may be called "global transfer gate lines" because the signal lines SGDD and SGSD are shared by the plurality of blocks BLK. The select gate lines SGD and SGS may be called "local transfer gate lines" because the select gate lines SGD and SGS are provided for each block.

[1-2-3] Circuit Configuration of Sense Amplifier Module 17

Figure 4:
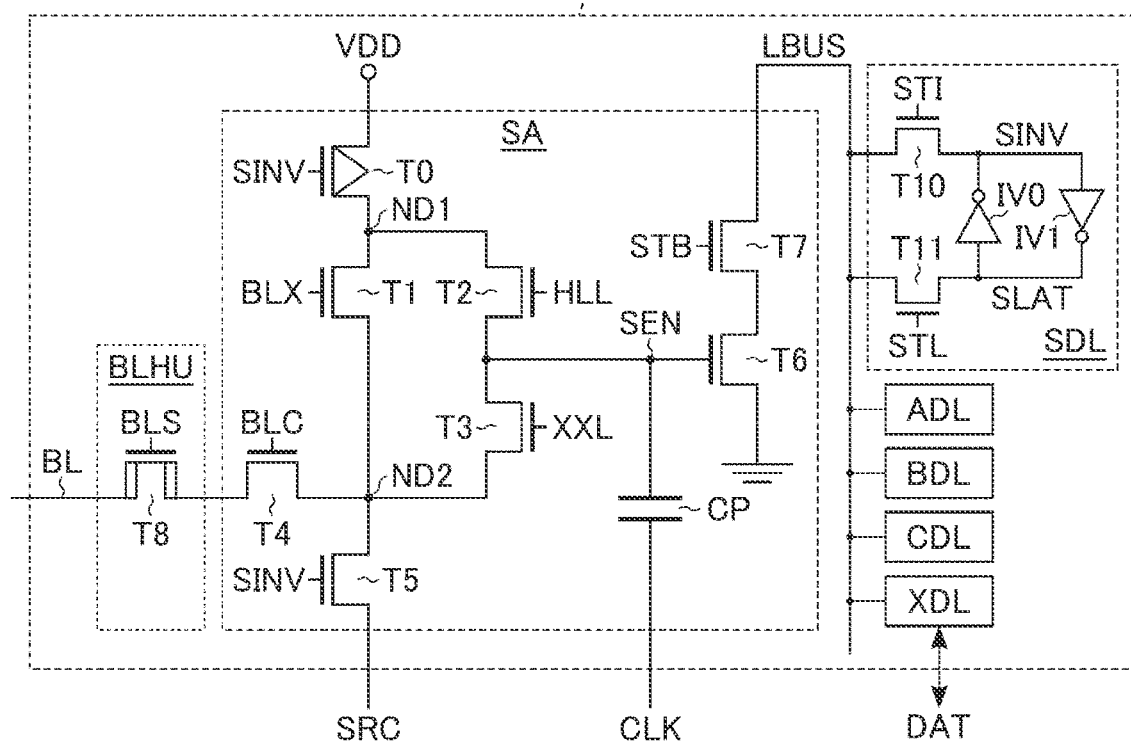
FIG. 4 is a circuit diagram showing an example of a circuit configuration of a sense amplifier module in a memory device according to a first embodiment.

FIG. 4 is a circuit diagram showing an example of a circuit configuration of the sense amplifier module 17 in the memory device 1 according to the first embodiment. FIG. 4 shows an extracted circuit configuration of one sense amplifier unit SAU. As shown in FIG. 4, the sense amplifier unit SAU includes a sense amplifier SA, a bit line connector BLHU, latch circuits SDL, ADL, BDL, CDL, and XDL, and a bus LBUS. The sense amplifier SA and the latch circuits SDL, ADL, BDL, CDL, and XDL are configured to transmit and receive data via, for example, the bus LBUS. Hereinafter, a set (group or unit) including the sense amplifier SA and a plurality of latch circuits is also referred to as a "sense data latch SADL".

The sense amplifier SA is a circuit used for determining data based on a voltage at the bit line BL and applying a voltage to the bit line BL. When a control signal STB is asserted during the read operation, the sense amplifier SA determines whether data read from the selected memory cell transistor MT is "0" or "1" based on the voltage at the associated bit line BL. Each of the latch circuits SDL, ADL, BDL, CDL, and XDL is a circuit capable of temporarily latching data. The latch circuit XDL is used to input/output the data DAT between the sense amplifier unit SAU and the input/output circuit 11. The latch circuit XDL may also be used as a cache.

The sense amplifier SA includes transistors T0 to T7, a capacitor CP, and nodes ND1, ND2, SEN, and SRC. The bit line connector BLHU is a switch circuit for preventing a high voltage applied to a channel of the NAND string NS in the erase operation from being applied to a circuit in the sense amplifier SA. The bit line connector BLHU includes a transistor T8. The latch circuit SDL includes inverters IV0 and IV1, transistors T10 and T11, and nodes SINV and SLAT. The transistor T0 is a P-type MOS transistor. Each of the transistors T1 to T8, T10, and T11 is an N-type MOS transistor. The transistor T8 is an N-type MOS transistor (HV transistor) having a breakdown voltage higher than that of an N-type transistor in the sense amplifier SA. Hereinafter, a transistor having a breakdown voltage lower than that of the HV transistor is also referred to as a "low-voltage (LV) transistor". The LV transistor operates at a speed higher than that of the HV transistor.

A gate of the transistor T0 is connected to the node SINV. A source of the transistor T0 is connected to a power supply line. A drain of the transistor T0 is connected to the node ND1. The node ND1 is connected to drains of the transistors T1 and T2. Sources of the transistors T1 and T2 are connected to the nodes ND2 and SEN, respectively. The nodes ND2 and SEN are connected to a source and a drain of the transistor T3, respectively. The node ND2 is connected to drains of the transistors T4 and T5. A source of the transistor T5 is connected to the node SRC. A gate of the transistor T5 is connected to the node SINV. The node SEN is connected to a gate of the transistor T6 and one electrode of the capacitor CP. A source of the transistor T6 is grounded. A drain and a source of the transistor T7 are connected to the bus LBUS and a drain of the transistor T6, respectively. A drain of the transistor T8 is connected to a source of the transistor T4. A source of the transistor T8 is electrically connected to the bit line BL associated with the sense amplifier unit SAU.

For example, a power supply voltage VDD is applied to the source of the transistor T0. For example, a ground voltage is applied to the node SRC. Control signals BLX, HLL, XXL, BLC, and STB are input to gates of the transistors T1, T2, T3, T4, and T7, respectively. A control signal BLS is input to a gate of the transistor T8. A clock signal CLK is input to the other electrode of the capacitor CP.

An input node and an output node of the inverter IV0 are connected to the nodes SLAT and SINV, respectively. An input node and an output node of the inverter IV1 are connected to the nodes SINV and SLAT, respectively. One end and the other end of the transistor T10 are connected to the node SINV and the bus LBUS, respectively. A control signal STI is input to a gate of the transistor T10. One end and the other end of the transistor T11 are connected to the node SLAT and the bus LBUS, respectively. A control signal STL is input to a gate of the transistor T11. The latch circuit SDL latches data at the node SLAT, and latches, at the node SINV, inverted data of the data latched at the node SLAT.

Circuit configurations of the latch circuits ADL, BDL, CDL, and XDL are similar to that of the latch circuit SDL. For example, the latch circuit ADL latches data at a node ALAT and latches inverted data thereof at a node AINV. A control signal ATI is input to the gate of the transistor T10 of the latch circuit ADL, and a control signal ATL is input to the gate of the transistor T11 of the latch circuit ADL. The latch circuit BDL latches data at a node BLAT and latches inverted data thereof at a node BINV. A control signal BTI is input to the gate of the transistor T10 of the latch circuit BDL, and a control signal BTL is input to the gate of the transistor T11 of the latch circuit BDL. The same applies to the latch circuits CDL and XDL, so that the description thereof will be omitted.

The control signals BLX, HLL, XXL, BLC, STB, BLS, STI, and STL, and the clock signal CLK are generated by, for example, the sequencer 14. The sense amplifier module 17 may have other circuit configurations. For example, the number of latch circuits in each sense amplifier unit SAU may be changed according to the number of bits stored in the memory cell transistor MT. The sense amplifier unit SAU may include an arithmetic circuit capable of executing a simple logical operation. In the read operation of each page, the sense amplifier module 17 can decide (determine) data stored in the memory cell transistor MT by appropriately executing an arithmetic process using a latch circuit.

[1-3] Structure of Memory Device 1

Next, a structure of the memory device 1 according to the first embodiment will be described. In the drawings referred to below, a three-dimensional orthogonal coordinate system is used. An X direction corresponds to an extending direction of the word line WL. A Y direction corresponds to an extending direction of the bit line BL. A Z direction corresponds to a vertical direction with respect to a surface of a reference substrate. In the present specification, "up and down" is defined based on a direction along the Z direction, and a direction away from the reference substrate is defined as a positive direction (upward). As the reference substrate, a substrate disposed at a lowest part in the drawings is generally used. A surface (front surface) of the substrate corresponds to a surface on which a transistor (CMOS circuit) is formed. A back surface of the substrate corresponds to a surface opposite to the front surface.

[1-3-1] Appearance of Memory Device 1

Figure 5:
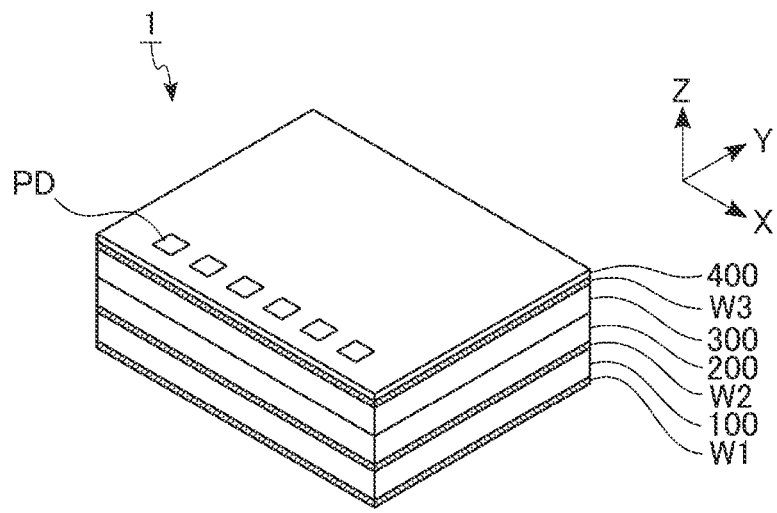
FIG. 5 is a perspective view of a memory device according to a first embodiment.

FIG. 5 is a perspective view showing an example of an appearance of the memory device 1 according to the first embodiment. As shown in FIG. 5, the memory device 1 has a structure in which a first substrate W1, a first CMOS layer 100, a second substrate W2, a second CMOS layer 200, a memory layer 300, a third substrate W3, and a wiring layer 400 are stacked in this order from the bottom.

The first CMOS layer 100 includes a CMOS circuit formed using the first substrate W1. The second CMOS layer 200 includes a CMOS circuit formed using the second substrate W2. A set (group or unit) including the first CMOS layer 100 and the second CMOS layer 200 includes the input/output circuit 11, the logic controller 12, the register circuit 13, the sequencer 14, the driver circuit 15, the row decoder module 16, and the sense amplifier module 17. The memory layer 300 includes the memory cell array 10 formed using the third substrate W3. The wiring layer 400 includes a plurality of pads PD used for connection between the memory device 1 and the memory controller 2. Each pad PD is connected to the input/output circuit 11 and is exposed on a surface of the memory device 1.

Each of the first substrate W1, the second substrate W2, and the third substrate W3 is a silicon substrate. Each of the first substrate W1, the second substrate W2, and the third substrate W3 has an impurity diffusion region corresponding to a circuit design of the memory device 1. The memory device 1 has a bonding surface between adjacent substrates. In the first embodiment, each of a contact (boundary) portion between the first CMOS layer 100 and the second substrate W2 and a contact (boundary) portion between the second CMOS layer 200 and the memory layer 300 corresponds to a bonding surface. The bonding surface is a surface formed by bonding two wafers (substrates), and corresponds to a boundary portion between the two substrates bonded to each other. A layer in which a circuit such as the first CMOS layer 100 is formed may be interposed between the two substrates to be bonded. In the present specification, a process for bonding two substrates to each other is referred to as a "bonding process".

Planar Layout of Bonding Surface

Figure 6:
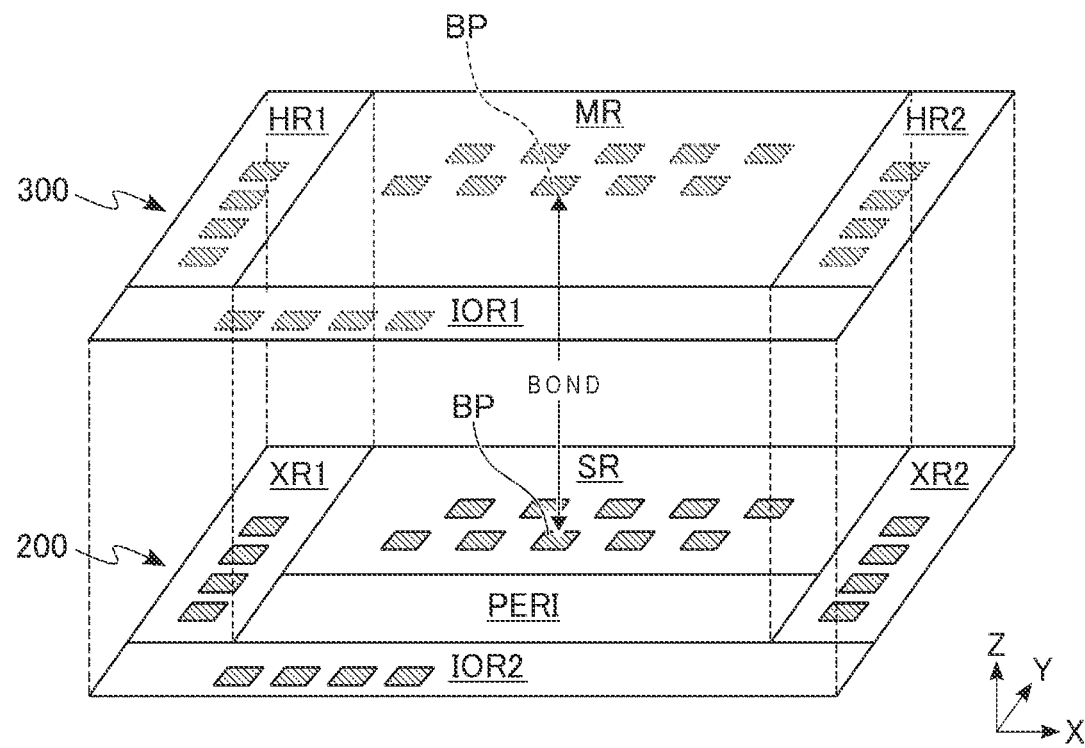
FIG. 6 is a schematic view showing an example of a planar layout of a bonding surface in a memory device according to a first embodiment.

FIG. 6 is a schematic view showing an example of a planar layout of a bonding surface in the memory device 1 according to the first embodiment. FIG. 6 shows a layout of a bonding surface between the memory layer 300 and the second CMOS layer 200, and shows coordinate axes with reference to the second substrate W2 (second CMOS layer 200). As shown in FIG. 6, the bonding surface of the memory layer 300 is divided into a memory region MR, lead regions HR1 and HR2, and an input/output region IOR1. The bonding surface of the second CMOS layer 200 is divided into a sense amplifier region SR, a peripheral circuit region PERI, transfer regions XR1 and XR2, and an input/output region IOR2.

The memory region MR is used to store data and includes the plurality of NAND strings NS. The memory region MR is interposed between the lead regions HR1 and HR2 in the X direction. The lead region HR is a region used for connection between stacked wirings provided in the memory region MR and transistors provided in the transfer region XR facing the memory region MR in the Z direction. The input/output region IOR1 is adjacent to the memory region MR and the lead regions HR1 and HR2 in the Y direction. The input/output region IOR1 includes a circuit related to the input/output circuit 11.

The sense amplifier region SR includes the sense amplifier module 17. The peripheral circuit region PERI includes the sequencer 14 and the like. The sense amplifier region SR and the peripheral circuit region PERI are disposed adjacent to each other in the Y direction and overlap the memory region MR in the Z direction. The transfer regions XR1 and XR2 include the row decoder module 16. The transfer regions XR1 and XR2 sandwich a set including the sense amplifier region SR and the peripheral circuit region PERI in the X direction, and overlap the lead regions HR1 and HR2 in the Z direction, respectively. The input/output region IOR2 includes the input/output circuit 11 and the like. The input/output region IOR2 overlaps the input/output region IOR1 in the Z direction.

A plurality of bonding pads BP are provided on the bonding surface of the memory layer 300. Each of the memory region MR, the lead regions HR1 and HR2, and the input/output region IOR1 includes at least one bonding pad BP. The bonding pad BP in the memory region MR can be connected to a bit line BL. The bonding pad BP in the lead region HR can be connected to one of the stacked wirings (for example, the word line WL) provided in the memory region MR. The bonding pad BP in the input/output region IOR1 can be electrically connected to any pad PD in the wiring layer 400.

Similarly, a plurality of bonding pads BP are provided on the bonding surface of the second CMOS layer 200. Each of the sense amplifier region SR, the peripheral circuit region PERI, the transfer regions XR1 and XR2, and the input/output region IOR2 includes at least one bonding pad BP. The bonding pads BP in the transfer regions XR1 and XR2 can be connected to transistors of the row decoder RD. The bonding pad BP in the sense amplifier region SR can be connected to a transistor of the sense amplifier unit SAU. The bonding pad BP in the input/output region IOR2 can be connected to a transistor of the input/output circuit 11.

The plurality of bonding pads BP provided on the bonding surface of the memory layer 300 face the plurality of bonding pads BP provided on the bonding surface of the second CMOS layer 200. The bonding pad BP in the memory region MR faces the bonding pad BP in the sense amplifier region SR. The bonding pads BP in the transfer regions XR1 and XR2 face the bonding pads BP in the lead regions HR1 and HR2, respectively. The bonding pad BP in the input/output region IOR1 faces the bonding pad BP in the input/output region IOR2. A set including two bonding pads BP facing each other between the memory layer 300 and the second CMOS layer 200 is bonded by the bonding process ("bonding" in FIG. 6). Accordingly, the two bonding pads BP facing each other are electrically connected to each other. The bonding pad BP may be referred to as a bonding metal.

The memory device 1 according to the first embodiment is not limited to the structure described above. For example, at least one lead region HR may be provided. The memory device 1 may include a plurality of memory regions MR. The disposition of the memory region MR, the lead region HR, the sense amplifier region SR, the peripheral circuit region PERI, and the transfer region XR may be appropriately changed. In the following, the input/output region IOR is described as a part of the peripheral circuit region PERI.

[1-3-2] Structure of Memory Layer 300

Figure 7:
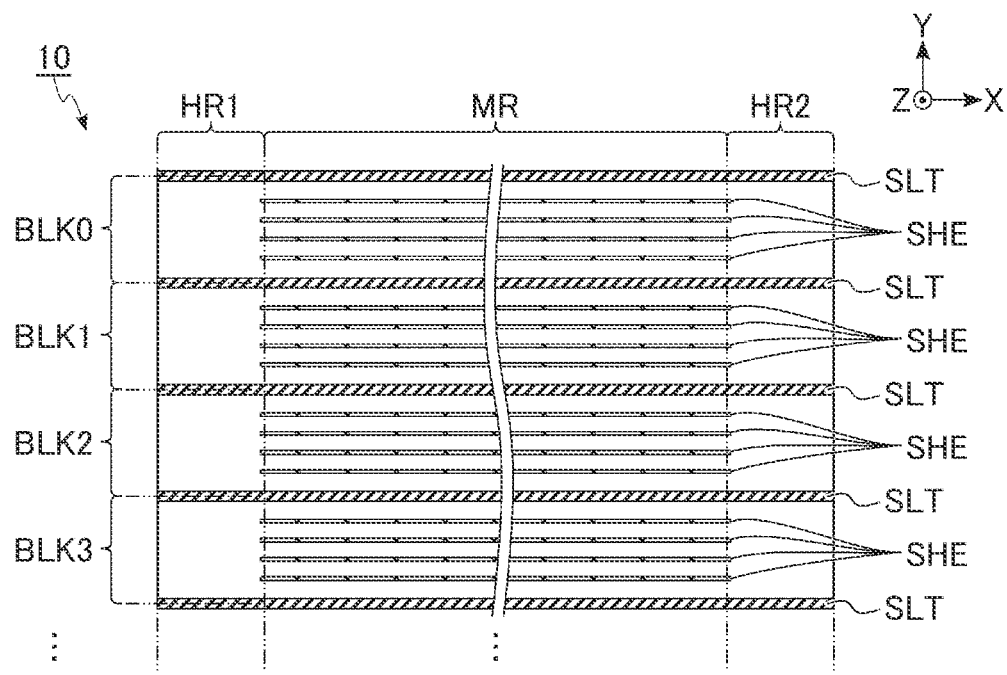
FIG. 7 is a plan view showing an example of a planar layout of a memory layer in a memory device according to a first embodiment.

Next, a detailed structure of the memory layer 300 will be described.
1: Planar Layout of Memory Layer 300
FIG. 7 is a plan view showing an example of a planar layout of the memory layer 300 in the memory device 1 according to the first embodiment. FIG. 7 shows regions corresponding to four blocks BLK0 to BLK3 in the memory cell array 10. As shown in FIG. 7, the memory cell array 10 includes a plurality of slits SLT and a plurality of slits SHE.

Each slit SLT has a portion extending along the X direction, and is disposed across the lead region HR1, the memory region MR, and the lead region HR2 along the X direction. The plurality of slits SLT are arranged in the Y direction. Each slit SLT has a structure in which an insulator is embedded, for example. Adjacent wirings (for example, the word lines WL0 to WL7 and the select gate lines SGD and SGS) are divided by each slit SLT. In the memory cell array 10, each of the regions divided by the slit SLT corresponds to one block BLK.

Each slit SHE has a portion extending along the X direction, and is disposed across the memory region MR along the X direction. The plurality of slits SHE are arranged in the Y direction. In this example, four slits SHE are disposed between two adjacent slits SLT in the Y direction. Each slit SHE has a structure in which an insulator is embedded, for example. Adjacent wirings (at least the select gate line SGD) are divided by each slit SHE. In the memory cell array 10, each of the regions divided by the slits SLT and SHE corresponds to one string unit SU.

Figure 8:
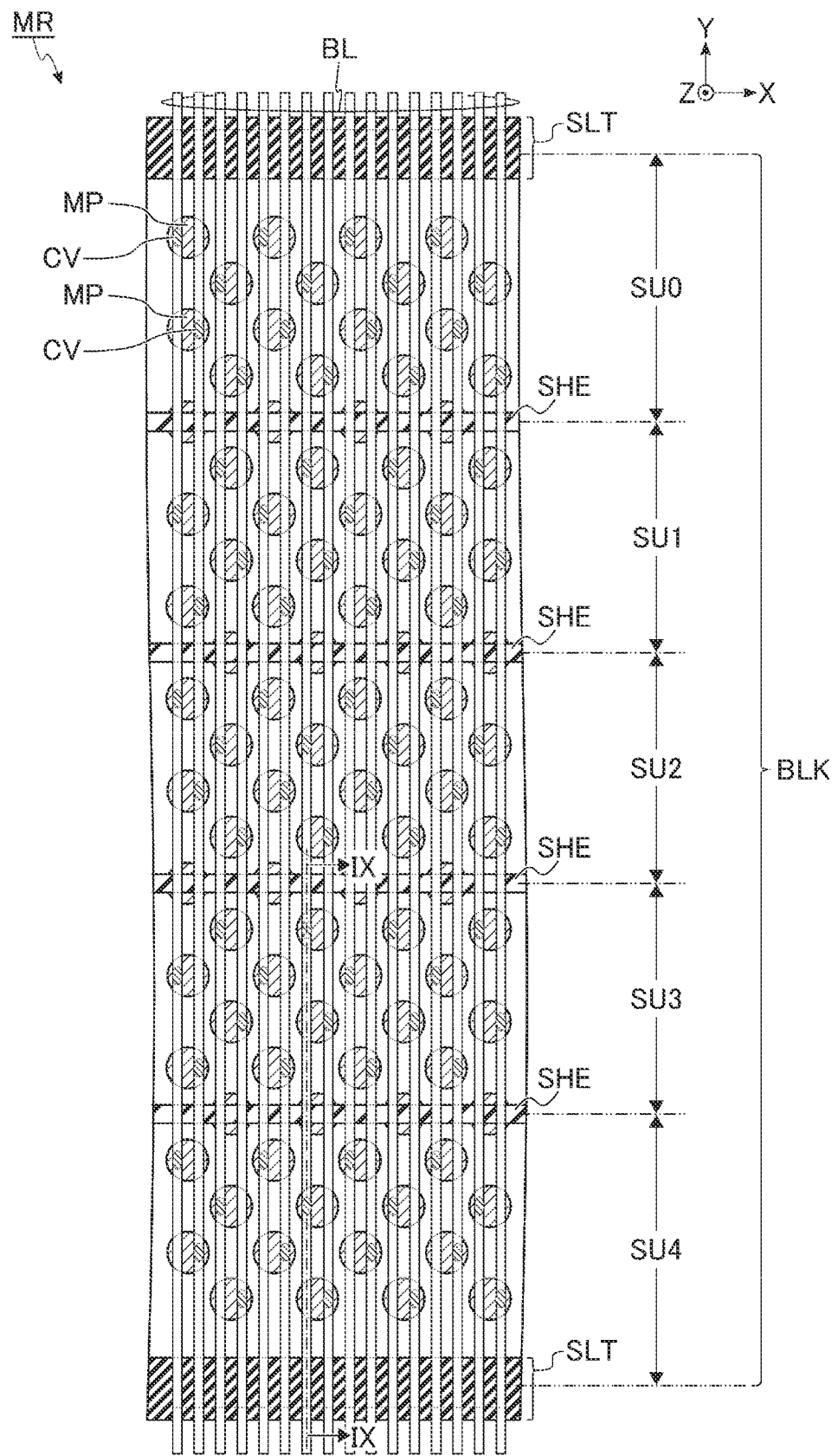
FIG. 8 is a plan view showing an example of a planar layout in a memory region of a memory layer in a memory device according to a first embodiment.

A planar layout of the memory cell array 10 in the memory device 1 according to the first embodiment may be another layout. For example, the number of slits SHE disposed between two adjacent slits SLT may be any number. The number of string units SU in each block BLK may be changed based on the number of slits SHE disposed between two adjacent slits SLT.
2: Planar Layout of Memory Region MR
FIG. 8 is a plan view showing an example of a planar layout in the memory region MR of the memory layer 300 in the memory device 1 according to the first embodiment. FIG. 8 shows a region including one block BLK (the string units SU0 to SU4). As shown in FIG. 8, the memory device 1 includes a plurality of memory pillars MP, a plurality of contacts CV, and a plurality of bit lines BL in the memory region MR.

Each memory pillar MP functions as one NAND string NS. The plurality of memory pillars MP are disposed, for example, in a staggered pattern of 24 columns in a region between two adjacent slits SLT. For example, one slit SHE overlaps respective one of the memory pillars MP at the fifth column, the memory pillars MP at the tenth column, the memory pillars MP at the fifteenth column, and the memory pillars MP at the twentieth column as counted from an upper side in the sheet.

Each bit line BL has a portion extending in the Y direction. The plurality of bit lines BL are arranged in the X direction. Each bit line BL overlaps at least one memory pillar MP for each string unit SU. In this example, two bit lines BL overlap one memory pillar MP. The memory pillar MP is electrically connected to, via the contact CV, one bit line BL of the plurality of bit lines BL overlapping one another. The contact CV between the memory pillar MP in contact with two different select gate lines SGD and the bit line BL may be omitted.

Figure 9:
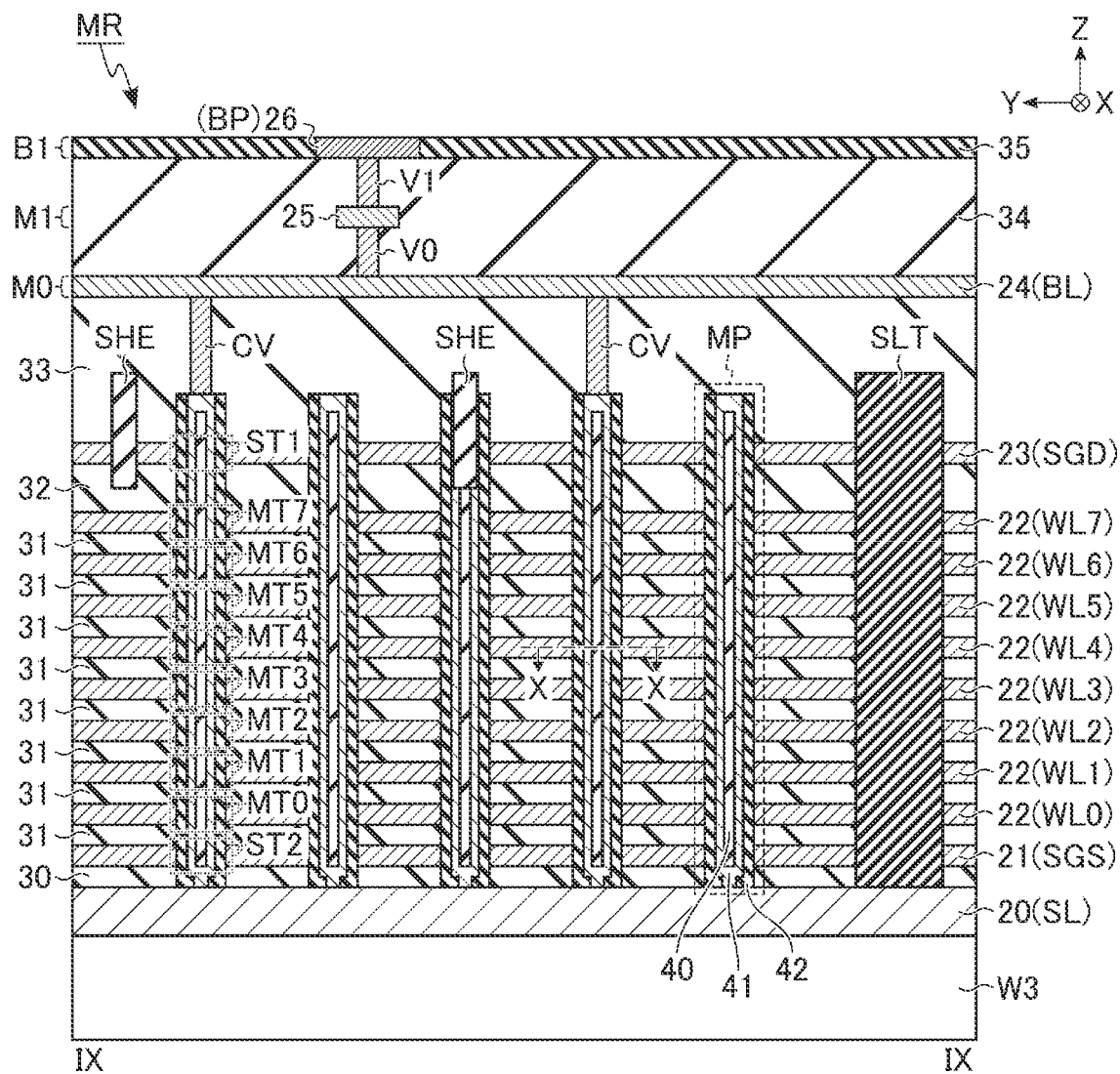
FIG. 9 is a cross-sectional view taken along a line IX-IX in FIG. 8 showing a cross-sectional structure in a memory region of a memory layer in a memory device according to a first embodiment.

The planar layout in the memory region MR of the memory device 1 according to the first embodiment may be another layout. For example, the number and disposition of the memory pillars MP and the slits SHE disposed between two adjacent slits SLT may be appropriately changed. The number of the bit lines BL overlapping each memory pillar MP may be any number.
3: Cross-Sectional Structure of Memory Region MR
FIG. 9 is a cross-sectional view taken along a line IX-IX in FIG. 8, showing an example of a cross-sectional structure in the memory region MR of the memory layer 300 in the memory device 1 according to the first embodiment. FIG. 9 shows an example of a structure of the memory cell array 10 formed on the third substrate W3 before the bonding process, and shows coordinate axes with reference to the third substrate W3. As shown in FIG. 9, the memory device 1 includes conductor layers 20 to 26, insulator layers 30 to 35, and contacts V0 and V1 in the memory region MR.

The conductor layer 20 is provided on the third substrate W3. The insulator layer 30 is provided on the conductor layer 20. The conductor layer 21 and the insulator layer 31 are alternately provided on the insulator layer 30. The insulator layer 32 is provided on the conductor layer 22 formed in an uppermost layer. The conductor layer 23 is provided on the insulator layer 32. The insulator layer 33 is provided on the conductor layer 23. The conductor layer 24 is provided on the insulator layer 33. The contact V0 is provided on the conductor layer 24. The conductor layer 25 is provided on the contact V0. The contact V1 is provided on the conductor layer 25. The conductor layer 26 is provided on the contact V1. Hereinafter, wiring layers in which the conductor layers 24 and 25 are provided are referred to as "M0" and "M1", respectively. A layer on which the conductor layer 26 is provided is referred to as a "bonding layer B1".

Each of the conductor layers 21, 22, and 23 is formed in, for example, a plate shape extending along an XY plane. The conductor layer 24 is formed in a line shape extending in the Y direction. The conductor layers 20, 21, and 23 are used as the source line SL, the select gate line SGS, and the select gate line SGD, respectively. A plurality of conductor layers 22 are used as the word lines WL0 to WL7 in order from a third substrate W3 side. The conductor layer 24 is used as the bit line BL. The contacts V0 and V1 are provided in a columnar shape. The conductor layers 24 and 25 are connected to each other via the contact V0. The conductor layer 25 and the conductor layer 26 are connected to each other via the contact V1. The conductor layer 26 corresponds to the bonding pad BP used for bonding the second substrate W2 and the third substrate W3. The conductor layer 26 contains, for example, copper.

The slit SLT has a plate-shaped portion extending along an XZ plane, and divides the insulator layers 30 to 32 and the conductor layers 21 to 23. Each memory pillar MP extends along the Z direction, and penetrates the insulator layers 30 to 32 and the conductor layers 21 to 23. Each memory pillar MP includes, for example, a core member 40, a semiconductor layer 41, and a stacked film 42. The core member 40 is an insulator extending along the Z direction. The core member 40 is covered with the semiconductor layer 41. A lower portion of the semiconductor layer 41 is in contact with the conductor layer 20. A side surface of the semiconductor layer 41 is covered with the stacked film 42. The contact CV is provided on the semiconductor layer 41. The conductor layer 24 is in contact with the contact CV.

In the shown region, the contact CV corresponding to one memory pillar MP of the two memory pillars MP is shown. The memory pillar MP to which the contact CV is not connected in this region is connected to the contact CV in a region not shown. A portion where the memory pillar MP intersects the conductor layer 21 functions as the select transistor ST2. A portion where the memory pillar MP intersects the conductor layer 22 functions as the memory cell transistor MT. A portion where the memory pillar MP intersects the conductor layer 23 functions as the select transistor ST1.

4: Cross-Sectional Structure of Memory Pillar MP

Figure 10:
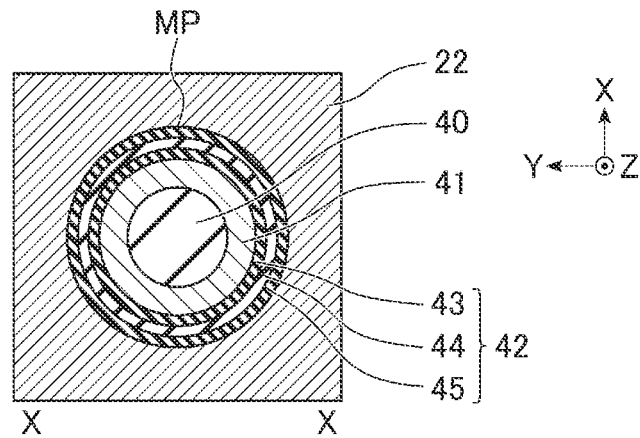
FIG. 10 is a cross-sectional view taken along a line X-X in FIG. 9 showing a cross-sectional structure of a memory pillar of a memory layer in a memory device according to a first embodiment.

FIG. 10 is a cross-sectional view taken along a line X-X in FIG. 9, showing an example of a cross-sectional structure of the memory pillar MP of the memory layer 300 in the memory device 1 according to the first embodiment. FIG. 10 shows a cross section including the memory pillar MP and the conductor layer 22 and parallel to a surface of the third substrate W3. As shown in FIG. 10, the stacked film 42 includes a tunnel insulating film 43, an insulating film 44, and a block insulating film 45.

The core member 40 is provided in a central portion of the memory pillar MP. The semiconductor layer 41 surrounds a side surface of the core member 40. The tunnel insulating film 43 surrounds the side surface of the semiconductor layer 41. The insulating film 44 surrounds a side surface of the tunnel insulating film 43. The block insulating film 45 surrounds a side surface of the insulating film 44. The conductor layer 22 surrounds a side surface of the block insulating film 45. The semiconductor layer 41 is used as channels (current paths) of the memory cell transistors MT0 to MT7 and the select transistors ST1 and ST2. Each of the tunnel insulating film 43 and the block insulating film 45 contains, for example, silicon oxide. The insulating film 44 is used as the charge storage layer of the memory cell transistor MT, and contains, for example, silicon nitride. Accordingly, each memory pillar MP functions as one NAND string NS.

5: Planar Layout of Lead Region HR

In the memory device 1 according to the first embodiment, a structure of an even-numbered block BLK in the lead region HR1 is similar to a structure of an odd-numbered block BLK in the lead region HR2, and a structure of an even-numbered block BLK in the lead region HR2 is similar to a structure of an odd-numbered block BLK in the lead region HR1. For example, a planar layout of the block BLK0 in the lead region HR2 is similar to a planar layout obtained by inverting a structure of the block BLK1 in the lead region HR1 in both the X direction and the Y direction. A planar layout of the block BLK1 in the lead region HR2 is similar to a planar layout obtained by inverting a structure of the block BLK0 in the lead region HR1 in both the X direction and the Y direction. Hereinafter, planar layouts of the blocks BLK in the lead regions HR1 and HR2 will be described by directing attention to the planar layout of the even-numbered block BLK in the lead region HR1.

Figure 11:
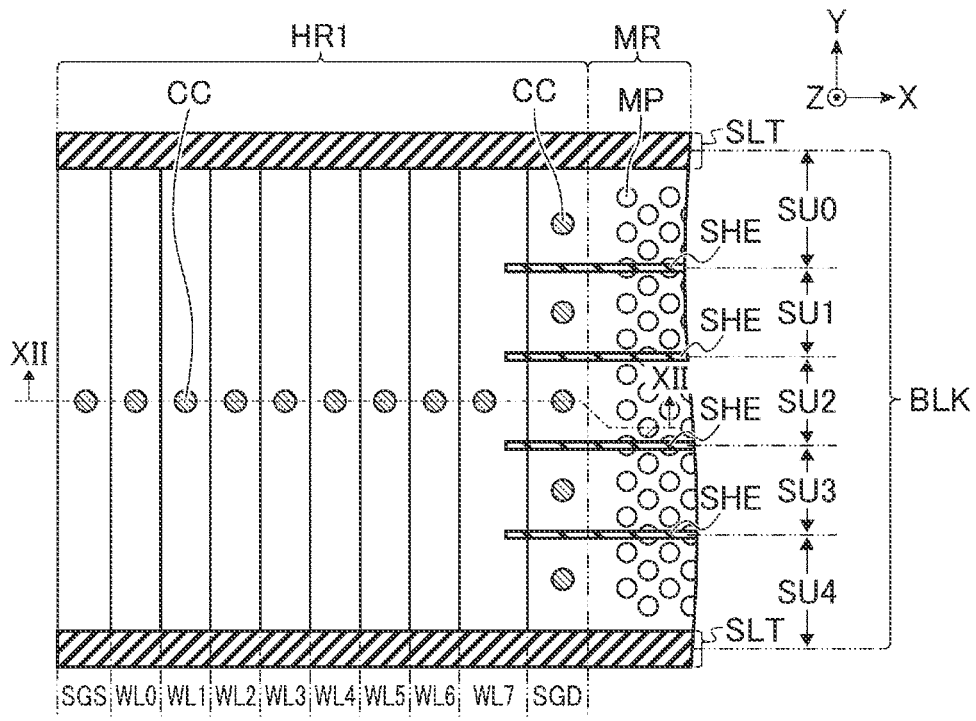
FIG. 11 is a plan view of a planar layout in a lead region of a memory layer in a memory device according to a first embodiment.

FIG. 11 is a plan view showing an example of a planar layout in the lead region HR of the memory layer 300 in the memory device 1 according to the first embodiment. FIG. 11 also shows the memory region MR in a vicinity of the lead region HR1. As shown in FIG. 11, in the lead region HR1 each end of the select gate line SGS, the word lines WL0 to WL7, and the select gate line SGD has a terrace portion.

The terrace portion corresponds to a portion that does not overlap an upper wiring layer (the conductor layer) of the stacked wirings. A structure formed by a plurality of terrace portions is similar to a step, a terrace, a rimstone, or the like. In this example, a step structure having steps in the X direction is formed by the end of the select gate line SGS, the ends of the word lines WL0 to WL7, and the end of the select gate line SGD. In other words, a step is formed between the select gate line SGS and the word line WL0, between the word line WL0 and the word line WL1, and between each other adjacent pair of word lines WL as well as between the word line WL7 and the select gate line SGD.

The memory device 1 includes a plurality of contacts CC in the even-numbered block BLK in the lead region HR1. Each contact CC is a member used for connection between the row decoder module 16 and the stacked wiring. Each contact CC is connected to any one of the stacked wirings provided in the memory cell array 10 in the even-numbered block BLK, that is, the terrace portion of each of the conductor layers 21 to 23. Although not shown, the memory device 1 includes a plurality of contacts CC in the odd-numbered block BLK in the lead region HR2. Each of the plurality of contacts CC provided in the odd-numbered block BLK is connected to any one of the stacked wirings provided in the memory cell array 10 in the odd-numbered block BLK, that is, the terrace portion of each of the conductor layers 21 to 23.

Although the case where the contact CC is connected to the terrace portion formed in the lead region HR has been exemplified, the disclosure is not limited thereto. The memory device 1 may have a structure in which, even when the terrace portion is not provided in the lead region HR, a certain contact CC and a wiring associated with the contact CC can be electrically connected to the other wirings without being short-circuited.

6: Cross-Sectional Structure of Lead Region HR

Figure 12:
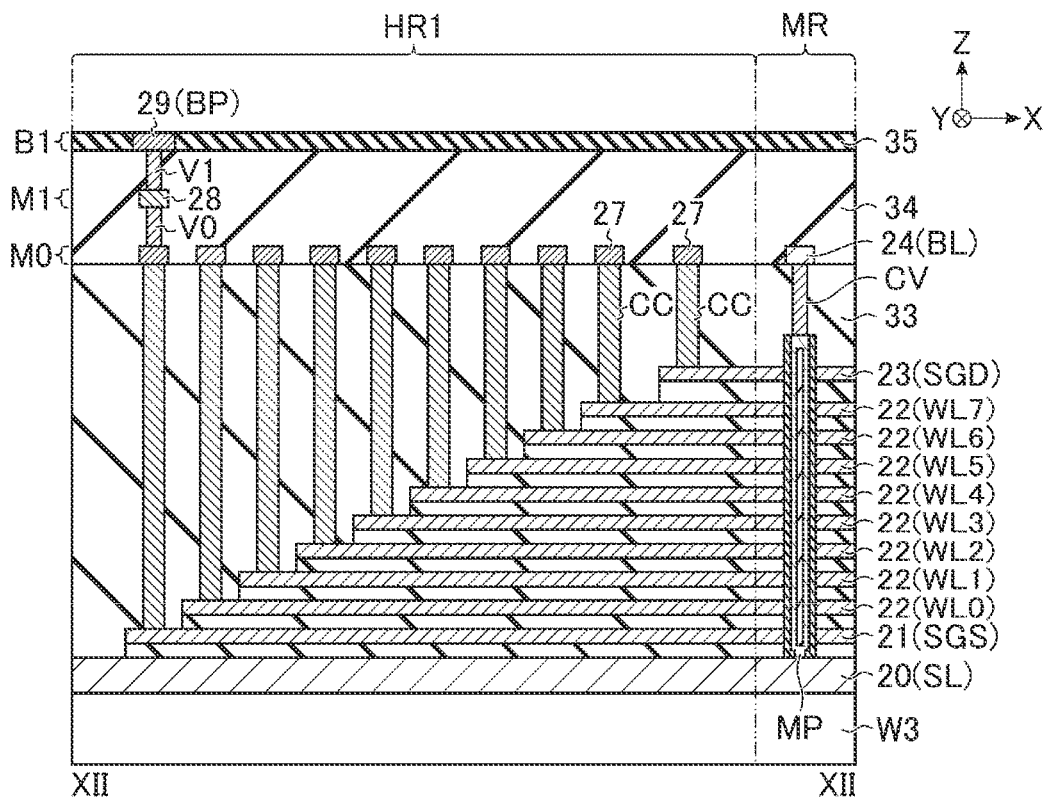
FIG. 12 is a cross-sectional view showing an example of a cross-sectional structure in a lead region of a memory layer in a memory device according to a first embodiment.

FIG. 12 is a cross-sectional view showing an example of a cross-sectional structure in the lead region HR of the memory layer 300 in the memory device 1 according to the first embodiment. FIG. 12 shows a structure in the lead region HR1 of the memory cell array 10 that is formed on the third substrate W3 before the bonding process and the memory region MR in the vicinity of the lead region HR1. As shown in FIG. 12, ends of the conductor layers 21 to 23 are provided in a step pattern, and are covered with the insulator layer 33. In the lead region HR1, the insulator layers 34 and 35 are stacked on the insulator layer 33. In the lead region HR1, the memory device 1 includes the plurality of contacts CC, a plurality of contacts V0 and V1, and a plurality of conductor layers 27, 28, and 29.

The plurality of contacts CC are provided on the terrace portions of the select gate line SGS, the word lines WL0 to WL7, and the select gate line SGD. Each contact CC penetrates the insulator layer 33. One conductor layer 27 is provided on respective one of the plurality of contacts CC. The contact V0 is provided on each conductor layer 27. FIG. 12 shows only the contact V0 corresponding to the select gate line SGS among the plurality of contacts V0. The conductor layer 28 is provided on the contact V0. The contact V1 is provided on the conductor layer 28. The conductor layers 27 and 28 and the plurality of contacts V0 and V1 are covered with the insulator layer 34. The conductor layer 29 is provided on the contact V1 to penetrate the insulator layer 35. The conductor layer 29 corresponds to the bonding pad BP used for bonding the second substrate W2 and the third substrate W3. The conductor layer 29 contains, for example, copper. The conductor layers 27, 28, and 29 are provided in the wiring layers M0 and M1 and the bonding layer B1, respectively.

A set including the conductor layers 27, 28, and 29 and the contacts CC, V0, and V1 described above corresponds to wirings and contacts for connecting any one of the conductor layers 21 to 23 to the row decoder module 16. Although not shown, each of the conductor layers 22 and 23 is similarly connected to the row decoder module 16 via the set including the conductor layers 27, 28, and 29 and the contacts CC, V0, and V1.

[1-3-3] Cross-sectional Structure of Memory Device 1

Figure 13:
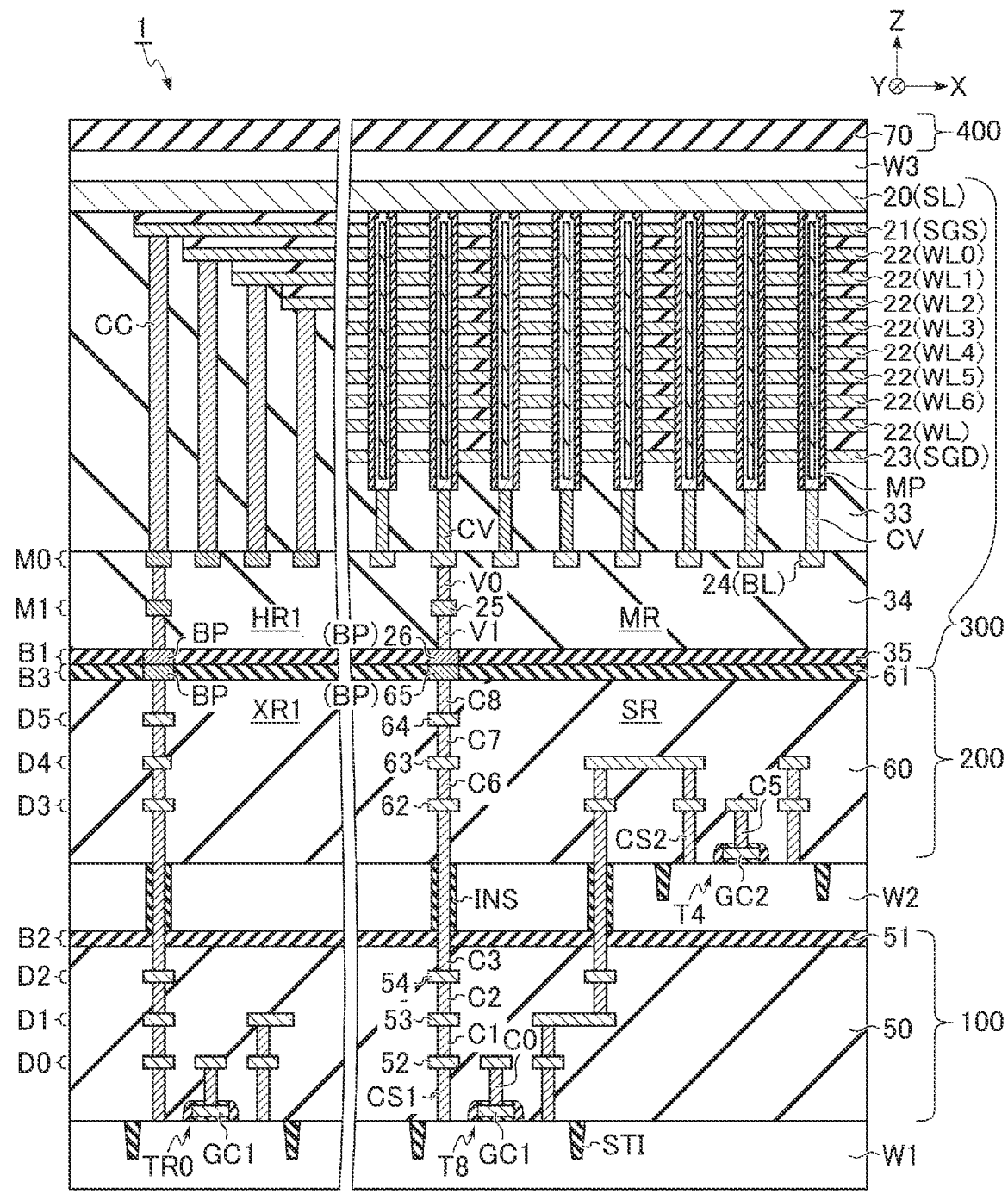
FIG. 13 is a cross-sectional view showing an example of a cross-sectional structure of a memory device according to a first embodiment.

FIG. 13 is a cross-sectional view showing an example of a cross-sectional structure of the memory device 1 according to the first embodiment. FIG. 13 shows a cross section including the memory region MR and the lead region HR1 in the memory device 1, and shows coordinate axes with reference to the first substrate W1. As shown in FIG. 13, the memory device 1 has a structure corresponding to the memory layer 300, which is obtained by vertically inverting the structure of the memory layer 300 shown in FIG. 9 and by vertically inverting the structure of the lead region HR1 shown in FIG. 12. The first CMOS layer 100 in the memory device 1 includes insulator layers 50 and 51, conductor layers GC1 and 52 to 54, and contacts CS1 and C0 to C3. The second CMOS layer 200 in the memory device 1 includes insulator layers 60 and 61, conductor layers GC2 and 62 to 65, and contacts CS2 and C5 to C8.

The insulator layer 50 is provided on the first substrate W1. Circuits (for example, the conductor layers 52 to 54 and the contacts CS1 and C0 to C2) provided on the first substrate W1 are covered with the insulator layer 50. The insulator layer 50 may include a plurality of insulator layers. The insulator layer 50 includes wiring layers D0, D1, and D2 in this order from a first substrate W1 side. Wirings of the first CMOS layer 100 are provided in the wiring layers D0, D1, and D2. The insulator layer 51 is provided on the insulator layer 50. The insulator layer 51 is in contact with a back surface of the second substrate W2. A boundary portion between the insulator layer 51 and the second substrate W2 corresponds to a bonding surface between the first substrate W1 and the second substrate W2. The insulator layer 51 is, for example, a silicon oxide film. Hereinafter, a layer including the insulator layer 51 is referred to as a "bonding layer B2".

The insulator layer 60 is provided on the second substrate W2. Circuits (for example, the conductor layers 62 to 64 and the contacts CS2 and C5 to C8) provided on the second substrate W2 are covered with the insulator layer 60. The insulator layer 60 may include a plurality of insulator layers. The insulator layer 60 includes wiring layers D3, D4, and D5 in this order from the first substrate W1 side. Wirings of the second CMOS layer 200 are provided in the wiring layers D3, D4, and D5. The insulator layer 61 is provided on the insulator layer 60. The insulator layer 61 is in contact with the insulator layer 35 in the memory layer 300. A boundary portion between the insulator layer 61 and the insulator layer 35 corresponds to a bonding surface between the second substrate W2 and the third substrate W3. The insulator layer 61 is, for example, a silicon oxide film. Hereinafter, a layer including the insulator layer 61 on the bonding surface is referred to as a "bonding layer B3".

The conductor layer GC1 is provided on a gate insulating film provided on the first substrate W1. The conductor layer GC1 in the sense amplifier region SR is used as a gate electrode of the transistor T8. The conductor layer GC1 in the transfer region XR1 is used as a gate electrode of the transistor TR0. The contact C0 is provided on each conductor layer GC1. Two contacts CS1 in the sense amplifier region SR are connected to two impurity diffusion regions provided in the first substrate W1. For example, the two impurity diffusion regions correspond to the source and the drain of the transistor T8. Similarly, two contacts CS1 in the transfer region XR1 are connected to two impurity diffusion regions provided in the first substrate W1. For example, the two impurity diffusion regions correspond to the source and the drain of the transistor TR0. The first substrate W1 is provided with a shallow trench isolation (STI) as appropriate in accordance with a layout of the transistors.

The conductor layer 52 is provided on each of the contacts CS1 and C0 in the sense amplifier region SR. The conductor layer 52 is provided in the wiring layer D0. The conductor layer 53 is provided on the conductor layer 52 via the contact C1. The conductor layer 53 is provided in the wiring layer D1. The conductor layer 54 is provided on the conductor layer 53 via the contact C2. The conductor layer 54 is provided in the wiring layer D2. The contact C3 is provided on the conductor layer 54. In the first embodiment, the contact C3 penetrates the second substrate W2 and the insulator layer 51. The contact C3 and the second substrate W2 are insulated from each other by an insulating film INS. The contact C3 corresponds to a through-silicon via (TSV).

The conductor layer GC2 is provided on a gate insulating film provided on the second substrate W2. The conductor layer GC2 in the sense amplifier region SR is used as a gate electrode of the transistor T4. The contact C5 is provided on each conductor layer GC2. Two contacts CS2 in the sense amplifier region SR are connected to two impurity diffusion regions provided in the second substrate W2. For example, the two impurity diffusion regions correspond to the source and a drain of the transistor T4. The second substrate W2 is provided with an STI as appropriate in accordance with the layout of the transistors.

The conductor layer 62 is provided on each of the contacts CS2, C3, and C5 in the sense amplifier region SR. The conductor layer 62 is provided in the wiring layer D3. The conductor layer 63 is provided on the conductor layer 62 via the contact C6. The conductor layer 63 is provided in the wiring layer D4. The conductor layer 63 may be provided in a current path between the contacts CS2 and C3, or may be provided in a current path between the contact C3 and the bonding pad BP. The conductor layer 64 is provided on the conductor layer 63 via the contact C7. The conductor layer 64 is provided in the wiring layer D5. The conductor layer 65 is provided on the conductor layer 64 via the contact C8. The conductor layer 65 is provided in the bonding layer B3. The conductor layer 65 corresponds to the bonding pad BP used for bonding the second substrate W2 and the third substrate W3. The conductor layer 65 contains, for example, copper.

The conductor layer 26 facing the conductor layer 65 is in contact with the conductor layer 65. The conductor layer 26 is connected to the associated conductor layer 24 (bit line BL) via the contacts V0 and V1 and the conductor layer 25. Accordingly, the conductor layer 24 (bit line BL) is electrically connected to the transistor T8 provided on the first substrate W1. Similarly, other conductor layers 24 are connected to transistors provided on the first substrate W1 via the contact V0, the conductor layer 25, and the like, which are connected from below the memory pillar MP.

Similarly, the bonding pad BP in the lead region HR1 is connected to the bonding pad BP in the transfer region XR1. A stacked wiring (for example, the select gate line SGS) is electrically connected to the transistor TR0 provided on the first substrate W1 via the conductor layers 52 to 54 and 62 to 65 and the contacts CS1, C1 to C3, and C6 to C8.

An insulator layer 70 is provided on the third substrate W3. The insulator layer 70 is provided in the wiring layer 400. The wiring layer 400 includes a conductor layer connected to a circuit in any one of the first CMOS layer 100, the second CMOS layer 200, and the memory layer 300. The conductor layer is connected to the pad PD provided above the insulator layer 70.

In the above description, although the case where the bonding pad BP formed in the memory layer 300 is connected to a transistor on the first substrate W1 has been exemplified, the disclosure is not limited thereto. The bonding pad BP formed in the memory layer 300 may be connected to a transistor on the second substrate W2. The transistors T8 and TR0 may be disposed on the second substrate W2. The transistor T4 may be disposed on the first substrate W1. For example, an HV transistor is disposed on the first substrate W1 and an LV transistor is disposed on the second substrate W2. Thus, the disposition of transistors in the first CMOS layer 100 and the second CMOS layer 200 can be appropriately changed according to the design of the memory device 1. A specific example of a circuit disposition of the memory device 1 will be described in a fourth embodiment.

[1-4] Method for Producing Memory Device 1

Figure 14:
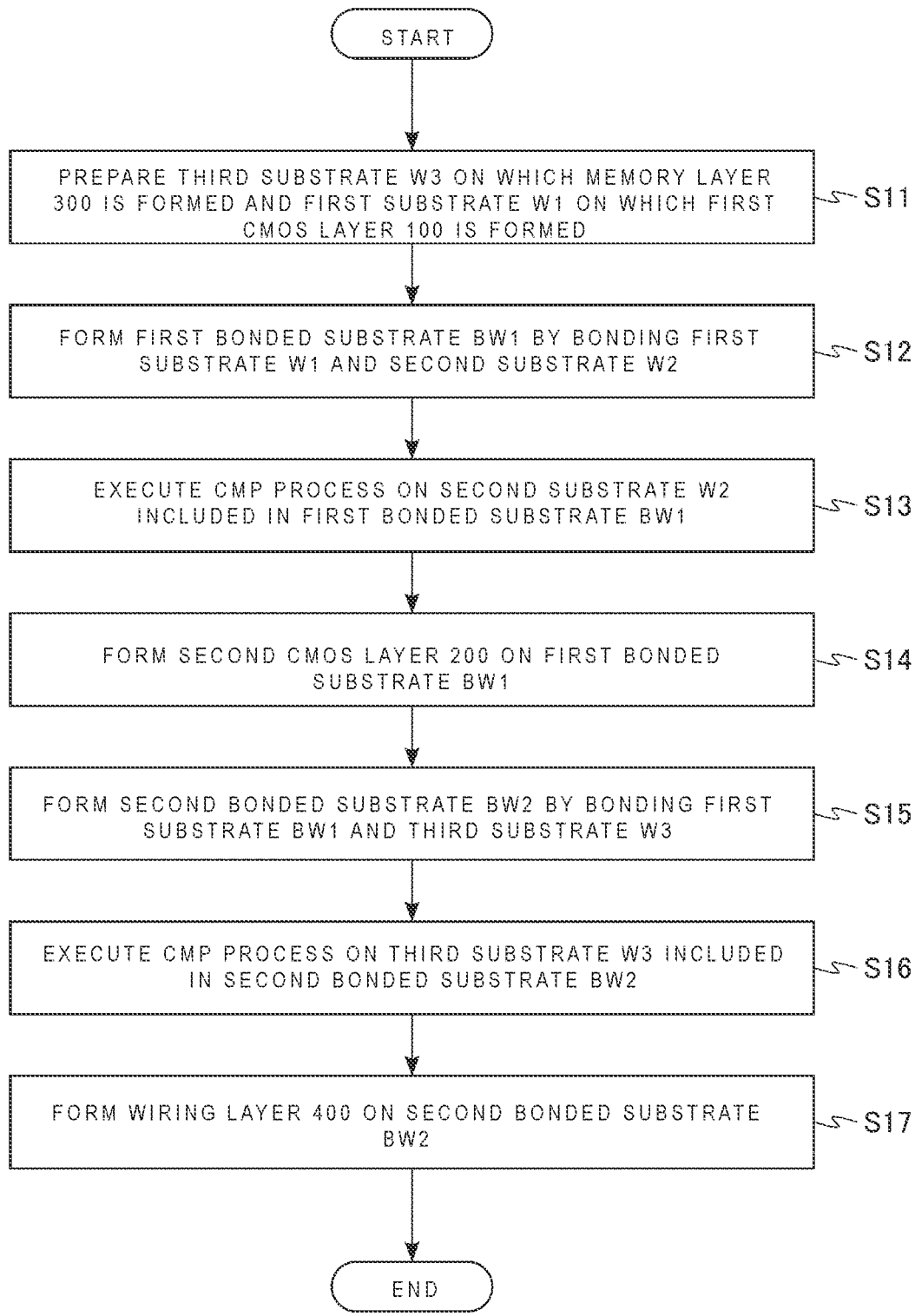
FIG. 14 is a flowchart of a method for producing a memory device according to a first embodiment.

FIG. 14 is a flowchart showing an example of a method for producing the memory device 1 according to the first embodiment. Each of FIGS. 15 to 19 is a cross-sectional view showing an example of a cross-sectional structure of the memory device 1 according to the first embodiment in the process of production. Hereinafter, the method for producing the memory device 1 according to the first embodiment will be described with reference to FIG. 14 as appropriate.

Figure 15:
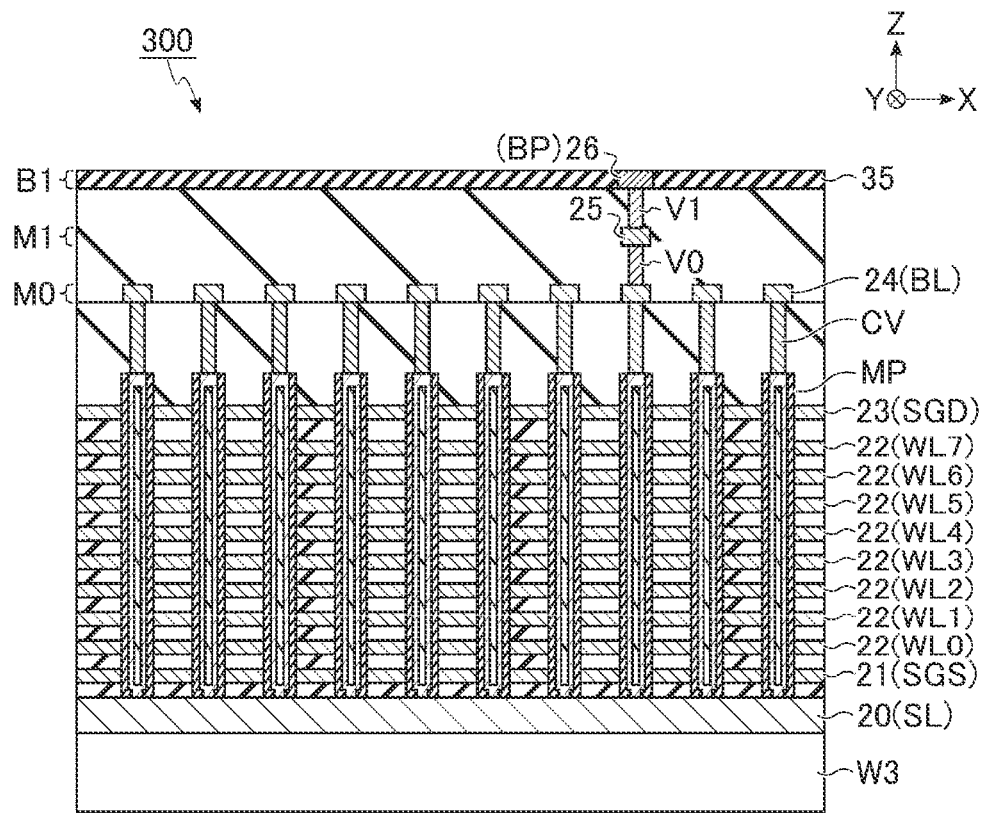
FIGS. 15 to 19 are cross-sectional views showing aspects of a process of production of a memory device according to a first embodiment.
Figure 16:
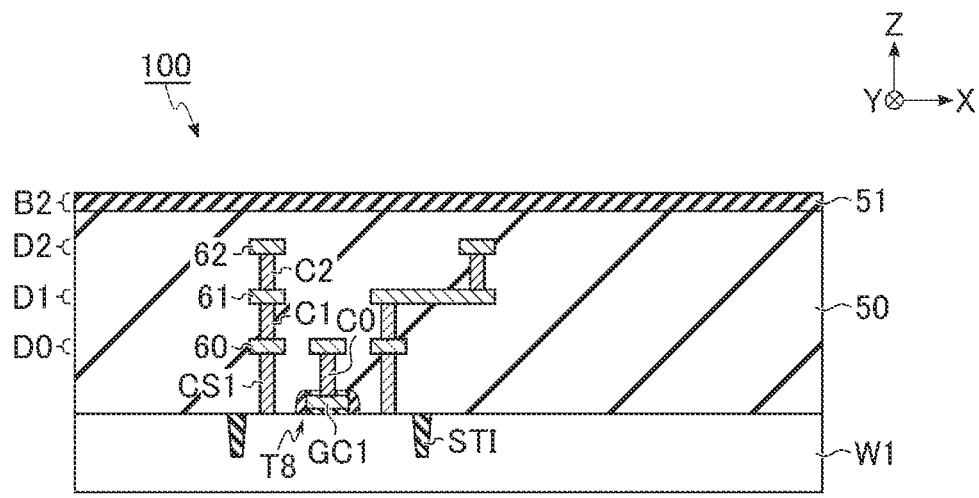

First, the third substrate W3 on which the memory layer 300 is formed and the first substrate W1 on which the first CMOS layer 100 is formed are prepared (S11). In the memory layer 300 on the prepared third substrate W3, as shown in FIG. 15, the insulator layer 35 provided in the bonding layer B1 and the bonding pad BP (conductor layer 25) are exposed. In the first CMOS layer 100 on the prepared first substrate W1, as shown in FIG. 16, the insulator layer 51 provided in the bonding layer B2 is exposed. In S11, a structure corresponding to the contact CC is not formed in the first substrate W1 and the first CMOS layer 100.

Figure 17:
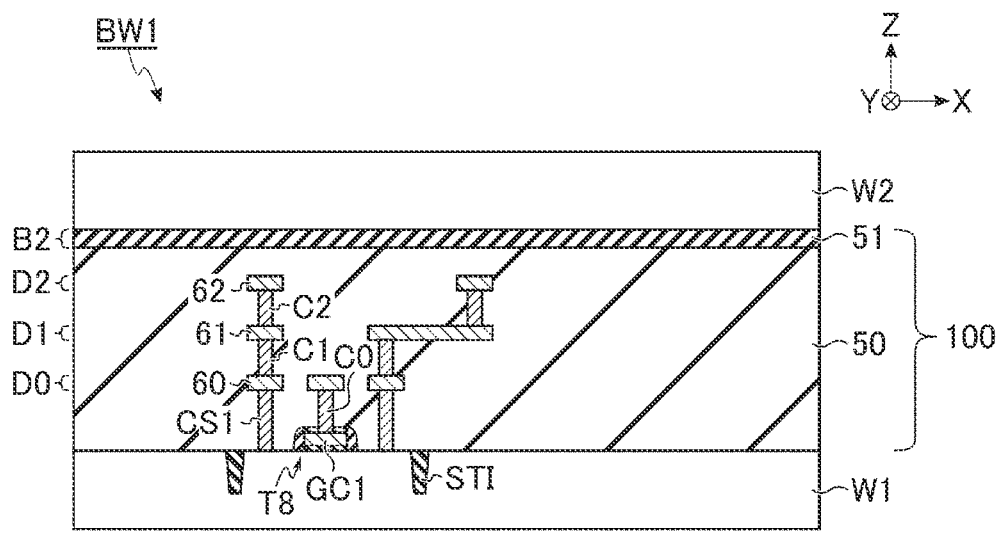

Next, the first substrate W1 and the second substrate W2 are bonded to each other, and as shown in FIG. 17, a first bonded substrate BW1 is formed (S12). Specifically, before the process in S12, a silicon oxide film is formed on a bonding surface of the second substrate W2. Then, the insulator layer 51 (silicon oxide film) of the first CMOS layer 100 and the silicon oxide film of the second substrate W2 are brought into contact with and bonded to each other by a bonding process on the first substrate W1 and the second substrate W2. Accordingly, the first bonded substrate BW1 having a structure in which the second substrate W2 is provided on the insulator layer 51 is formed.

Next, a chemical mechanical polishing (CMP) process is executed on the second substrate W2 in the first bonded substrate BW1 (S13). By the process in S13, the second substrate W2 of the first bonded substrate BW1 is polished (thinned). A thickness of the polished and thinned second substrate W2 corresponds to a thickness of the second substrate W2 shown in FIG. 13.

Figure 18:
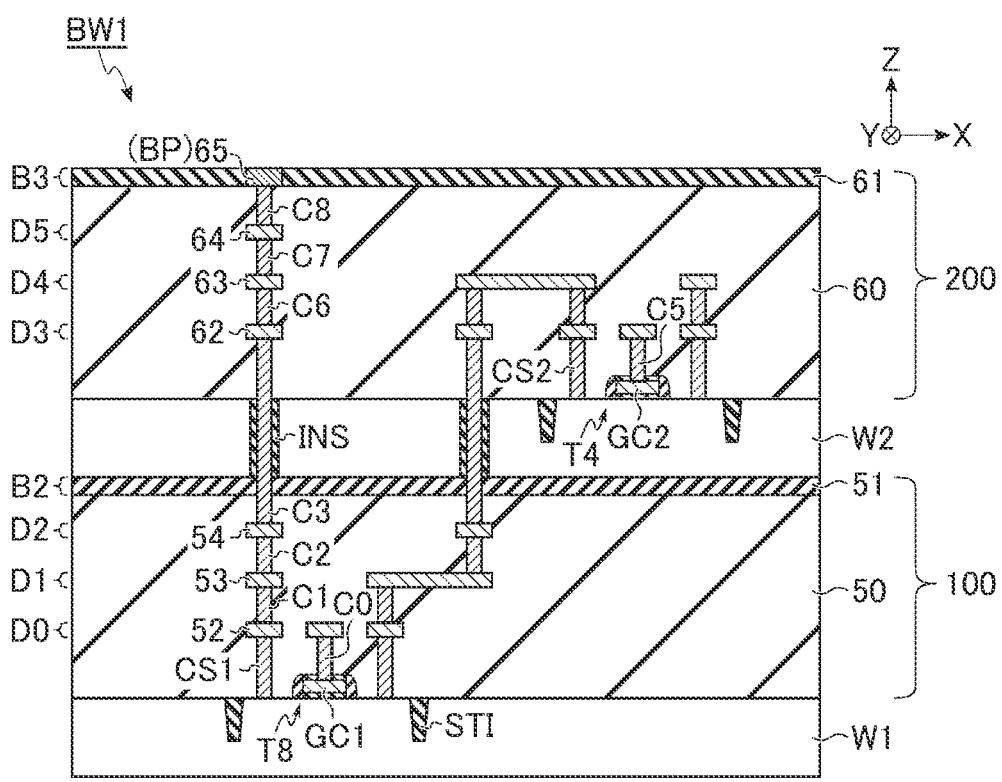

Next, as shown in FIG. 18, the second CMOS layer 200 is formed on the first bonded substrate BW1 (S14). A process for forming the second CMOS layer 200 includes an etching step of forming the contact C3. Specifically, first, a first hole penetrating the second substrate W2 is formed to overlap the conductor layer 54. Then, an insulator is embedded in the first hole. Subsequently, in an etching step of forming the contact CS2, a second hole penetrating an insulator embedded in the second substrate W2 is simultaneously formed. Thereafter, by embedding a conductor in the second hole, the contact C3 that connects a circuit in the first CMOS layer 100 to a circuit in the second CMOS layer 200 is formed. After the contact C3 is formed, structures of the wiring layers D3 to D5 and the bonding layer B3 are formed, and the process in S14 is completed.

Figure 19:
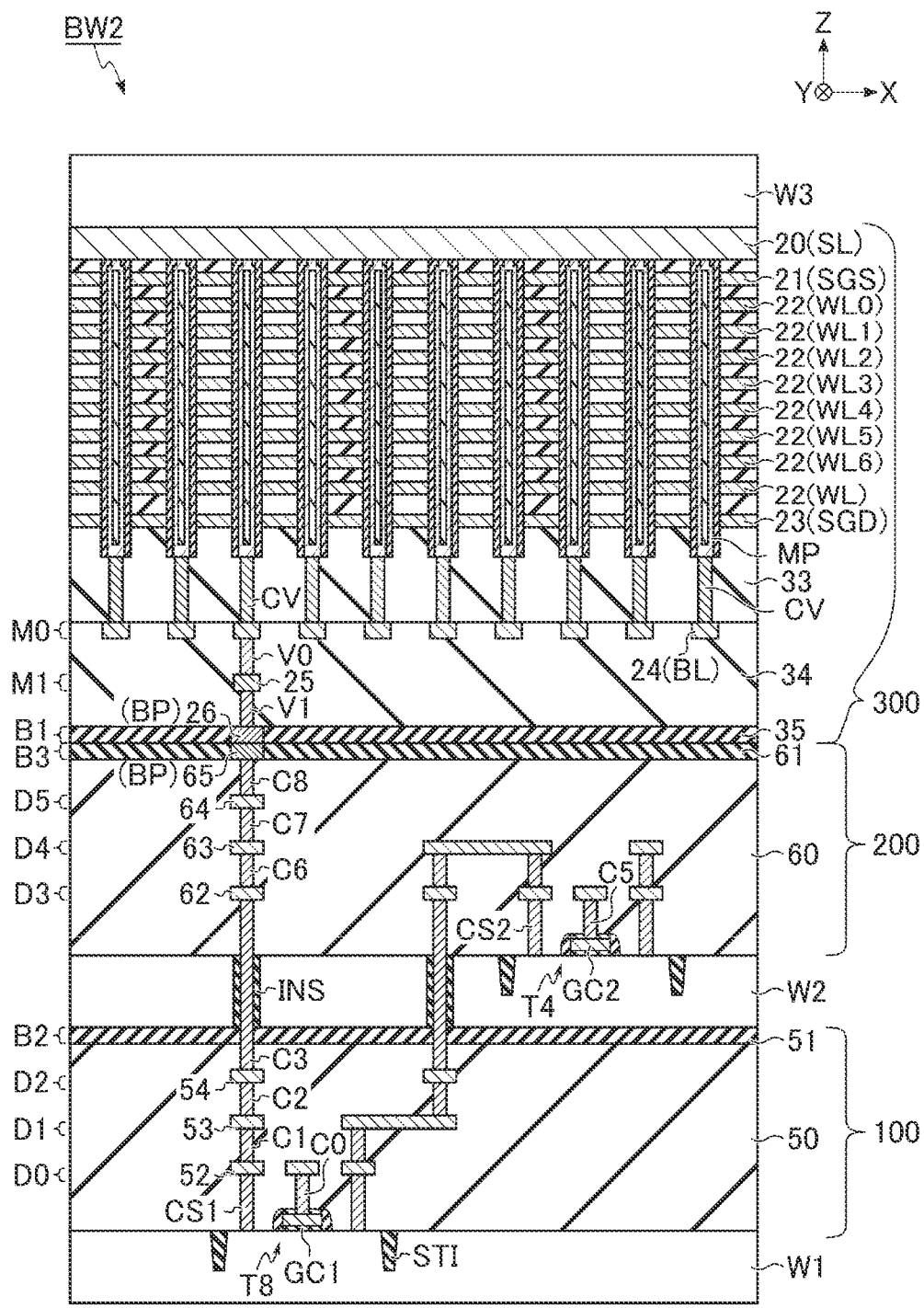

Next, the first bonded substrate BW1 and the third substrate W3 are bonded to each other, and as shown in FIG. 19, a second bonded substrate BW2 is formed (S15). Specifically, the bonding layer B3 of the insulator layer 61 of the second CMOS layer 200 and the insulator layer 35 of the memory layer 300 are brought into contact with and bonded to each other by a bonding process on the first bonded substrate BW1 and the third substrate W3. In addition, sets including the bonding pads BP, which face each other between the second CMOS layer 200 and the memory layer 300, are brought into contact with and bonded to each other. Accordingly, the second bonded substrate BW2 is formed.

Next, a CMP process is executed on the third substrate W3 in the second bonded substrate BW2 (S16). A thickness of the third substrate W3 which is polished and thinned by the process in S16 corresponds to a thickness of the third substrate W3 shown in FIG. 13.

Next, the wiring layer 400 is formed on the second bonded substrate BW2 (S17). The process in S17 includes a step of etching the third substrate W3, a step of forming a wiring and an insulating film, and a step of forming the pad PD. When the process in S17 is completed, the memory device 1 is obtained.

[1-5] Effects of First Embodiment

According to the memory device 1 in the first embodiment, it is possible to reduce a production cost of the memory device. Details of effects of the first embodiment will be described below.

In the memory cell array in which memory cells are three-dimensionally stacked, a storage capacity can be increased by increasing the number of stacked word lines WL. As the memory device, a structure is known in which a substrate on which the memory cell array is formed and a substrate on which a CMOS circuit for controlling the memory cell array is formed are bonded to each other. In such a structure, a region in which the CMOS circuit is formed can be hidden in a region in which the memory cell array is formed, and a chip area can be reduced.

However, as the number of stacked word lines WL increases, an area of the CMOS circuit for controlling the memory cell array 10 also increases. For example, as the number of word lines WL increases, the number of HV transistors (transistors TR in the row decoder module 16)

connected to the word lines WL increases. Since the transistors are disposed on a substrate on which the CMOS circuit is formed, the area of the CMOS circuit increases.

In contrast, the memory device 1 according to the first embodiment has a structure in which the CMOS circuit for controlling the memory cell array 10 is disposed on two substrates (the first substrate W and the second substrate W2). In other words, the memory device 1 includes a plurality of silicon substrates each having the CMOS circuit formed thereon. Further, in other words, the memory device 1 includes the first CMOS layer 100 formed on the first substrate W1 and the second CMOS layer 200 formed on the second substrate W2. The first CMOS layer 100 and the second CMOS layer 200 are connected to each other by using a through-silicon via (TSV).

Accordingly, the memory device 1 according to the first embodiment has an enough region to arrange the CMOS circuit, with respect to the memory cell array 10 having a large capacity. Specifically, a plurality of CMOS layers provide an enough space to arrange the row decoder module 16 whose circuit area increases as the number of stacked word lines WL increases. As a result, in the memory device 1 according to the first embodiment, an influence of an increase in number of stacked word lines WL on the chip area can be reduced. Therefore, according to the memory device 1 in the first embodiment, it is possible to reduce an increase in chip area and reduce the production cost of the memory device.

Further, in the memory device 1 according to the first embodiment, a film thickness of an interlayer insulating film between the first substrate W1 and the second substrate W2 can be changed. For example, an HV transistor is disposed on the first substrate W1, and an LV transistor is disposed on the second substrate W2. The thickness of the interlayer insulating film (insulator layer 60) of the second substrate W2 is designed based on a height of the conductor layer GC2 and a height of the bonding pad BP in the bonding layer B3, and is, for example, less than 1 μm. The thickness of the interlayer insulating film (insulator layer 50) of the first substrate W1 is designed (set) based on a height of the conductor layer GC1 and heights of the wiring layers D0 to D2, and is, for example, 2 μm or more. The interlayer insulating film of the first substrate W1 preferably has a sufficient thickness. Accordingly, it is possible to reduce an influence of an electric field generated from the first substrate W1, in which the HV transistor is formed, on the second substrate W2, in which the LV transistor is formed.

[2] Second Embodiment

In a second embodiment, a structure in which the first substrate W1 (first CMOS layer 100) and the second substrate W2 (second CMOS layer 200) are bonded to each other is formed by a production method different from that of the first embodiment. Details of the second embodiment will be described below.

[2-1] Cross-sectional Structure of Memory Device 1a

Figure 20:
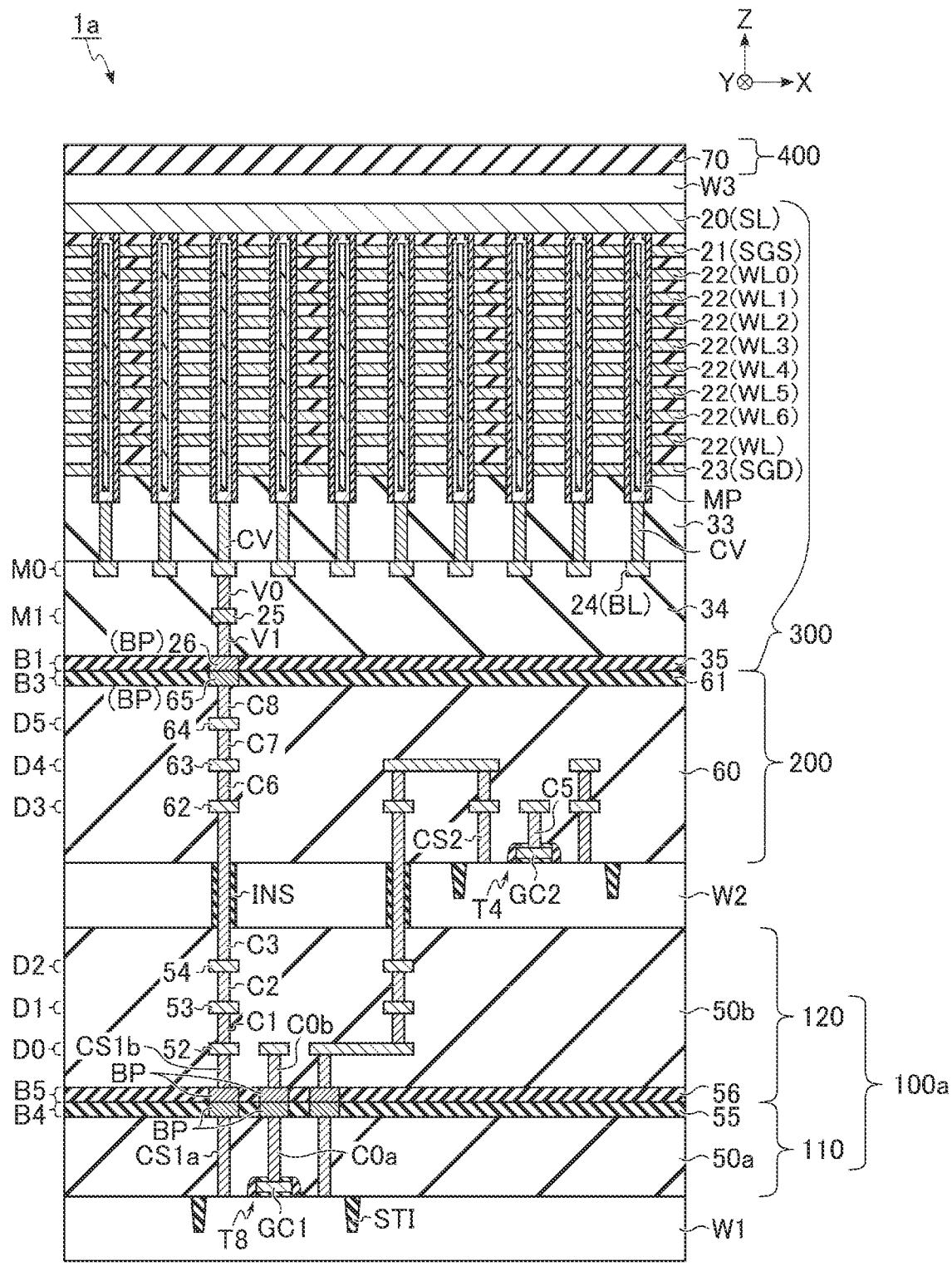
FIG. 20 is a cross-sectional view of a memory device according to a second embodiment.

FIG. 20 is a cross-sectional view showing an example of a cross-sectional structure of a memory device 1a according to the second embodiment. As shown in FIG. 20, the memory device 1a is different from the memory device 1 described in the first embodiment in a structure of a first CMOS layer 100a. The first CMOS layer 100a of the memory device 1a includes a first portion 110 and a second portion 120. The first portion 110 of the first CMOS layer 100a of the memory device 1a includes insulator layers 50a and 55, the conductor layer GC1, a plurality of bonding pads BP, and contacts C0a and CS1a. The second portion 120 of the first CMOS layer 100a of the memory device 1a includes the conductor layers 52 to 54, insulator layers 56 and 50b, a plurality of bonding pads BP, contacts C0b and CS1b, and the contacts C1 to C3.

The insulator layer 50a is provided on the first substrate W1. Elements (For example, the transistor T8 and the contacts C0a and CS1a) provided on the first substrate W1 are covered with the insulator layer 50a. The insulator layer 55 is provided on the insulator layer 50a. The insulator layer 55 is, for example, a silicon oxide film. Hereinafter, a layer including the insulator layer 55 is referred to as a "bonding layer B4". The bonding layer B4 includes a plurality of bonding pads BP. The bonding pads BP in the bonding layer B4 are connected to the contacts CS1a, C0a, and the like.

The insulator layer 56 is provided on the insulator layer 55. The insulator layer 56 is, for example, a silicon oxide film. A boundary portion between the insulator layer 55 and the insulator layer 56 corresponds to a bonding surface between the first portion 110a and the second portion 120 of the first CMOS layer 100. Hereinafter, a layer including the insulator layer 56 is referred to as a "bonding layer B5". The insulator layer 50b is provided on the insulator layer 56. The insulator layer 50b may include a plurality of insulator layers. The insulator layer 50b includes the wiring layers D0, D1, and D2. The insulator layer 50b is in contact with the back surface of the second substrate W2. The bonding layer B5 includes a plurality of bonding pads BP. The bonding pads BP in the bonding layer B5 are connected to the contacts CS1b, C0b, and the like. Each of the contacts CS1b and C0b is in contact with the conductor layer 52 in the wiring layer D0. Circuits (for example, the conductor layers 52 to 54 and the contacts CS1b, C0b, C1, and C2) provided on the first CMOS layer 100a are covered with the insulator layer 50b.

The plurality of bonding pads BP in the bonding layer B4 are respectively connected to the plurality of bonding pads BP in the bonding layer B5 and facing one another. Accordingly, in the second embodiment, the first substrate W1 and the conductor layer 52 of the wiring layer D0 are electrically connected to each other by a set including the contact CS1a, two bonding pads BP facing each other, and the contact CS1b, or a set including the contact C0a, two bonding pads BP facing each other, and the contact C0b.

In the second embodiment, the first portion 110 of the first CMOS layer 100a is formed using the first substrate W1. The second portion 120 of the first CMOS layer 100a is formed using the back surface of the second substrate W2. Other configurations of the memory device 1a according to the second embodiment are similar to those of the memory device 1 according to the first embodiment.

[2-2] Method for Producing Memory Device 1a

Figure 21:
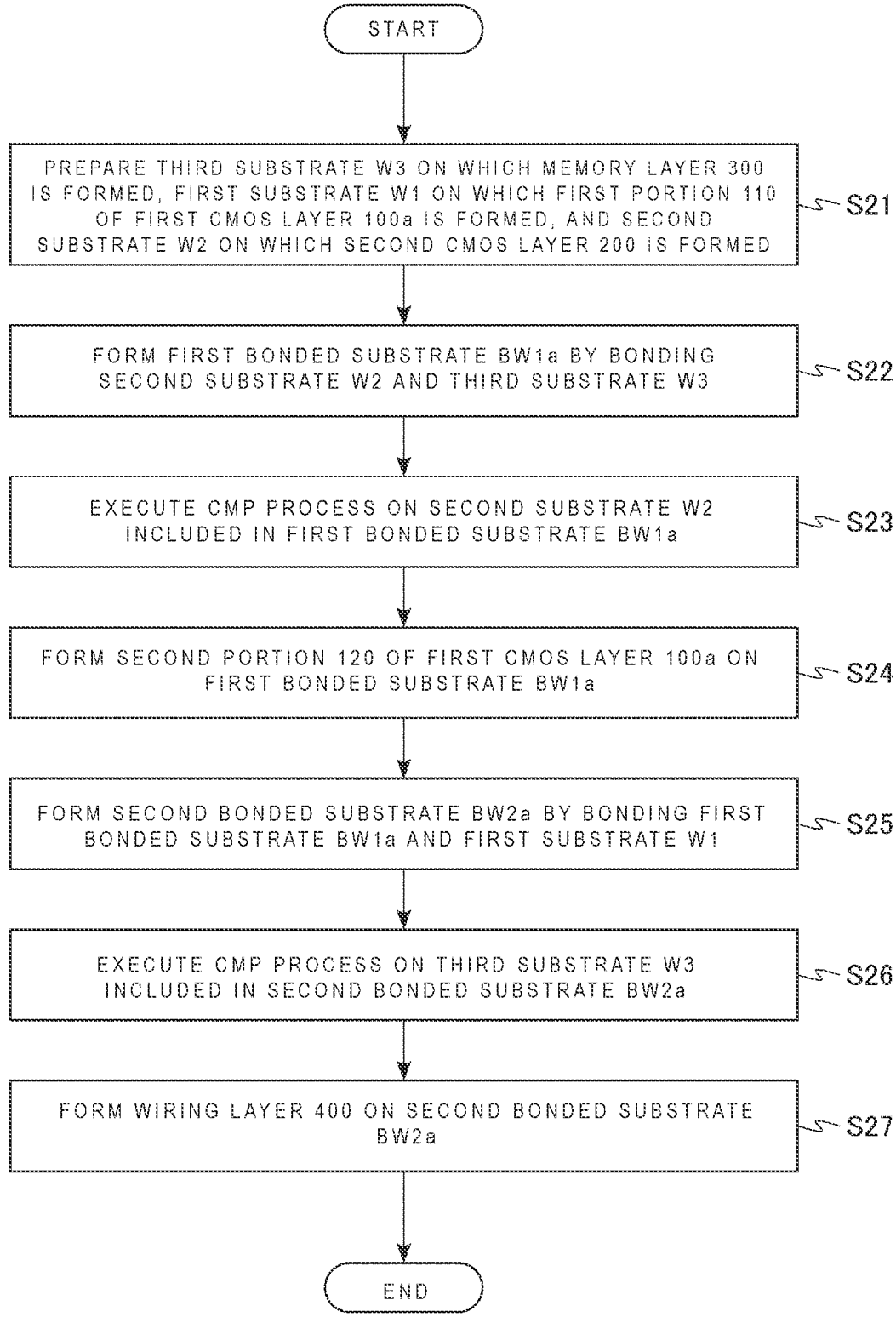
FIG. 21 is a flowchart of a method for producing a memory device according to a second embodiment.

FIG. 21 is a flowchart showing an example of a method for producing the memory device 1a according to the second embodiment. Each of FIGS. 22 to 26 is a cross-sectional view showing an example of a cross-sectional structure of the memory device 1a according to the second embodiment in the process of production. Hereinafter, the method for producing the memory device 1a according to the second embodiment will be described with reference to FIG. 21 as appropriate.

Figure 22:
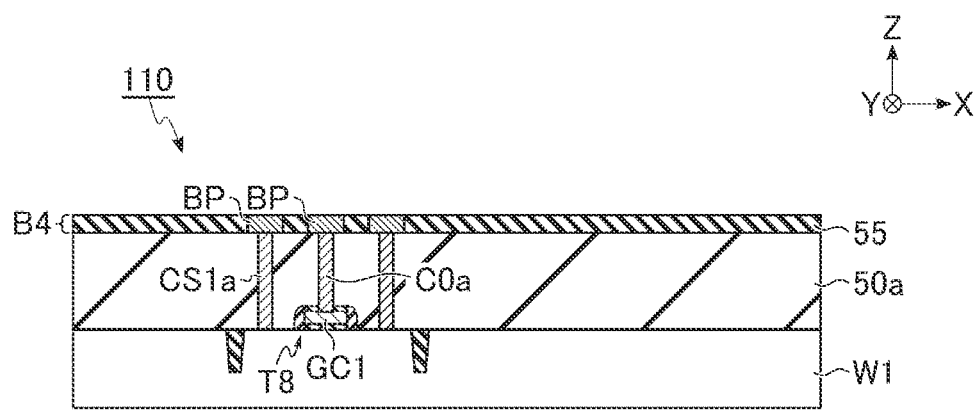
FIGS. 22 to 26 are cross-sectional views showing aspects of a process of production of a memory device according to a second embodiment.
Figure 23:
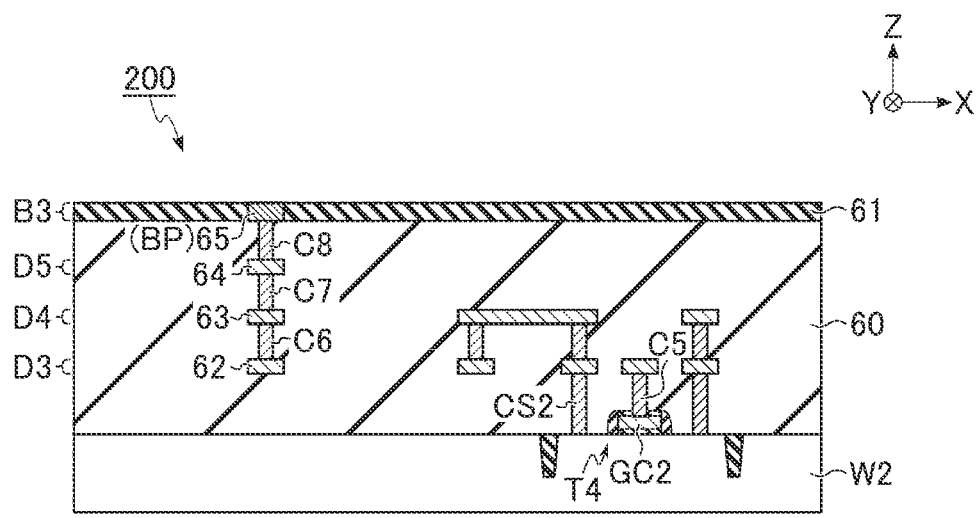

First, the third substrate W3 on which the memory layer 300 is formed, the first substrate W1 on which the first portion 110 of the first CMOS layer 100a is formed, and the second substrate W2 on which the second CMOS layer 200 is formed are prepared (S21). A structure of the memory layer 300 formed on the prepared third substrate W3 is similar to that shown in FIG. 15. In the first portion 110 of the first CMOS layer 100a on the prepared first substrate W1, as shown in FIG. 22, the insulator layer 55 in the bonding layer B4 is exposed. In the second CMOS layer 200 formed on the prepared second substrate W2, as shown in FIG. 23, the insulator layer 61 and the bonding pad BP (conductor layer 65) in the bonding layer B3 are exposed. In S21, a structure corresponding to the contact C3 is not formed in the second substrate W2 and the second CMOS layer 200.

Figure 24:
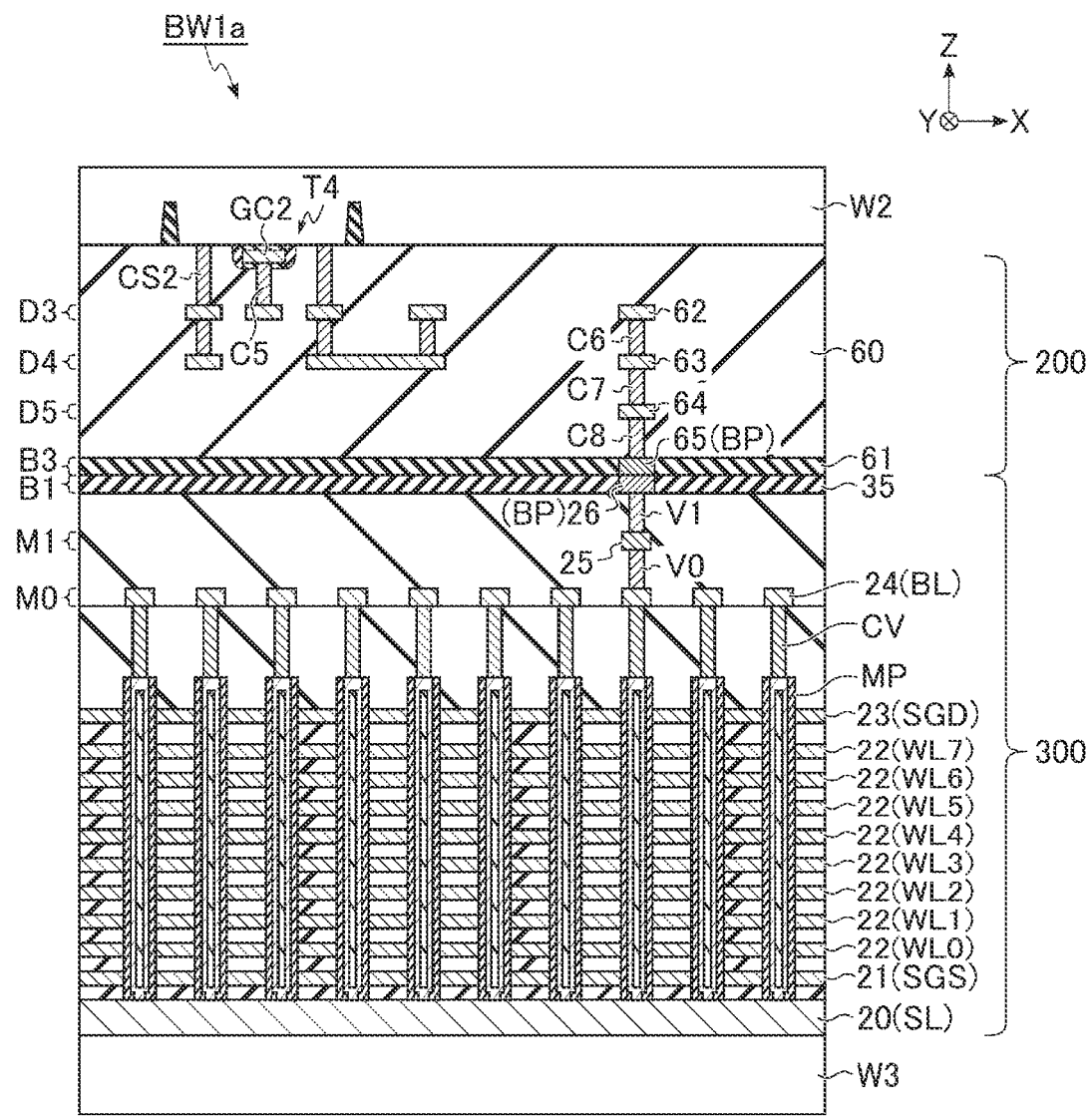
Figure 25:
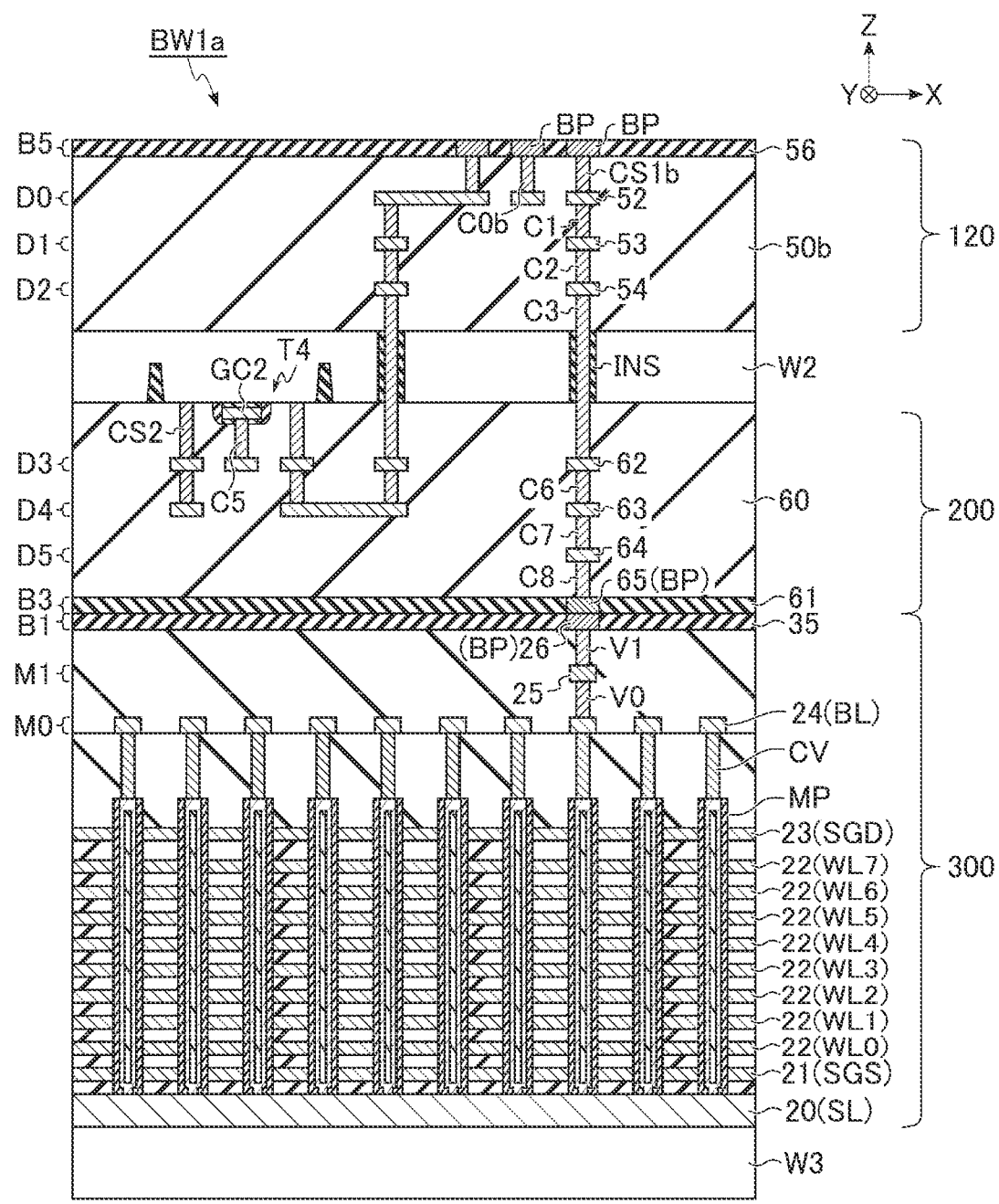

Next, the second substrate W2 and the third substrate W3 are bonded to each other, and as shown in FIG. 24, a first bonded substrate BW1a is formed (S22). Specifically, the insulator layer 61 of the second CMOS layer 200 and the insulator layer 35 of the third substrate W3 are brought into contact with and bonded to each other by a bonding process on the second substrate W2 and the third substrate W3. In addition, sets including the bonding pads BP, which face each other between the second CMOS layer 200 and the memory layer 300, are brought into contact with and bonded to each other. Accordingly, the first bonded substrate BW1a is formed.

Next, a CMP process is executed on the second substrate W2 in the first bonded substrate BW1a (S23). A thickness of the second substrate W2 which is polished and thinned by the process in S23 corresponds to a thickness of the second substrate W2 shown in FIG. 20.

Next, the second portion 120 of the first CMOS layer 100a is formed on the first bonded substrate BW1a (S24). The process for forming the second portion 120 of the first CMOS layer 100a includes an etching step of forming the contact C3. Specifically, first, an insulator layer is formed, and a third hole penetrating the second substrate W2 is formed to overlap the conductor layer 62. Subsequently, after a side wall of the insulating film INS is formed, a conductor is embedded in the hole. Accordingly, the contact C3 that connects a circuit in the second portion 120 of the first CMOS layer 100a and a circuit in the second CMOS layer 200 is formed. Thereafter, structures of the wiring layers D2 to D0 and the bonding layer Bb are formed, and the process in S24 is completed.

Figure 26:
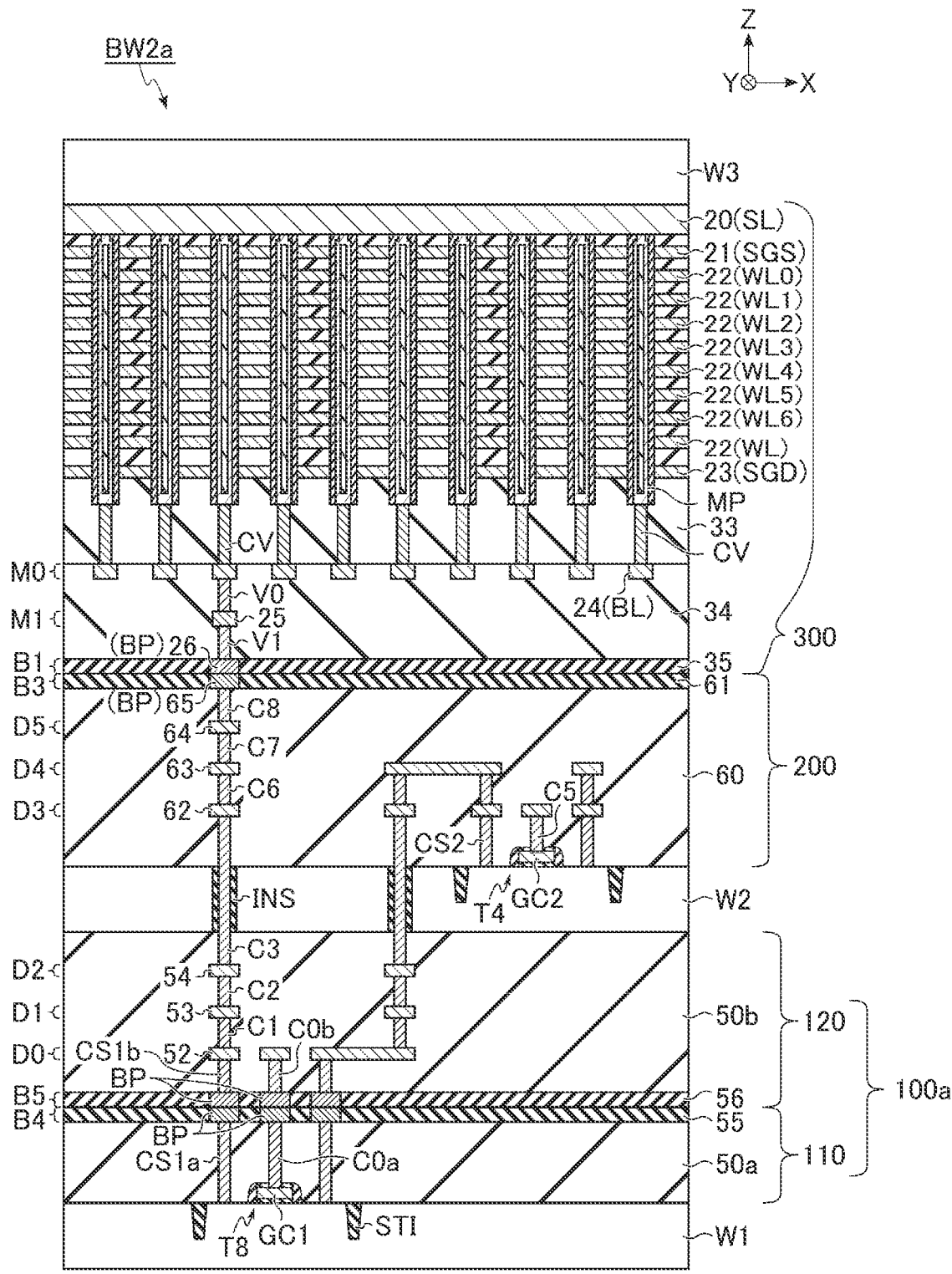

Next, as shown in FIG. 26, the first bonded substrate BW1a and the first substrate W1 are bonded to each other to form a second bonded substrate BW2a (S25). Specifically, the bonding layers B4 and B5 are bonded to each other by a bonding process on the first bonded substrate BW1a and the first substrate W1. More specifically, the insulator layer 56 of the second portion 120 of the first CMOS layer 100a formed on the second substrate W2 and the insulator layer 55 of the first portion 110 of the first CMOS layer 100a formed on the first substrate W1 are brought into contact with and bonded to each other. In addition, sets including the bonding pads BP, which face each other between the first portion 110 and the second portion 120 of the first CMOS layer 100a, are brought into contact with and bonded to each other. Accordingly, the second bonded substrate BW2a is formed.

Next, a CMP process is executed on the third substrate W3 in the second bonded substrate BW2a (S26). A thickness of the third substrate W3 which is polished and thinned by the process in S26 corresponds to a thickness of the third substrate W3 shown in FIG. 20.

Next, the wiring layer 400 is formed on the second bonded substrate BW2a (S27). The process in S27 includes a step of etching the third substrate W3, a step of forming a wiring and an insulating film, and a step of forming the pad PD. When the process in S27 is completed, the memory device 1a is obtained.

[2-3] Effects of Second Embodiment

According to the memory device 1a in the second embodiment, as in the first embodiment, it is possible to reduce an increase in chip area and reduce the production cost of the memory device.

In the memory device 1a according to the second embodiment, the second portion 120 (wiring layers D0 to D2) of the first CMOS layer 100a is formed using the back surface of the second substrate W2. The first portion 110 of the first CMOS layer 100a is provided on the first substrate W1. Accordingly, an aspect ratio of the contact CS1a formed in the first substrate W1 decreases. Therefore, in the memory device 1a according to the second embodiment, a pitch between the conductor layer GC1 and the contact CS1a can be reduced, and an area of the sense amplifier module 17 can be reduced.

In the memory device 1a according to the second embodiment, wirings may be formed using the bonding layers B4 and B5. In this case, a step of forming wirings of the first CMOS layer 100a is eliminated, and the production cost of the memory device 1a can be reduced.

[3] Third Embodiment

A memory device 1b according to a third embodiment has a structure in which a circuit corresponding to a first CMOS layer 100b is formed using the first substrate W1 in the memory device 1a according to the second embodiment. Details of the third embodiment will be described below.

[3-1] Cross-sectional Structure of Memory Device

Figure 27:
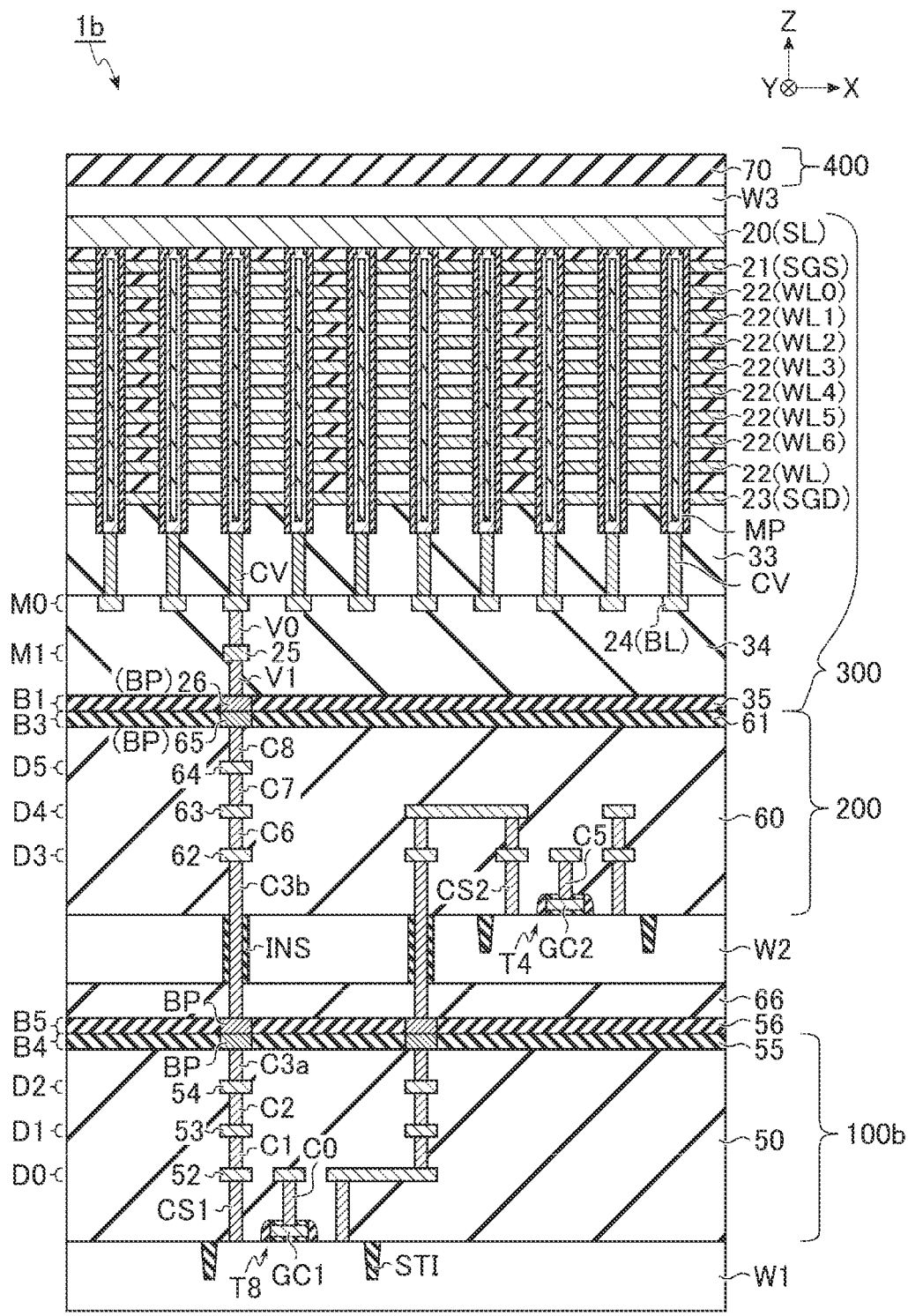
FIG. 27 is a cross-sectional view of a memory device according to a third embodiment.

FIG. 27 is a cross-sectional view showing an example of a cross-sectional structure of the memory device 1b according to the third embodiment. As shown in FIG. 27, the memory device 1b has a structure in which the bonding layers B4 and B5 described in the second embodiment are used for bonding the first substrate W1 and the second substrate W2 in the memory device 1 described in the first embodiment. The first CMOS layer 100b of the memory device 1b includes the insulator layers 50 and 55, the conductor layer GC1, a plurality of bonding pads BP, the contacts CS1 and C0 to C2, and a contact C3a. A back surface portion of the second substrate W2 of the memory device 1b includes an insulator layer 66, the insulator layer 56, a plurality of bonding pads BP, and a contact C3b.

The insulator layer 50 is provided on the first substrate W1 as in the first embodiment. The insulator layer 50 includes the wiring layers D0, D1, and D2. The insulator layer 55 is provided on the insulator layer 50. The insulator layer 55 is provided in the bonding layer B4. The insulator layer 55 is, for example, a silicon oxide film. The plurality of bonding pads BP in the bonding layer B4 are connected to the contact C3a. The contact C3a is provided on the corresponding conductor layer 54.

The insulator layer 56 is provided on the insulator layer 55. The insulator layer 56 is provided in the bonding layer B5. The insulator layer 56 is, for example, a silicon oxide film. The boundary portion between the insulator layer 55 and the insulator layer 56 corresponds to the bonding surface between the first substrate W1 and the second substrate W2. The insulator layer 66 is provided on the insulator layer 56. The insulator layer 66 is in contact with the back surface of the second substrate W2. The plurality of bonding pads BP in the bonding layer B5 are provided with the contact C3b. The contact C3b penetrates the second substrate W2 and the insulator layer 56, and connects the conductor layer 62 and the bonding pad BP corresponding to each other. The contact C3b and the second substrate W2 are insulated from each other by the insulating film INS.

The plurality of bonding pads BP in the bonding layer B4 are connected to the plurality of bonding pads BP in the bonding layer B5 and facing one another. Accordingly, in the third embodiment, the conductor layer 54 of the wiring layer D2 and the conductor layer 62 of the wiring layer D3 are electrically connected to each other by a set including the contact C3a, two bonding pads BP facing each other, and the contact C3b.

In the third embodiment, the first CMOS layer 100b including the bonding layer B4 is formed using the first substrate W1. The bonding layer B5 is formed using the back surface of the second substrate W2. Other configurations of the memory device 1b according to the third embodiment are similar to those of the memory device 1 according to the first embodiment.

[3-2] Method for Producing Memory Device

Figure 28:
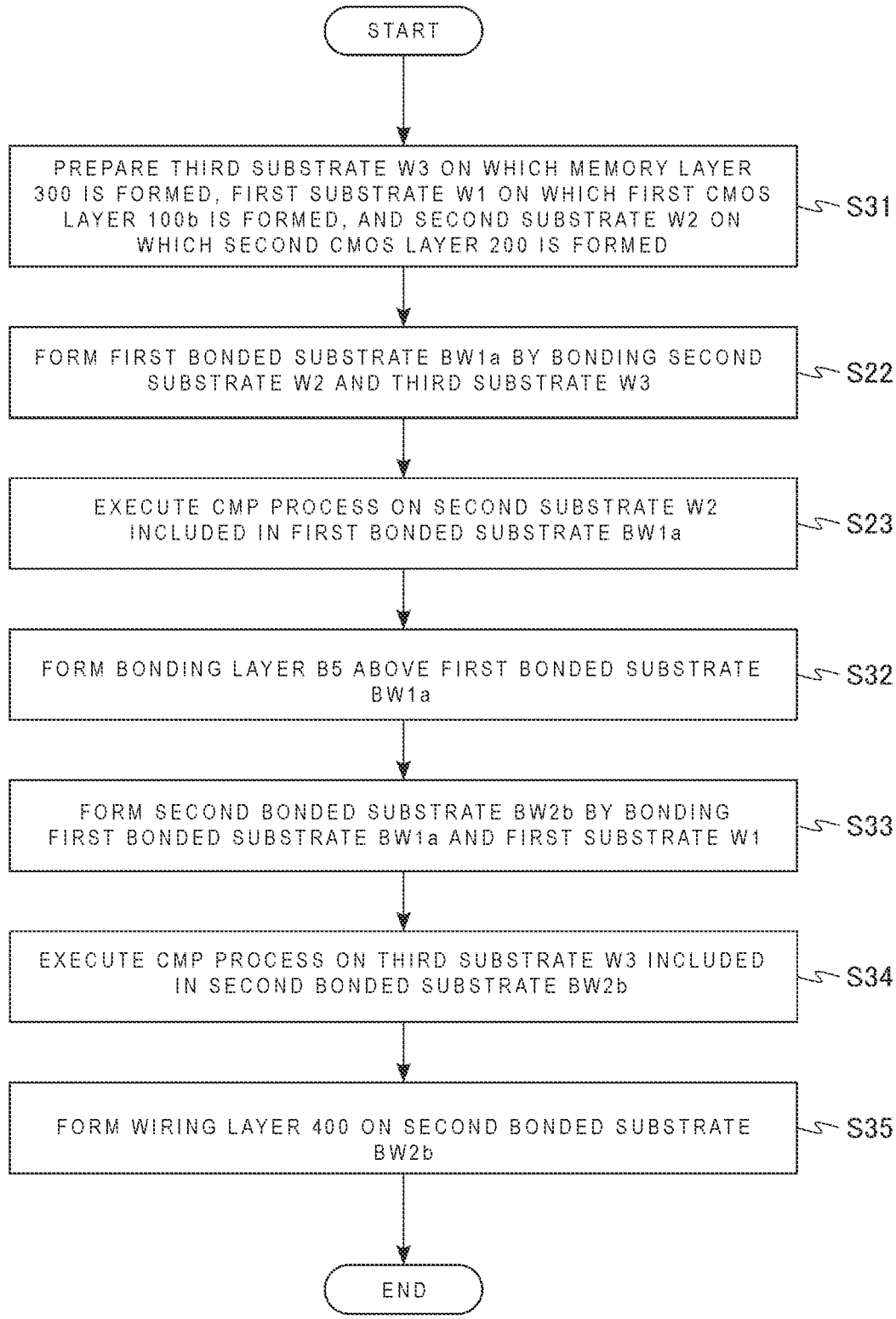
FIG. 28 is a flowchart of a method for producing a memory device according to a third embodiment.
Figure 29:
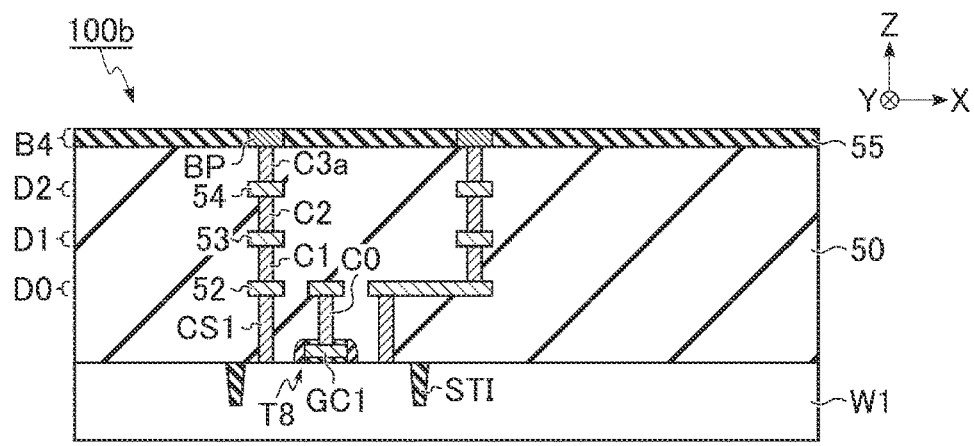
FIGS. 29 to 31 are cross-sectional views showing aspects of a process of production of a memory device according to the third embodiment.
Figure 30:
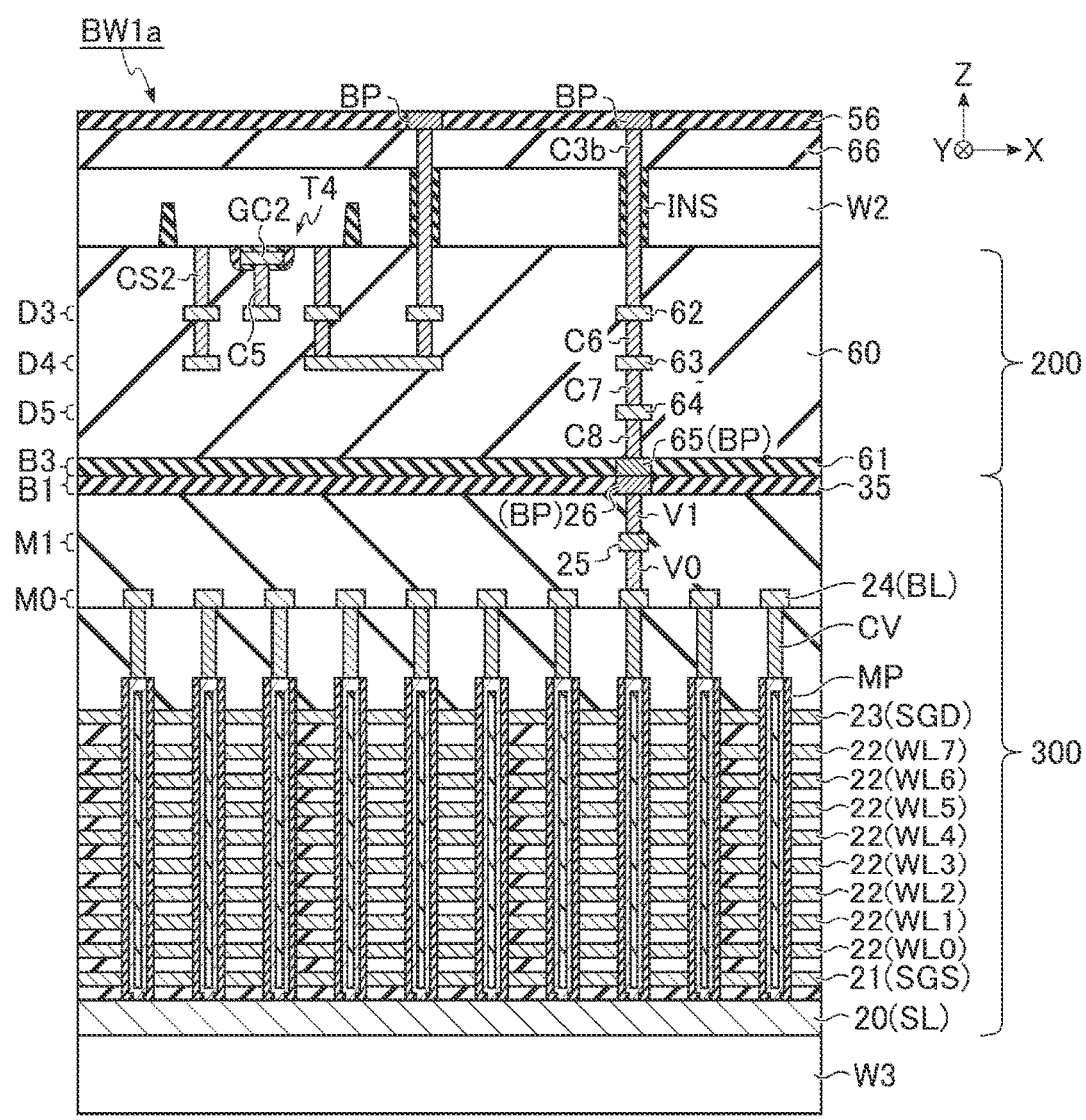
Figure 31:
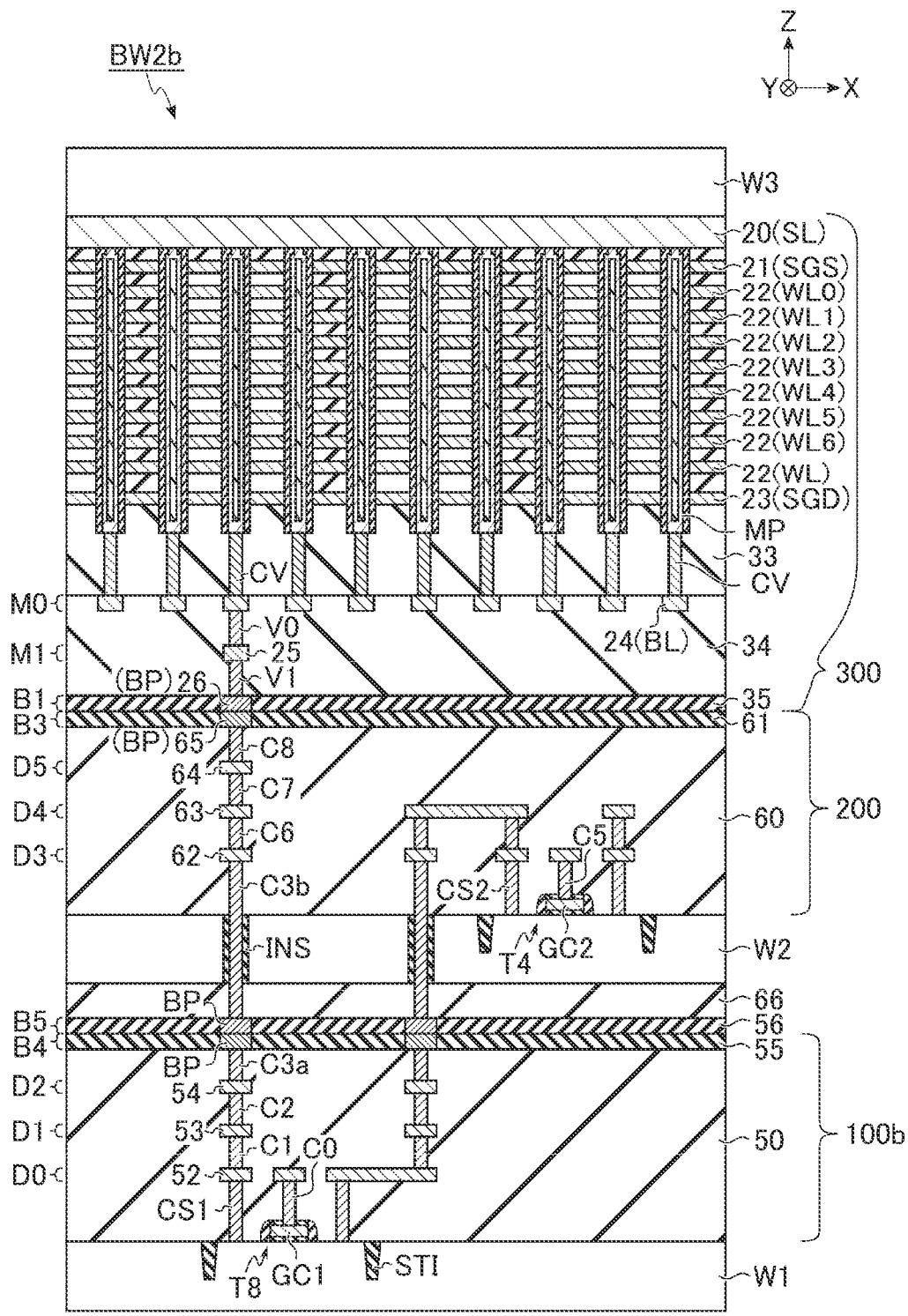

FIG. 28 is a flowchart showing an example of a method for producing the memory device 1b according to the third embodiment. Each of FIGS. 29 to 31 is a cross-sectional view showing an example of a cross-sectional structure of the memory device 1b according to the third embodiment in the process of production. Hereinafter, the method for producing the memory device 1b according to the third embodiment will be described with reference to FIG. 28 as appropriate.

First, the third substrate W3 on which the memory layer 300 is formed, the first substrate W1 on which the first CMOS layer 100b is formed, and the second substrate W2 on which the second CMOS layer 200 is formed are prepared (S31). A structure of the memory layer 300 formed on the prepared third substrate W3 is similar to that shown in FIG. 15. In the first CMOS layer 100b formed on the prepared first substrate W1, as shown in FIG. 29, the insulator layer 55 and the bonding pad BP in the bonding layer B4 are exposed. A structure of the second CMOS layer 200 formed on the prepared second substrate W2 is similar to that shown in FIG. 23.

Next, as in the second embodiment, the second substrate W2 and the third substrate W3 are bonded to each other to form the first bonded substrate BW1a (S22).

Next, as in the second embodiment, a CMP process is executed on the second substrate W2 in the first bonded substrate BW1a (S23).

Next, the bonding layer B5 is formed above the first bonded substrate BW1a (S32). Specifically, first, the insulator layer 66 is formed. Then, a hole penetrating the second substrate W2 and the insulator layer 66 is formed to overlap the conductor layer 62. Subsequently, after a side wall of the insulating film INS is formed, a conductor is embedded in the hole. Accordingly, the contact C3b is formed. Next, the insulator layer 56 is formed. Then, portions of the insulator layer 56 where the bonding pads BP are to be disposed are removed by lithography and an etching process. Subsequently, conductors (bonding pads BP) are embedded in the portions of the insulator layer 56 after removal. Accordingly, bonding pads BP provided above the second substrate W2 are connected to the circuit in the second CMOS layer 200 via the contact C3.

Next, as shown in FIG. 31, the first bonded substrate BW1a and the first substrate W1 are bonded to each other to form a second bonded substrate BW2b (S33). Specifically, the bonding layers B4 and B5 are bonded to each other by a bonding process on the first bonded substrate BW1a and the first substrate W1. More specifically, the insulator layer 56 formed using the second substrate W2 and the insulator layer 55 formed using the first substrate W1 are brought into contact with and bonded to each other by a bonding process on the first bonded substrate BW1a and the first substrate W1. Sets including the bonding pads BP, which face one another between the bonding layers B5 and B4, are brought into contact with and bonded to one another. Accordingly, the contacts C3a and C3b are electrically connected to each other by a set including the bonding pads BP facing one another.

Next, a CMP process is executed on the third substrate W3 in the second bonded substrate BW2b (S34). A thickness of the third substrate W3 which is polished and thinned by the process in S34 corresponds to a thickness of the third substrate W3 shown in FIG. 27.

Next, the wiring layer 400 is formed on the second bonded substrate BW2b (S35). The process in S35 includes a step of etching the third substrate W3, a step of forming a wiring and an insulating film, and a step of forming the pad PD. When the process in S35 is completed, the memory device 1b is obtained.

[3-3] Effects of Third Embodiment

According to the memory device 1b in the third embodiment, as in the second embodiment, it is possible to reduce an increase in chip area and reduce the production cost of the memory device.

[4] Fourth Embodiment

The fourth embodiment relates to a circuit disposition of the first CMOS layer 100 and the second CMOS layer 200 in the memory device 1. Details of the fourth embodiment will be described below.

[4-1] Circuit Disposition of Memory Device 1

Hereinafter, as variations of the circuit disposition of the memory device 1, a first configuration example, a second configuration example, a third configuration example, a fourth configuration example, a fifth configuration example, a sixth configuration example, a seventh configuration example, and an eighth configuration example of the fourth embodiment will be described in order.

[4-1-1] First Configuration Example

Figure 32:
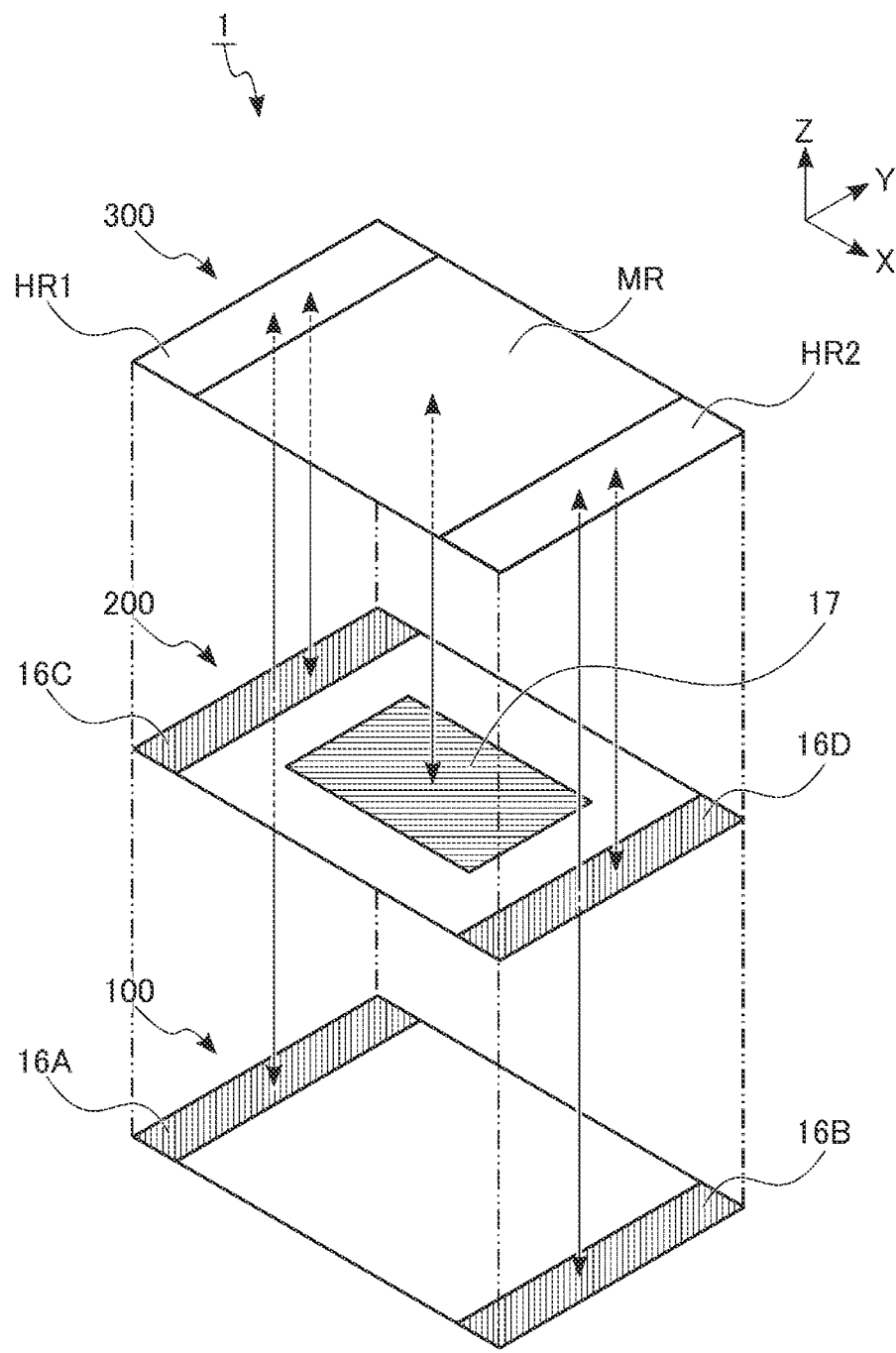
FIG. 32 depicts a first configuration example of a fourth embodiment.

FIG. 32 is a schematic view showing an example of a circuit disposition of the memory device 1 according to the first configuration example of the fourth embodiment. As shown in FIG. 32, the memory device 1 according to the first configuration example of the fourth embodiment includes row decoder modules 16A, 16B, 16C, and 16D having different associated blocks BLK. The row decoder modules 16A and 16B according to the first configuration example of the fourth embodiment are disposed on the first CMOS layer 100 (first substrate W1), and are connected to stacked wirings of the lead regions HR1 and HR2, respectively. The row decoder modules 16C and 16D according to the first configuration example of the fourth embodiment are disposed on the second CMOS layer 200 (second substrate W2), and are connected to stacked wirings of the lead regions HR1 and HR2, respectively.

That is, in the first configuration example of the fourth embodiment, the row decoders RD are disposed on one side and the other side of the first substrate W1 in the X direction and on one side and the other side of the second substrate W2 in the X direction. The row decoder module 16A and the stacked wiring of the lead region HR1 are connected to each other via the second substrate W2 and the second CMOS layer 200. The row decoder module 16B and the stacked wiring of the lead region HR2 are connected to each other via the second substrate W2 and the second CMOS layer 200. The sense amplifier module 17 according to the first configuration example of the fourth embodiment may be disposed on either the first substrate W1 or the second substrate W2.

[4-1-2] Second Configuration Example

Figure 33:
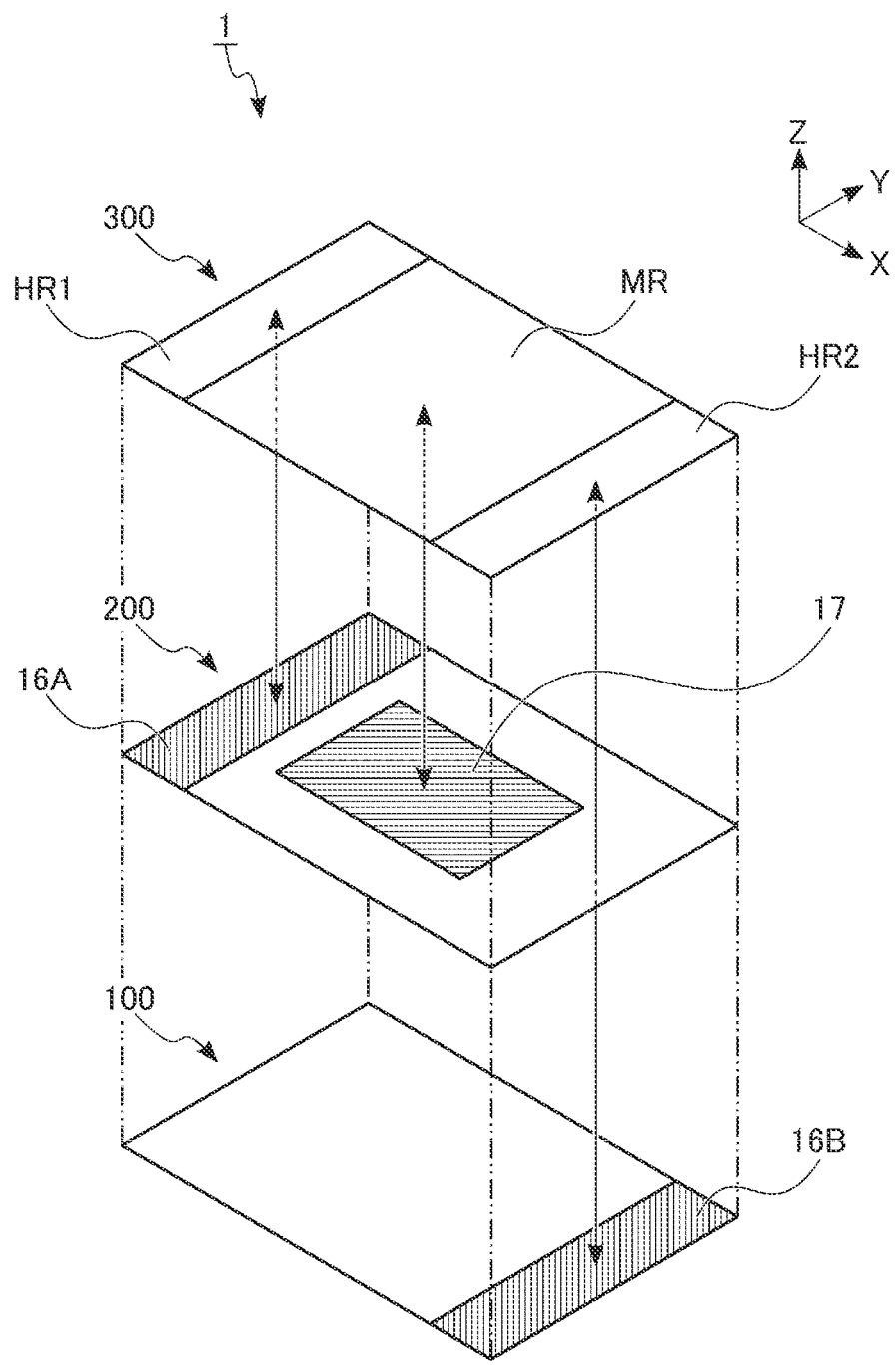
FIG. 33 depicts a second configuration example of a fourth embodiment.

FIG. 33 is a schematic view showing an example of a circuit disposition of the memory device 1 according to the second configuration example of the fourth embodiment. As shown in FIG. 33, the memory device 1 according to the second configuration example of the fourth embodiment includes the row decoder modules 16A and 16B having different associated blocks BLK. The row decoder module 16A according to the second configuration example of the fourth embodiment is disposed on the second CMOS layer 200 (second substrate W2), and is connected to the stacked wiring of the lead region HR1. The row decoder module 16B according to the second configuration example of the fourth embodiment is disposed on the first CMOS layer 100 (first substrate W1), and is connected to the stacked wiring of the lead region HR2.

That is, in the second configuration example of the fourth embodiment, the row decoders RD are disposed on one side of the first substrate W1 in the X direction and on the other side of the second substrate W2 in the X direction. The row decoder module 16B and the stacked wiring of the lead region HR2 are connected to each other via the second substrate W2 and the second CMOS layer 200. The sense amplifier module 17 according to the second configuration example of the fourth embodiment may be disposed on either the first substrate W1 or the second substrate W2.

[4-1-3] Third Configuration Example

Figure 34:
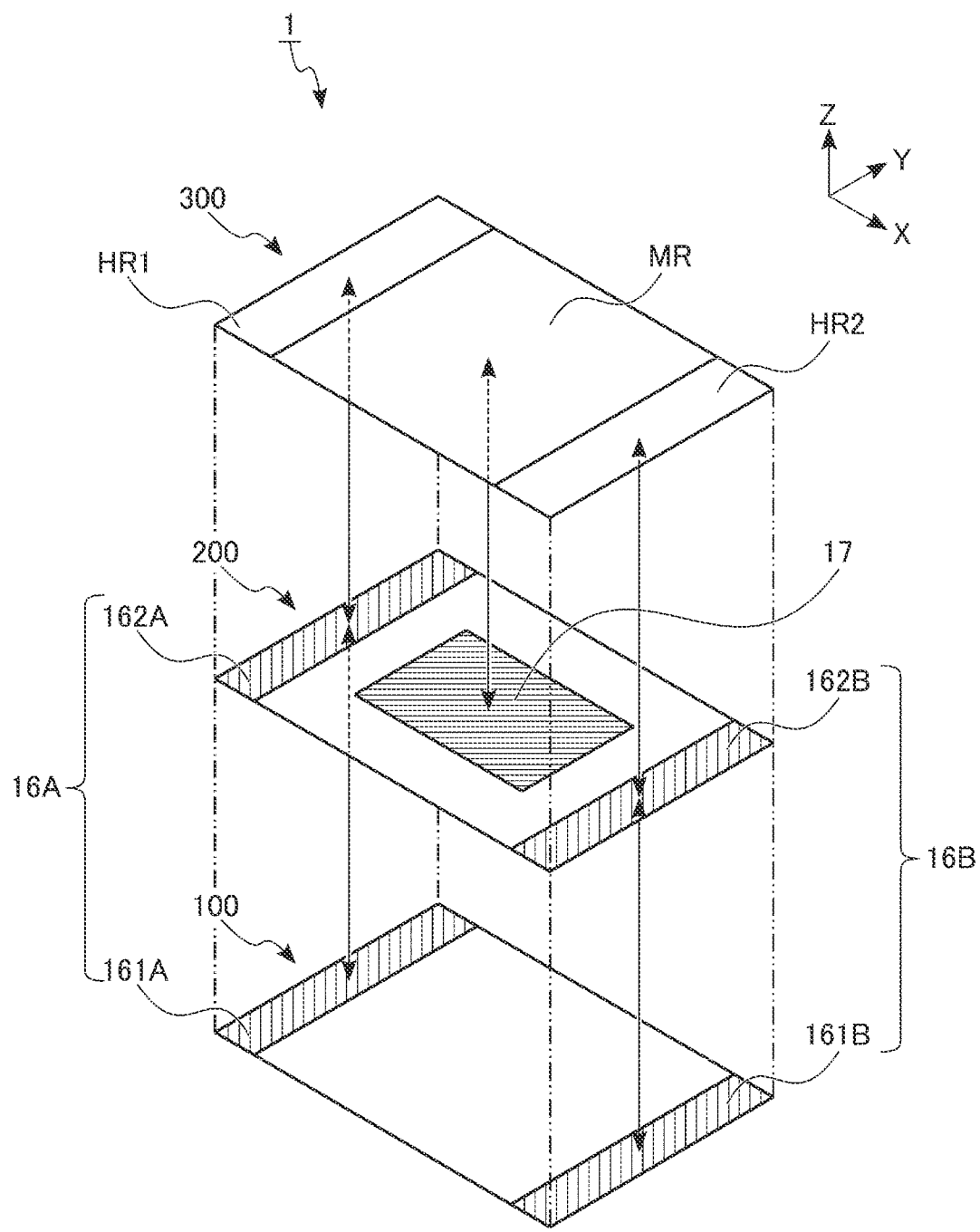
FIG. 34 depicts a third configuration example of a fourth embodiment.

FIG. 34 is a schematic view showing an example of a circuit disposition of the memory device 1 according to the third configuration example of the fourth embodiment. As shown in FIG. 34, the memory device 1 according to the third configuration example of the fourth embodiment includes the row decoder modules 16A and 16B having different associated blocks BLK. The row decoder module 16A according to the third configuration example of the fourth embodiment is connected to the stacked wiring of the lead region HR1. The row decoder module 16B according to the third configuration example of the fourth embodiment is connected to the stacked wiring of the lead region HR2.

In the third configuration example of the fourth embodiment, a plurality of elements constituting the row decoder RD of the row decoder module 16A are classified into a first element group 161A and a second element group 162A. Similarly, a plurality of elements constituting the row decoder RD of the row decoder module 16B are classified into a first element group 161B and a second element group 162B. For example, in the third configuration example of the fourth embodiment, the first element groups 161A and 161B are disposed on the first CMOS layer 100 (first substrate W1) and overlap the lead regions HR1 and HR2, respectively. The second element groups 162A and 162B are disposed on the second CMOS layer 200 (second substrate W2) and overlap the lead regions HR1 and HR2, respectively. Each of the first element groups 161A and 161B includes a transistor TR (HV transistor). Each of the second element groups 162A and 162B includes a block decoder BD.

As described above, in the third configuration example of the fourth embodiment, the row decoder RD includes at least one transistor provided on the first CMOS layer 100 and at least one transistor provided on the second CMOS layer 200. Assignment of the elements in the first element groups 161A and 161B and the elements in the second element groups 162A and 162B may be changed as appropriate. The sense amplifier module 17 according to the third configuration example of the fourth embodiment may be disposed on either the first substrate W1 or the second substrate W2.

[4-1-4] Fourth Configuration Example

Figure 35:
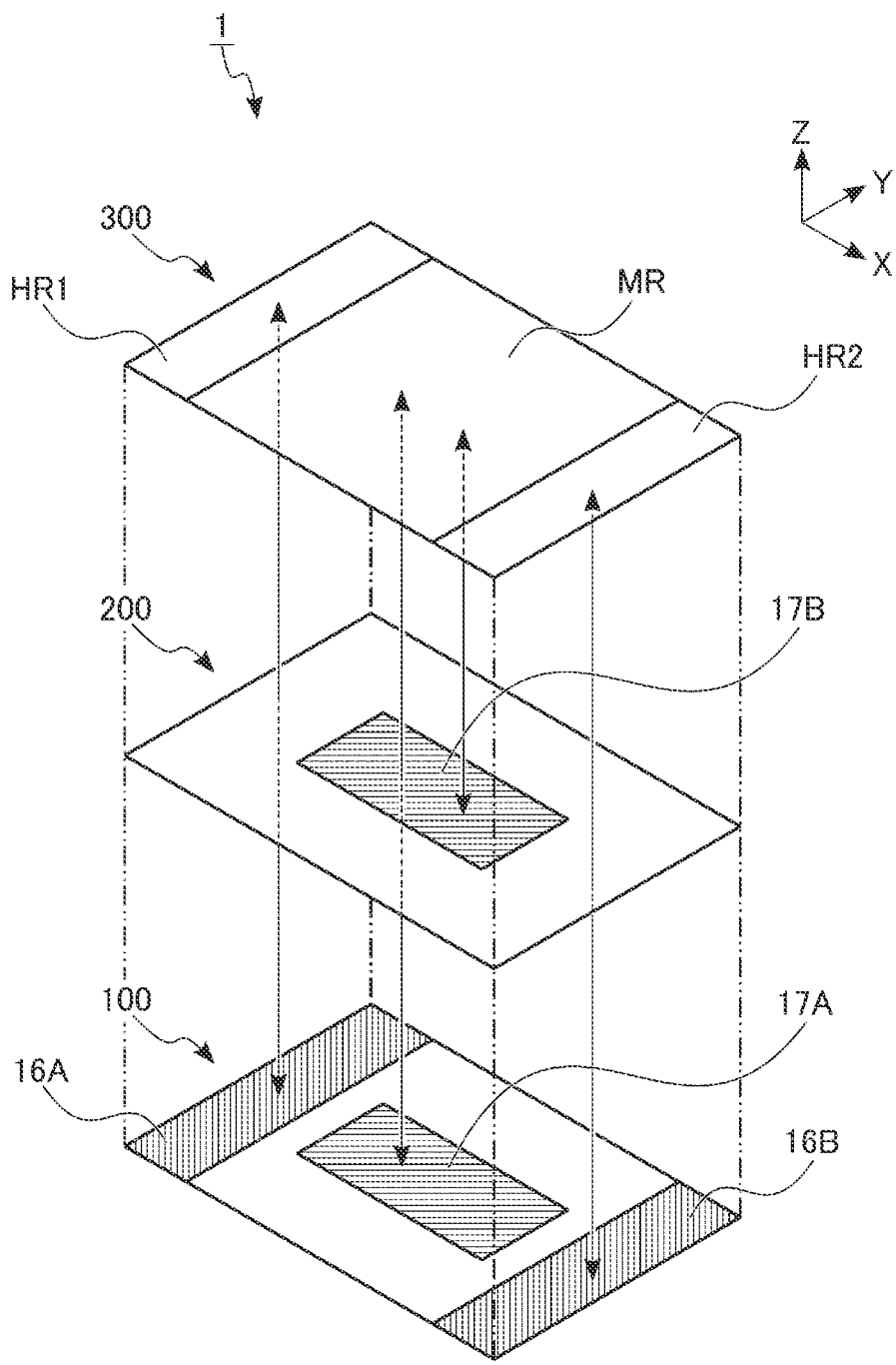
FIG. 35 depicts a fourth configuration example of a fourth embodiment.

FIG. 35 is a schematic view showing an example of a circuit disposition of the memory device 1 according to the fourth configuration example of the fourth embodiment. As shown in FIG. 35, the memory device 1 according to the fourth configuration example of the fourth embodiment includes sense amplifier modules 17A and 17B having different associated bit lines BL. The sense amplifier modules 17A and 17B according to the fourth configuration example of the fourth embodiment are disposed on the first CMOS layer 100 (first substrate W1) and the second CMOS layer 200 (second substrate W2), respectively, and are each connected to the associated bit line BL in the memory region MR.

That is, in the fourth configuration example of the fourth embodiment, the sense amplifier module 17 is disposed on each of the first substrate W1 and the second substrate W2. The sense amplifier module 17A and the associated bit line BL are connected to each other via the second substrate W2 and the second CMOS layer 200. The row decoder module 16 according to the fourth configuration example of the fourth embodiment may be disposed on either the first substrate W1 or the second substrate W2. In this example, the row decoder modules 16A and 16B are disposed on the first CMOS layer 100 (first substrate W1) and connected to stacked wirings of the lead regions HR1 and HA2, respectively.

A wiring of the input/output circuit 11 may be provided on each of the first substrate W1 and the second substrate W2, and the sense amplifier unit SAU may be disposed on each of the first substrate W1 and the second substrate W2 corresponding to the wiring of the input/output circuit 11.

[4-1-5] Fifth Configuration Example

Figure 36:
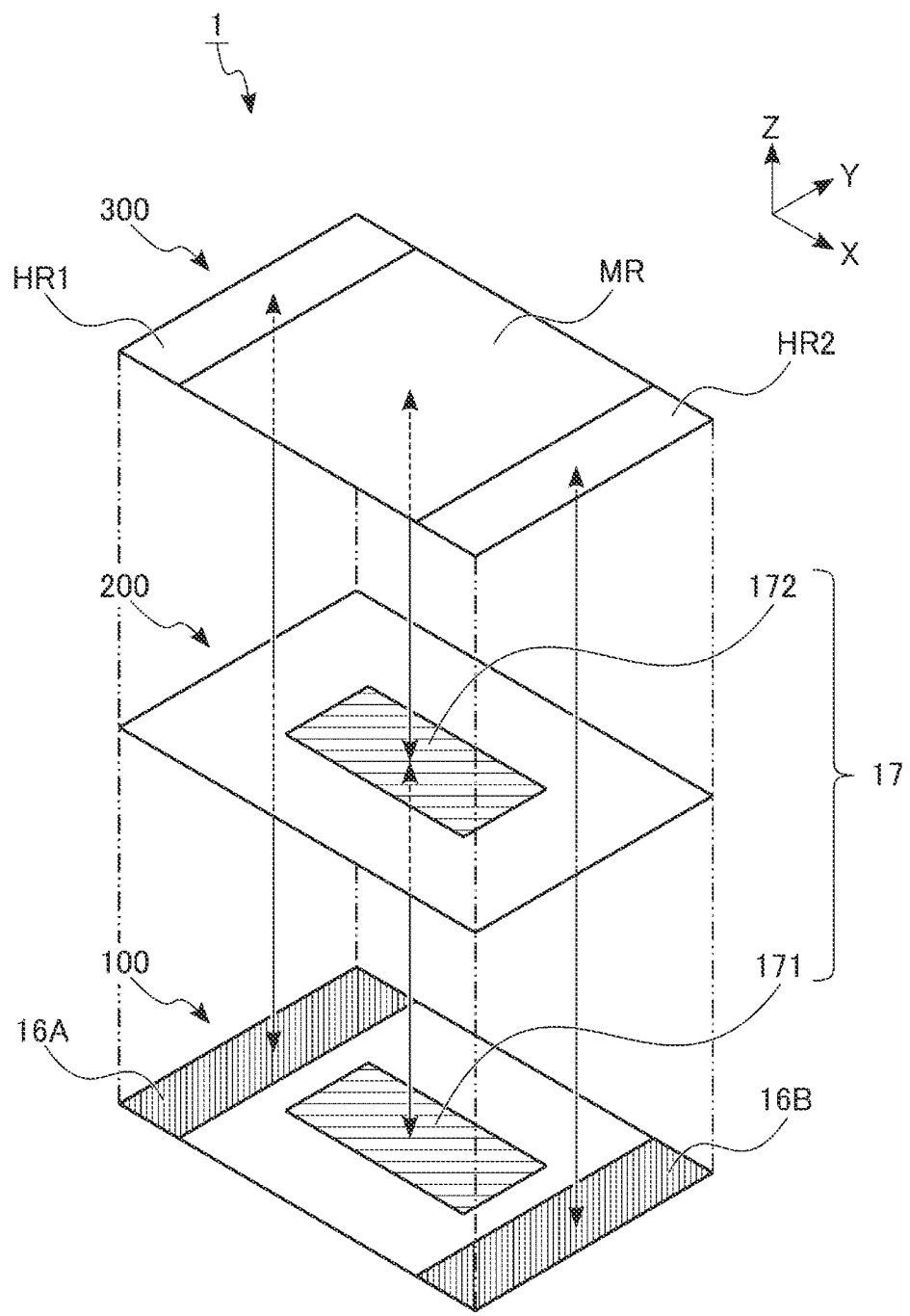
FIG. 36 depicts a fifth configuration example of a fourth embodiment.

FIG. 36 is a schematic view showing an example of a circuit disposition of the memory device 1 according to the fifth configuration example of the fourth embodiment. As shown in FIG. 36, the sense amplifier module 17 according to the fifth configuration example of the fourth embodiment is connected to the associated bit line BL in the memory region MR.

In the fifth configuration example of the fourth embodiment, a plurality of elements constituting the sense amplifier module 17 are classified into a first element group 171 and a second element group 172. For example, in the fifth configuration example of the fourth embodiment, the first element group 171 is disposed on the first CMOS layer 100 (first substrate W1), and the second element group 172 is disposed on the second CMOS layer 200 (second substrate W2). The first element group 171 includes a transistor of the bit line connector BLHU. The second element group 172 includes a transistor of the sense data latch SADL.

In the fifth configuration example of the fourth embodiment, the sense amplifier module 17 includes at least one transistor provided on the first CMOS layer 100 and at least one transistor provided on the second CMOS layer 200. The row decoder module 16 according to the fifth configuration example of the fourth embodiment may be disposed on the first substrate W1 or may be disposed on the second substrate W2. In this example, the row decoder modules 16A and 16B are disposed on the first CMOS layer 100 (first substrate W1) and connected to stacked wirings of the lead regions HR1 and HR2, respectively.

[4-1-6] Sixth Configuration Example

Figure 37:
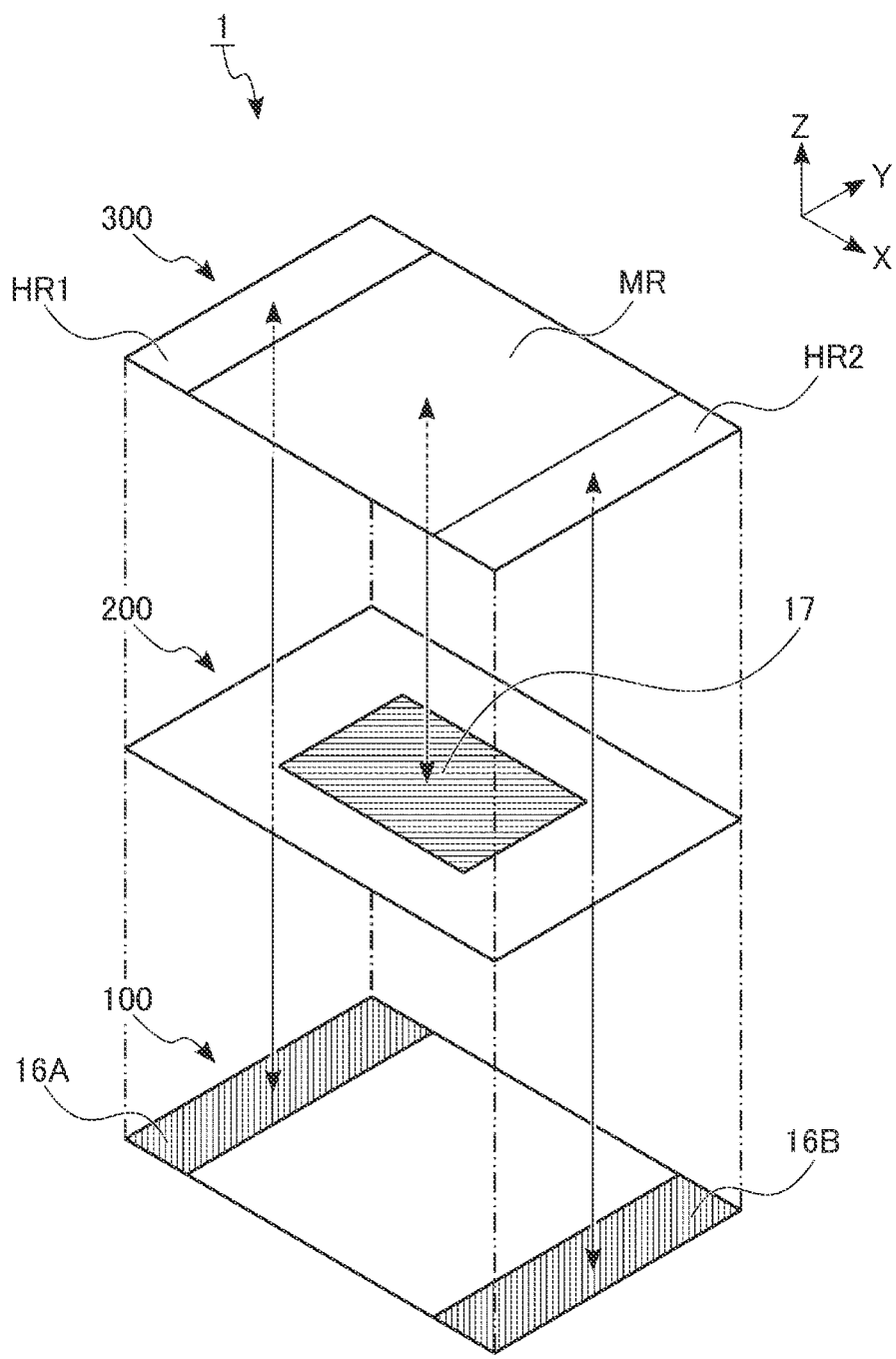
FIG. 37 depicts a sixth configuration example of a fourth embodiment.

FIG. 37 is a schematic view showing an example of a circuit disposition of the memory device 1 according to the sixth configuration example of the fourth embodiment. As shown in FIG. 37, in the memory device 1 according to the sixth configuration example of the fourth embodiment, the row decoder module 16 and the sense amplifier module 17 are disposed on different substrates. Specifically, in the sixth configuration example of the fourth embodiment, the row decoder modules 16A and 16B can be disposed on the first CMOS layer 100 (first substrate W1) to respectively overlap the lead regions HR1 and HR2. The sense amplifier module 17 can be disposed on the second CMOS layer 200 (second substrate W2) to overlap the memory region MR.

That is, in the sixth configuration example of the fourth embodiment, the row decoder module 16 includes a plurality of transistors provided on the first CMOS layer 100, and the sense amplifier module 17 includes a plurality of transistors provided on the second CMOS layer 200. The substrate on which the row decoder module 16 is disposed and the substrate on which the sense amplifier module 17 is disposed may be replaced.

[4-1-7] Seventh Configuration Example

Figure 38:
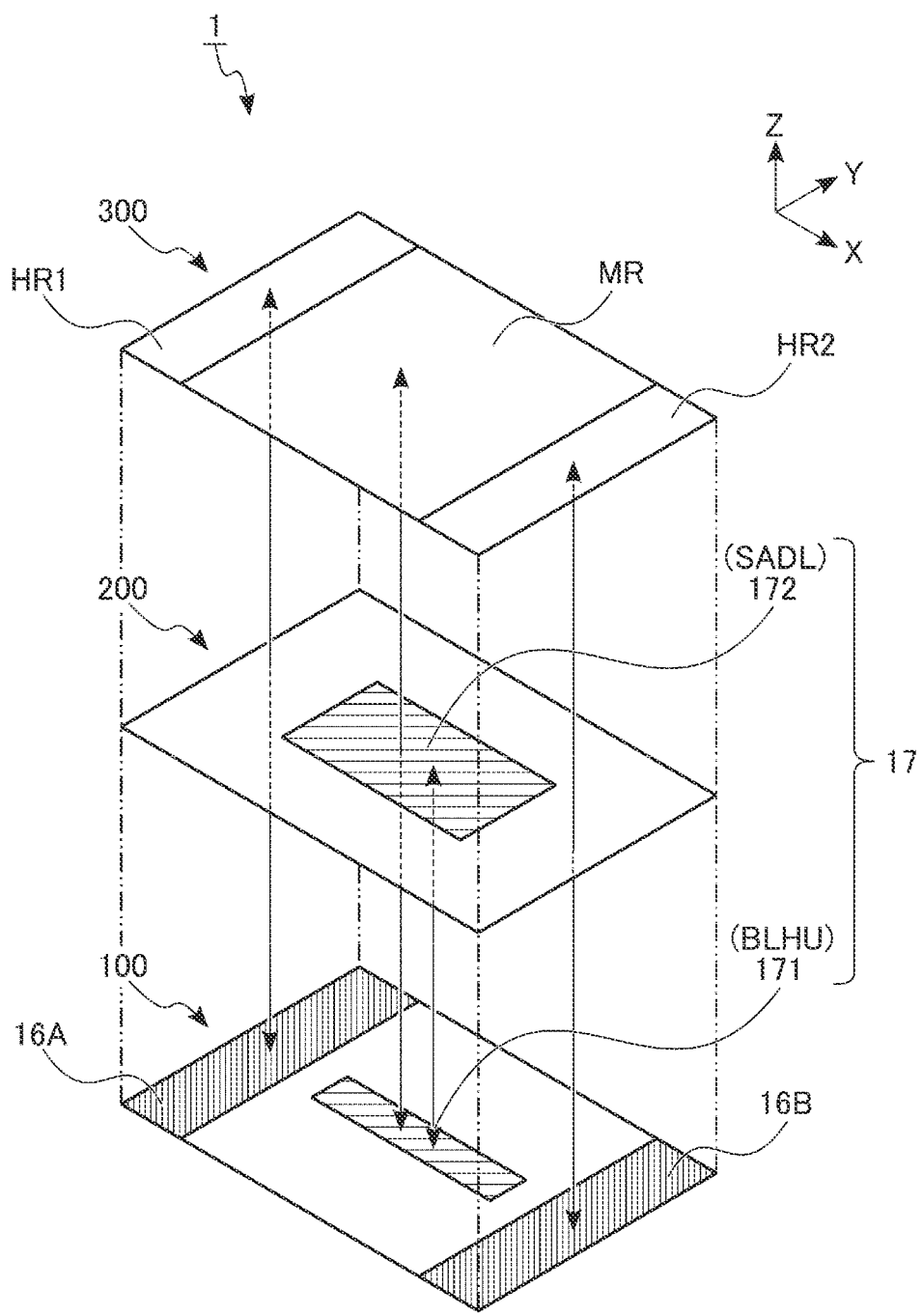
FIG. 38 depicts a seventh configuration example of a fourth embodiment.

FIG. 38 is a schematic view showing an example of a circuit disposition of the memory device 1 according to the seventh configuration example of the fourth embodiment. As shown in FIG. 38, in the memory device 1 according to the seventh configuration example of the fourth embodiment, the HV transistor and the LV transistor are disposed on different substrates. Specifically, in the seventh configuration example of the fourth embodiment, the HV transistor is disposed on the first CMOS layer 100 (first substrate W1), and the LV transistor is disposed on the second CMOS layer 200 (second substrate W2). The first CMOS layer 100 includes the row decoder modules 16A and 16B respectively overlapping the lead regions HR1 and HR2, and the first element group 171, which corresponds to the bit line connector BLHU, overlapping the memory region MR. The second CMOS layer 200 includes the second element group 172, which corresponds to the sense data latch SADL, overlapping the memory region MR.

In the seventh configuration example of the fourth embodiment, a structure of a gate electrode of a transistor can be changed between the substrate on which the HV transistor is disposed and the substrate on which the LV transistor is disposed. For example, a WSi gate structure, a W poly metal structure, or the like is applied to the gate electrode of the transistor provided on the substrate on which the HV transistor is disposed. In the present example, a salicide structure is applied to the gate electrode of the transistor provided on the substrate on which the LV transistor is disposed. Structures of gate electrodes of the first substrate W1 and the second substrate W2 can be designed (set) in accordance with a reduction in chip area, performance requirements of the input/output circuit 11, and the like.

An HV transistor having a WSi gate structure has a structure in which polysilicon (Poly-Si), tungsten silicide (WSi), and titanium nitride (TiN) are sequentially stacked as a gate electrode on a gate insulating film (oxide film), and silicon nitride (SiN) is formed as a cap layer on the gate electrode.

An HV transistor having a W poly metal structure has a structure in which polysilicon (Poly-Si), titanium nitride (TiN), tungsten nitride (WN), and tungsten (W) are sequentially stacked as a gate electrode on a gate insulating film (oxide film), and silicon nitride (SiN) is formed as a cap layer on the gate electrode. Such a gate electrode structure may be referred to as a W poly metal gate.

An LV transistor having a salicide structure has a structure in which, for example, polysilicon (Poly-Si) or nickel platinum silicide (NiPtSi) is formed as a gate electrode on a gate insulating film (oxide film). Such a gate electrode structure may be referred to as a NiPtSi gate.

[4-1-8] Eighth Configuration Example

Figure 39:
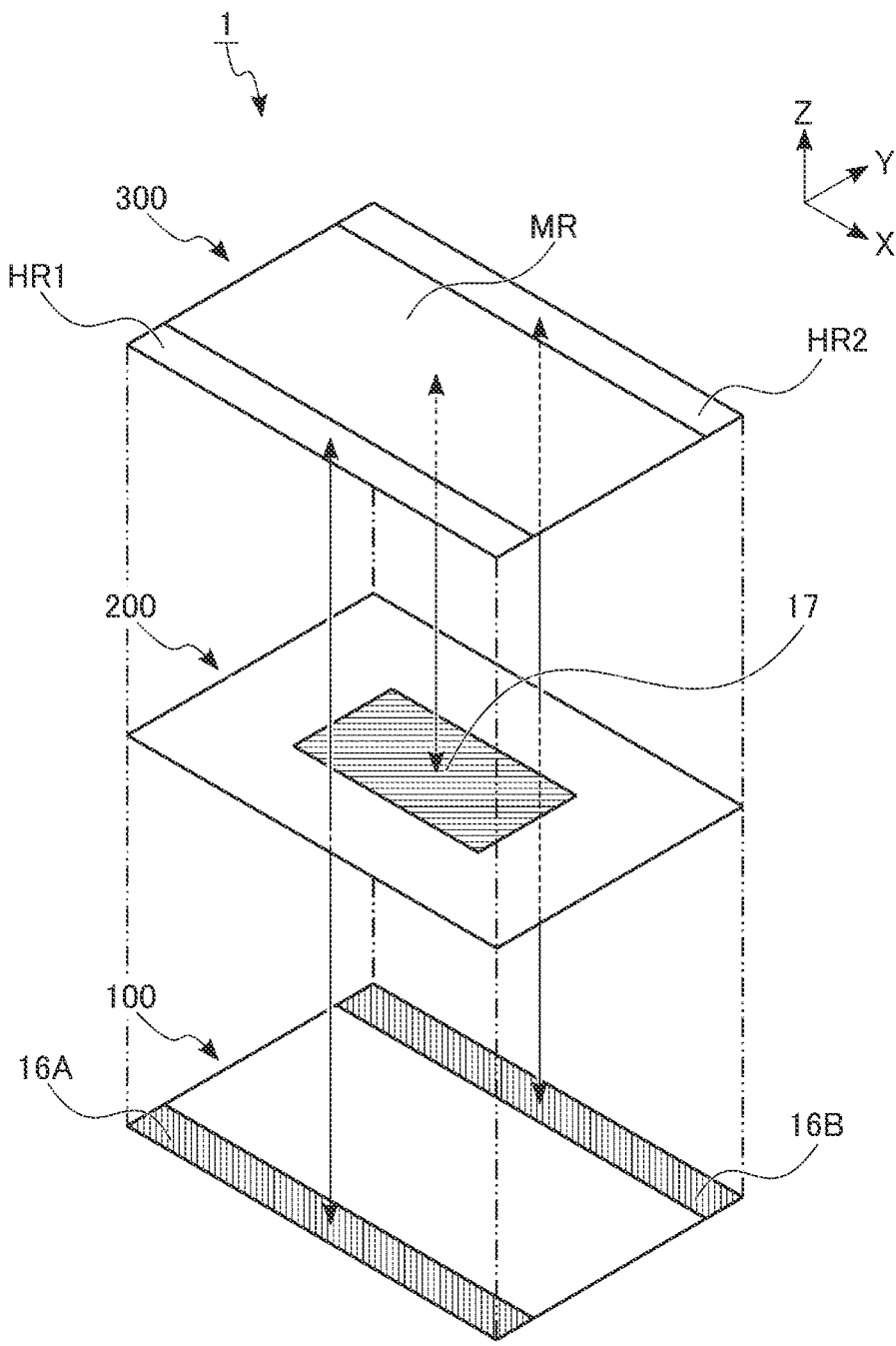
FIG. 39 depicts an eighth configuration example of a fourth embodiment.

FIG. 39 is a schematic view showing an example of a circuit disposition of the memory device 1 according to the eighth configuration example of the fourth embodiment. As shown in FIG. 39, the memory device 1 according to the eighth configuration example of the fourth embodiment has a configuration in which layouts of the memory cell array 10 and the row decoder module 16 are disposed by rotation by 90° with respect to the fifth configuration example of the fourth embodiment shown in FIG. 35. In the eighth configuration example of the fourth embodiment, the bit line BL extends in the X direction, and the word line WL extends in the Y direction. The lead regions HR1 and HR2 are disposed with the memory region MR interposed therebetween in the Y direction, and the row decoder modules 16A and 16B respectively overlap the lead regions HR1 and HR2.

[4-2] Effects of Fourth Embodiment

According to the memory device 1 in the fourth embodiment, as in the first embodiment, it is possible to reduce an increase in chip area and reduce the production cost of the memory device 1. Details of effects of the fourth embodiment will be described below.

Figure 40:
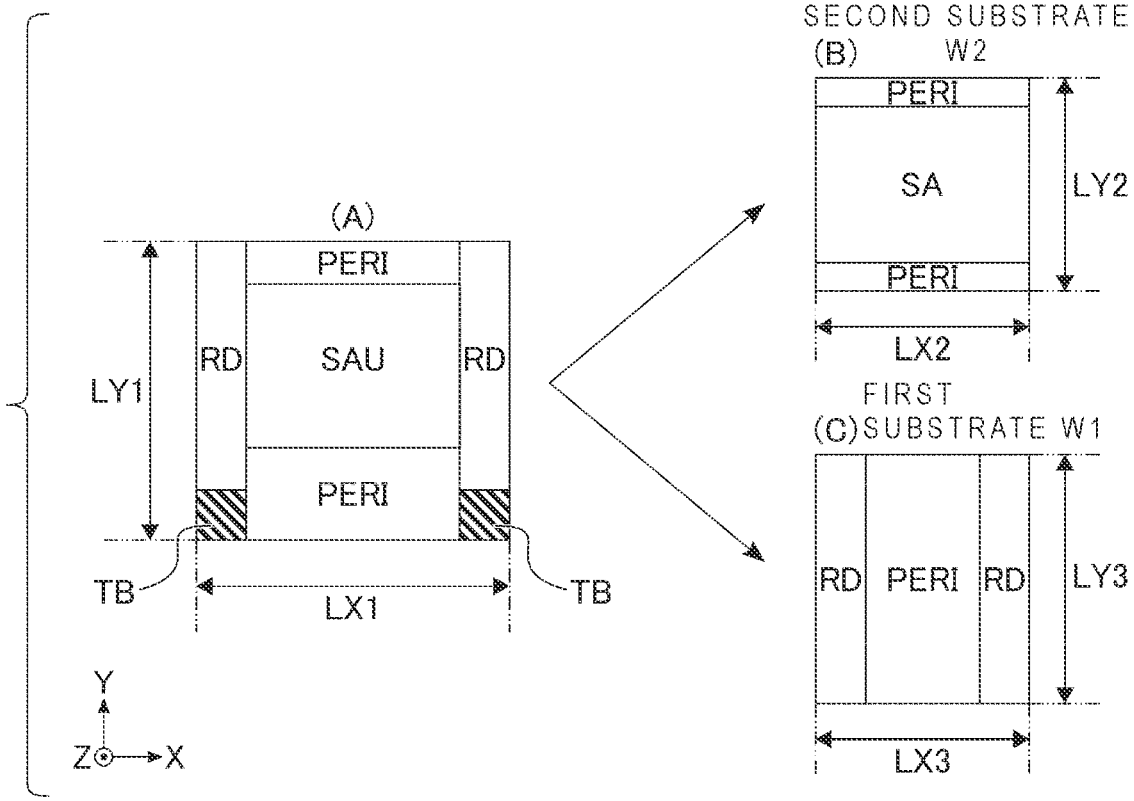
FIG. 40 depicts aspects related to a change in layout of a memory device obtained by applying a fourth embodiment.
Figure 41:
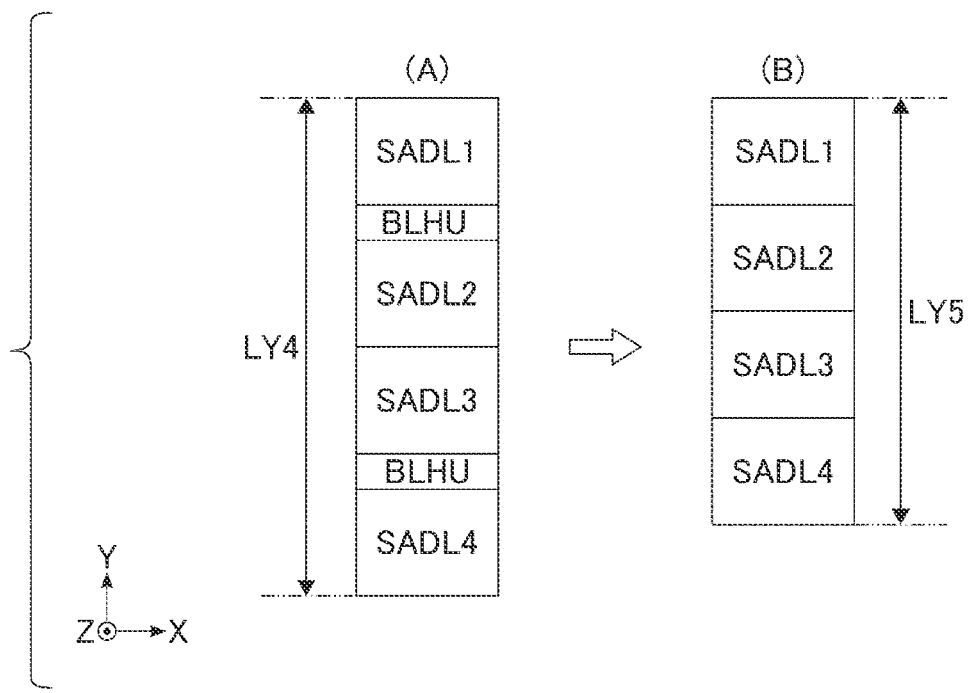
FIG. 41 depicts aspects related to a change in layout of a sense amplifier module obtained by applying the seventh configuration example of a fourth embodiment.

FIG. 40 is a schematic diagram showing an example of a change in layout of the memory device 1 obtained by applying the fourth embodiment. (A) of FIG. 40 shows an example of a layout of the memory device 1 when the sense amplifier unit SAU and the row decoder RD are formed on one substrate. (B) and (C) of FIG. 41 show an example of a layout of the memory device 1 when the fourth embodiment is applied.

As shown in (A) of FIG. 40, when a degree of integration of the memory cell array 10 increases, a width LY1 of the peripheral circuit region PERI and the sense amplifier module 17 in the Y direction may be larger than a width of the row decoder RD in the Y direction. A surplus region TB formed by the peripheral circuit region PERI protruding in the Y direction may be a factor of the chip area of the memory device 1.

On the other hand, when the fourth embodiment is applied, the row decoder module 16 and the sense amplifier module 17 are disposed on different substrates. Specifically, as shown in (B) of FIG. 40, in the second substrate W2 in which the sense amplifier unit SAU and a part of the peripheral circuit region PERI are disposed, a width in the X direction is LX2 and is smaller than LX1, and a width in the Y direction is LY2 and is smaller than LY1. As shown in (C) of FIG. 40, in the first substrate W1 in which the row decoder RD and a part of the peripheral circuit region PERI are disposed, a width in the X direction is LX3 and is smaller than LX1, and a width in the Y direction is LY3 and is smaller than LY1.

That is, in any of the first substrate W1 and the second substrate W2, the chip area can be reduced as compared with the case where the fourth embodiment is not applied. In the memory device 1, the generation of the surplus region TB can be prevented by overlapping the first substrate W1 and the second substrate W2. Therefore, in the memory device 1 according to the fourth embodiment, a total area of the first CMOS layer 100 and the second CMOS layer 200 can be prevented from being larger than an area of the memory layer 300 even when the degree of integration of the memory cell array 10 increases. As a result, according to the memory device 1 in the fourth embodiment, it is possible to reduce the chip area and reduce the production cost of the memory device 1.

FIG. 41 is a schematic diagram showing an example of a change in layout of the sense amplifier module 17 obtained by applying the seventh configuration example of the fourth embodiment. (A) of FIG. 41 shows an example of a layout of the memory device 1 when the sense amplifier unit SAU is formed on one substrate. (B) of FIG. 41 shows an example of a layout of the memory device 1 when the seventh configuration example of the fourth embodiment is applied.

As shown in (A) of FIG. 41, sense data latches SADL and bit line connectors BLHU are disposed side by side in the Y direction (the extending direction of the bit line BL), for example. Specifically, four sense data latches SADL1 to SADL4 are arranged in the Y direction. A bit line connector BLHU associated with these SADL is disposed between the sense data latches SADL1 and SADL2. A bit line connector BLHU associated with these SADL is disposed between the sense data latches SADL3 and SADL4. In this example, a width in the Y direction to arrange the sense data latches SADL1 to SADL4 is LY4.

If the seventh configuration example of the fourth embodiment is applied, the sense data latch SADL and the bit line connector BLHU are formed on different substrates. As a result, as shown in (B) of FIG. 41, the bit line connector BLHU is omitted (formed on a different substrate). Therefore, a width in the Y direction to arrange the sense data latches SADL1 to SADL4 is LY5 and is smaller than LY4. That is, in the seventh configuration example of the fourth embodiment, the width in the Y direction of the sense data latches SADL disposed on the second substrate W2 can be reduced.

Figure 42:
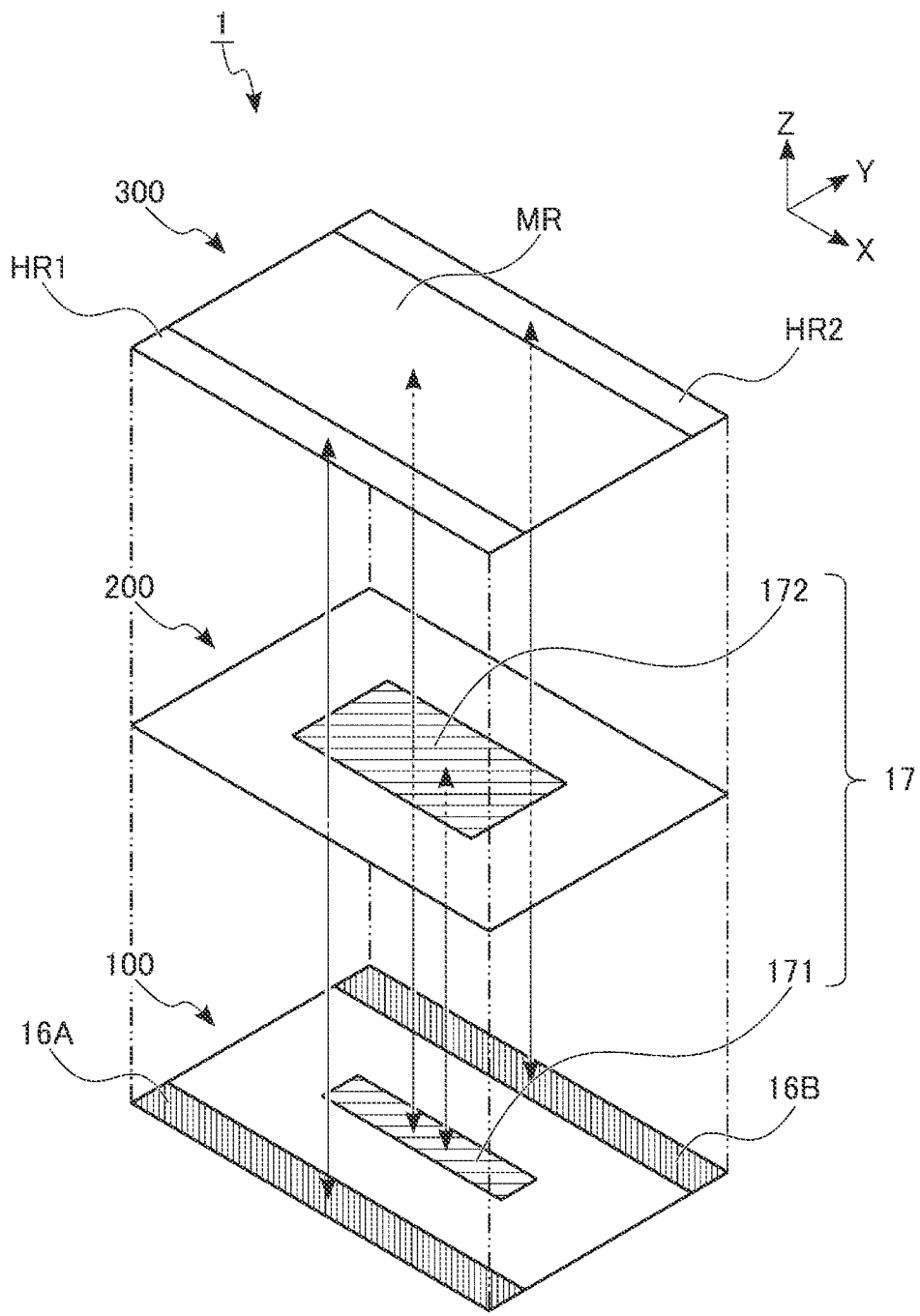
FIG. 42 depicts an example of a layout of a memory device obtained when the seventh configuration example and the eighth configuration example of the fourth embodiment are combined with each other.

For example, a width of the memory device 1 in the X direction is limited to a width of the sense amplifier module 17 in the X direction, and a width of the memory device 1 in the Y direction is limited to a width of the row decoder module 16 in the Y direction. FIG. 42 is a schematic diagram showing an example of a layout of the memory device 1 obtained when the seventh configuration example and the eighth configuration example of the fourth embodiment are combined with each other. As shown in FIG. 42, by aligning limiting directions of the sense amplifier module 17 and the row decoder module 16, the CMOS circuits can be disposed efficiently. Therefore, by combining the seventh configuration example and the eighth configuration example of the fourth embodiment with each other, the CMOS circuit can be disposed efficiently, and the generation of the surplus region TB can be prevented.

In the seventh configuration example of the fourth embodiment, the structure of the gate electrode can be changed between an LV transistor and an HV transistor. As a result, in the seventh configuration example of the fourth embodiment, performance required for each of the LV transistor and the HV transistor can be more easily optimized. By dividing the substrate on which the LV transistor is formed and the substrate on which the HV transistor is formed, a parasitic capacitance caused by the contact CS in the LV transistor can be reduced. As a result, in the seventh configuration example of the fourth embodiment, operation performance of the memory device 1 can be improved. In the HV transistor, since an effect of the electric field propagated from the wiring layers D1 to D3 is reduced, a variation in on-state current can be reduced.

[5] Fifth Embodiment

A fifth embodiment relates to a structure of a passive element that can be formed in the memory device 1. Details of the fifth embodiment will be described below.

[5-1] Structure of Memory Device

The memory device 1 according to the fifth embodiment includes passive elements configured by combining the structure of the first CMOS layer 100 and the structure of the second CMOS layer 200. The passive elements described in the fifth embodiment are a resistance element and a capacitive element. In the fifth embodiment, a case where the seventh configuration example of the fourth embodiment is applied and the first substrate W1 is provided with an HV transistor and the second substrate W2 is provided with an LV transistor will be described.

[5-1-1] Planar Layout of First CMOS Layer 100

Figure 43:
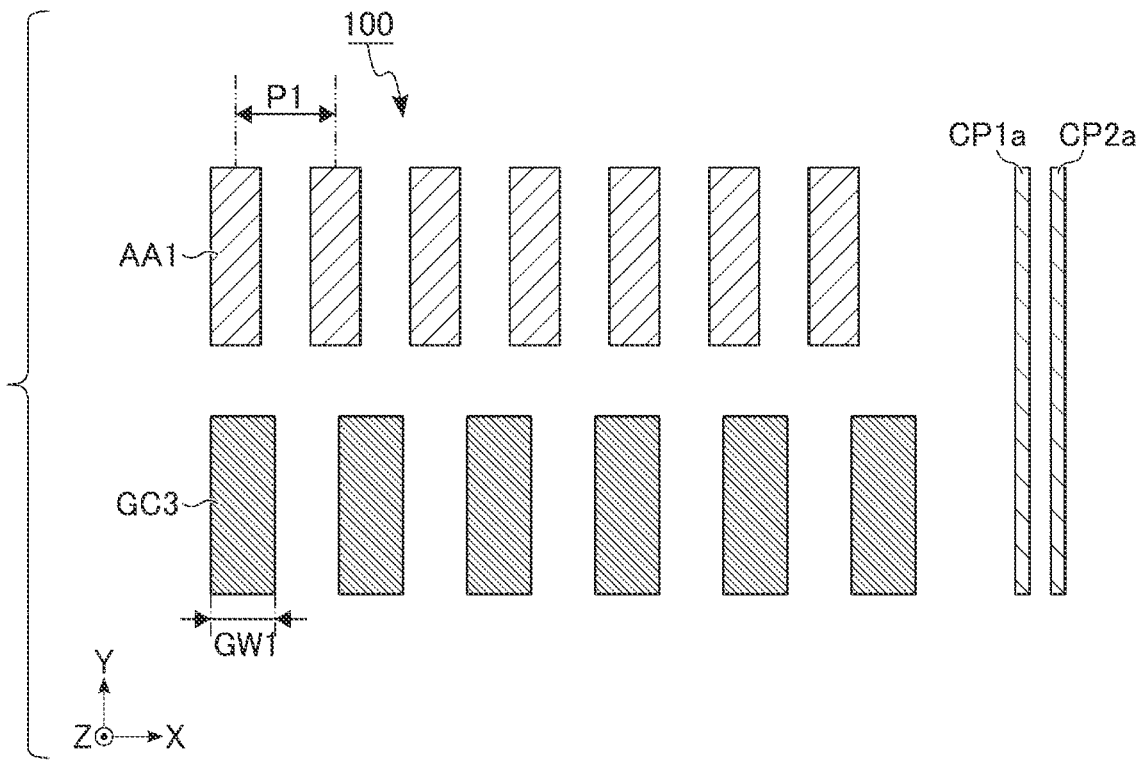
FIG. 43 is a plan view showing an example of a planar layout of a first CMOS layer in a memory device according to a fifth embodiment.

FIG. 43 is a plan view showing an example of a planar layout of the first CMOS layer 100 in the memory device 1 according to the fifth embodiment, and also shows an impurity diffusion region (active region) formed in the first substrate W1. As shown in FIG. 43, the first CMOS layer 100 includes a plurality of active regions AA1, a plurality of conductor layers GC3, and conductor units CP1a and CP2a.

The plurality of active regions AA1 are arranged in the X direction at a first pitch P1. Each active region AA1 may be either a P-type impurity diffusion region or an N-type impurity diffusion region formed in the first substrate W1.

Although not shown, an STI is provided around each active region AA1. The plurality of conductor layers GC3 are arranged in the X direction. Each conductor layer GC3 has a stacked structure similar to that of the gate electrode (conductor layer GC1) of the transistor formed using the first substrate W1. The conductor layer GC3 has a gate width GW1. The conductor units CP1a and CP2a have portions extending in the same direction. In this example, each of the conductor units CP1a and CP2a extends in the Y direction.

[5-1-2] Planar Layout of Second CMOS Layer 200

Figure 44:
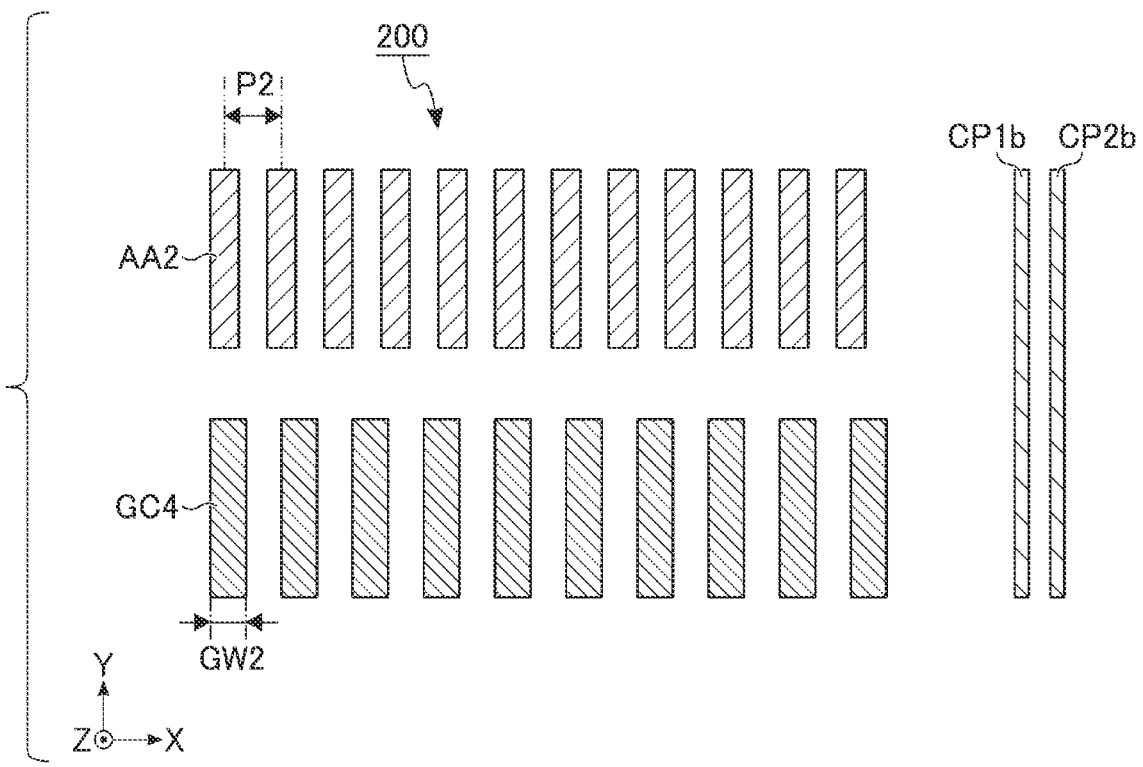
FIG. 44 is a plan view showing an example of a planar layout of a second CMOS layer in a memory device according to a fifth embodiment.

FIG. 44 is a plan view showing an example of a planar layout of the second CMOS layer 200 in the memory device 1 according to the fifth embodiment, and also shows an impurity diffusion region (active region) formed in the second substrate W2. As shown in FIG. 44, the second CMOS layer 200 includes a plurality of active regions AA2, a plurality of conductor layers GC4, and conductor units CP1b and CP2b.

The plurality of active regions AA2 are arranged in the X direction at a second pitch P2 smaller than the first pitch P1. Each active region AA2 may be either a P-type impurity diffusion region or an N-type impurity diffusion region formed in the second substrate W2. Although not shown, an STI is provided around each active region AA2. The plurality of conductor layers GC4 are arranged in the X direction. Each conductor layer GC4 has a stacked structure similar to that of the gate electrode (conductor layer GC2) of the transistor formed using the second substrate W2. The conductor layer GC4 can have a gate width GW2 smaller than the gate width GW1. The conductor units CP1b and CP2b have portions extending in the same direction. In this example, each of the conductor units CP1b and CP2b extends in the Y direction. The conductor units CP1b and CP2b respectively overlap the conductor units CP1a and CP2a.

[5-1-3] Cross-sectional Structure of Memory Device 1

Figure 45:
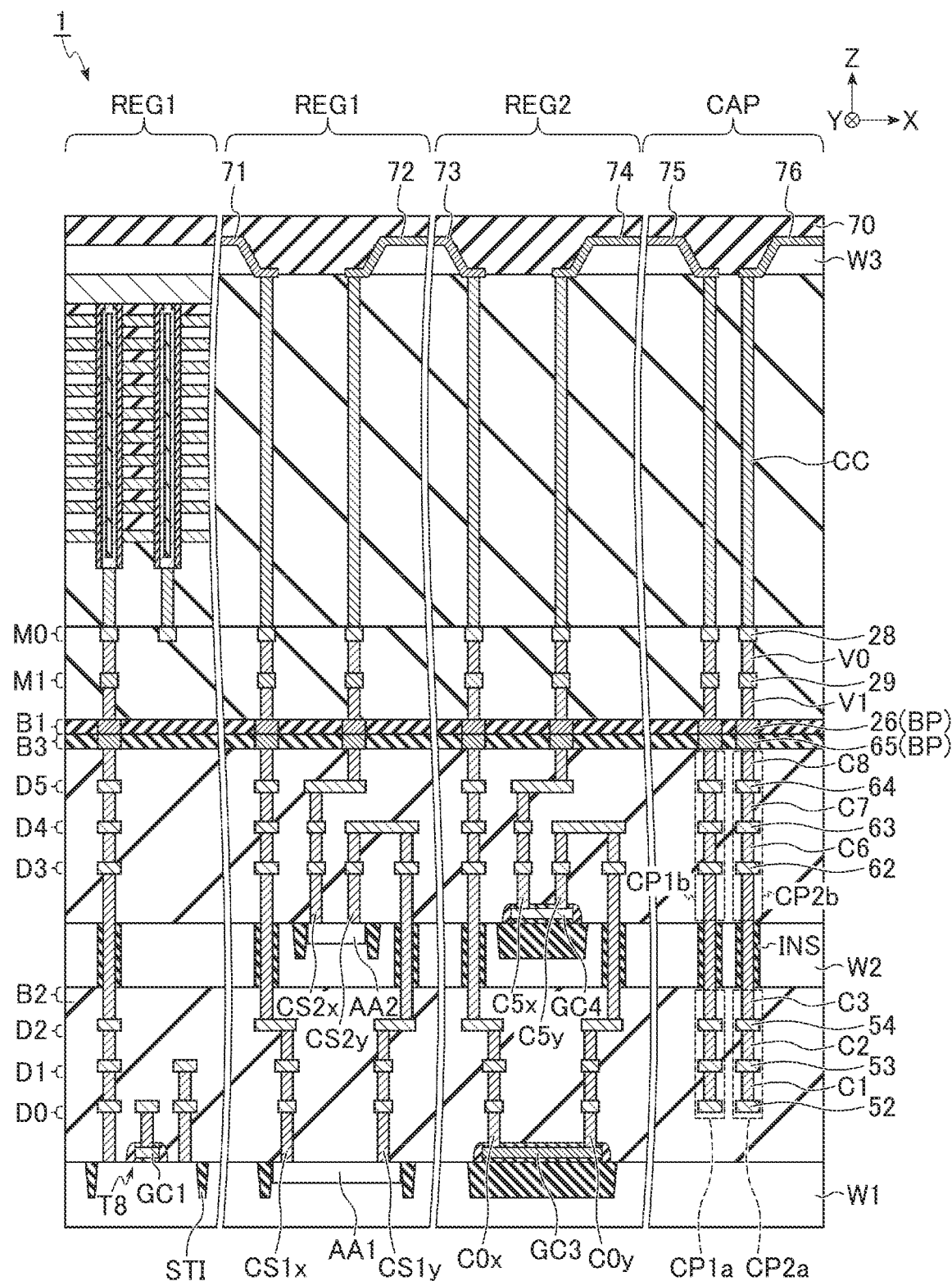
FIG. 45 is a cross-sectional view of a memory device according to a fifth embodiment.

FIG. 45 is a cross-sectional view showing an example of a cross-sectional structure of the memory device 1 according to the fifth embodiment, and shows a cross-sectional structure of the memory region MR and a cross-sectional structure of a region in which passive elements are formed. As shown in FIG. 45, a structure in the memory region MR is similar to the structure described with reference to FIG. 13 in the first embodiment. The memory device 1 further includes a region in which a resistance element REG1 is formed, a region in which a resistance element REG2 is formed, and a region in which a capacitive element CAP is formed. In addition, the memory device 1 includes conductor layers 71 to 76 and contacts CS1x, CS1y, CS2x, CS2y, C0x, C0y, C5x, and C5y in regions in which the resistance elements REG1 and REG2 and the capacitive element CAP are formed.

The conductor layers 71 to 76 can be provided between the third substrate W3 and the insulator layer 70. Each of the conductor layers 71 to 76 is connected to the conductor layer 28 of the wiring layer M0 via, for example, a contact CC. The conductor layers 71 and 72 are wirings corresponding to one end and the other end of the resistance element REG1, respectively. The conductor layers 73 and 74 are wirings corresponding to one end and the other end of the resistance element REG2, respectively. The conductor layers 75 and 76 are wirings respectively corresponding to one end and the other end of the capacitive element CAP.

The resistance element REG1 has, for example, a structure in which the active regions AA1 and AA2 are connected in series. Specifically, the contacts CS1x and CS1y are connected to one end portion and the other end portion of the active region AA1, respectively. The contacts CS2x and CS2y are connected to one end portion and the other end portion of the active region AA2, respectively. The contact CS1x is connected to the conductor layer 71 via, for example, the conductor layers 28, 29, 52 to 54, and 62 to 64, the contacts C1 to C3, C6 to C8, V0, V1, and CC, and the bonding pads BP bonded to each other. The contact CS1y is connected to the contact CS2y via, for example, the conductor layers 52 to 54, 62, and 63 and the contacts C1 to C3 and C6. The contact CS2x is connected to the conductor layer 72 via the conductor layers 28, 29, and 62 to 64, the contacts C6 to C8, V0, V1, and CC, and the bonding pads BP bonded to each other. The resistance element REG1 may have a structure in which the plurality of active regions AA1 are connected in series, or may have a structure in which the plurality of active regions AA2 are connected in series. The resistance element REG1 may have a structure in which the active regions AA1 and AA2 are connected in parallel. The resistance element REG1 may have a structure including at least the active region AA1 provided in the first substrate W1 and the active region AA2 provided in the second substrate W2.

The resistance element REG2 has, for example, a structure in which the conductor layers GC3 and GC4 are connected in series. Specifically, the contacts C0x and C0y are connected to one end portion and the other end portion of the conductor layer GC3, respectively. The contacts C5x and C5y are connected to one end portion and the other end portion of the conductor layer GC4, respectively. The contact C0x is connected to the conductor layer 73 via the conductor layers 28, 29, 52 to 54, and 62 to 64, the contacts C1 to C3, C6 to C8, V0, V1, and CC, and the bonding pads BP bonded to each other. The contact C0y is connected to the contact C5y via the conductor layers 52 to 54, 62, and 63 and the contacts C1 to C3 and C6. The contact C5x is connected to the conductor layer 74 via the conductor layers 28, 29, and 62 to 64, the contacts C6 to C8, V0, V1, and CC, and the bonding pads BP bonded to each other. The resistance element REG2 may have a structure in which the plurality of conductor layers GC3 are connected in series or may have a structure in which the plurality of conductor layers GC4 are connected in series. The resistance element REG2 may have a structure in which the conductor layers GC3 and GC4 are connected in parallel. The resistance element REG2 may have a structure including at least the conductor layer GC3 provided on the first substrate W1 and the conductor layer GC4 provided on the second substrate W2. In this example, each of the conductor layers GC3 and GC4 is provided above the STI. As described above, each of the conductor layers GC3 and GC4 may be provided above an insulator embedded in a vicinity of a substrate surface.

The capacitive element CAP can have a structure in which a portion in which the conductor units CP1a and CP1b are connected in series and a portion in which the conductor units CP2a and CP2b are connected in series are disposed in parallel. Specifically, the conductor layer 75, a set including the conductor layers 52 to 54 and the contacts C1 to C3 corresponding to the conductor unit CP1a, a set including the conductor layers 62 to 64 and the contacts C6 to C8 corresponding to the conductor unit CP1b, the conductor layers 28 and 29, and the contacts V0, V1, and CC are connected in series. The conductor layer 76, a set including the conductor layers 52 to 54 and the contacts C1 to C3 corresponding to the conductor unit CP2a, a set including the conductor layers 62 to 64 and the contacts C6 to C8 corresponding to the conductor unit CP2b, the conductor layers 28 and 29, and the contacts V0, V1, and CC are connected in series. A structure including conductor layers and contacts via the first CMOS layer 100, the second CMOS layer 200, and the memory layer 300, which are connected to the conductor layer 75, and a structure including conductor layers and contacts via the first CMOS layer 100, the second CMOS layer 200, and the memory layer 300, which are connected to the conductor layer 76, face each other, thereby functioning as capacitive elements. A plurality of capacitive elements CAP may be connected in parallel. Each capacitive element CAP may have at least the structure of the first CMOS layer 100 and the structure of the second CMOS layer 200.

In the above description, although the case where the resistance elements REG1 and REG2 and the capacitive element CAP are provided based on the structure of the memory device 1 described in the first embodiment has been exemplified, the disclosure is not limited thereto. A structure of each of the resistance elements REG1 and REG2 and the capacitive element CAP may be formed using any of the second embodiment and the third embodiment. In this case, a set including two bonding pads BP for bonding the first substrate W1 and the second substrate W2 is added between the first substrate W1 and the second substrate W2.

[5-2] Effects of Fifth Embodiment

As described above, the memory device 1 according to the fifth embodiment includes passive elements across a plurality of substrates. For example, the resistance elements are connected in series via the TSV between the first substrate W1 and the second substrate W2. The capacitive elements are connected in parallel via the TSV between the first substrate W1 and the second substrate W2. In the fifth embodiment, areas of the CMOS circuits formed on the first substrate W1 and the second substrate W2 are equal to or less than an area of the memory cell array 10. In the first substrate W1 and the second substrate W2, the passive elements described in the fifth embodiment are disposed in portions where the CMOS circuits are not formed.

Accordingly, according to the memory device 1 in the fifth embodiment, it is possible to reduce an area for forming the passive element and reduce the chip area. As a result, according to the memory device 1 in the fifth embodiment, it is possible to reduce the production cost of the memory device 1.

According to the memory device 1 in the fifth embodiment, the passive element can be flexibly disposed according to the areas dedicated to the CMOS circuits on the first substrate W1 and the second substrate W2. For example, when the area of the CMOS circuit on the first substrate W1 is smaller than the area of the CMOS circuit on the second substrate W2, a total area of the plurality of active regions AA1 is designed to be larger than a total area of the plurality of active regions AA2. On the other hand, when the area of the CMOS circuit on the first substrate W1 is larger than the area of the CMOS circuit on the second substrate W2, the total area of the plurality of active regions AA1 is designed to be smaller than the total area of the plurality of active regions AA2. As a result, according to the memory device 1 in the fifth embodiment, the CMOS circuits and the passive elements can be efficiently disposed on the first substrate W1 and the second substrate W2, and the chip area can be reduced.

In the fifth embodiment, a WSi gate structure is used as the gate electrode of the first substrate W1 on which the HV transistor is disposed, and a Ti/TiN/W or NiPtSi gate structure is used as the gate electrode of the second substrate W2 on which the LV transistor is disposed. Accordingly, areas of the passive elements can be reduced and Hump can be reduced. Thus, in the fifth embodiment, it is preferable to select the stacked structure of the gate electrode according to the purpose.

[6] Sixth Embodiment

A memory device 1c according to a sixth embodiment has a configuration in which a plurality of substrates provided with memory circuits and a plurality of substrates provided with CMOS circuits are stacked. Details of the sixth embodiment will be described below.

[6-1] Appearance of Memory Device 1c

Figure 46:
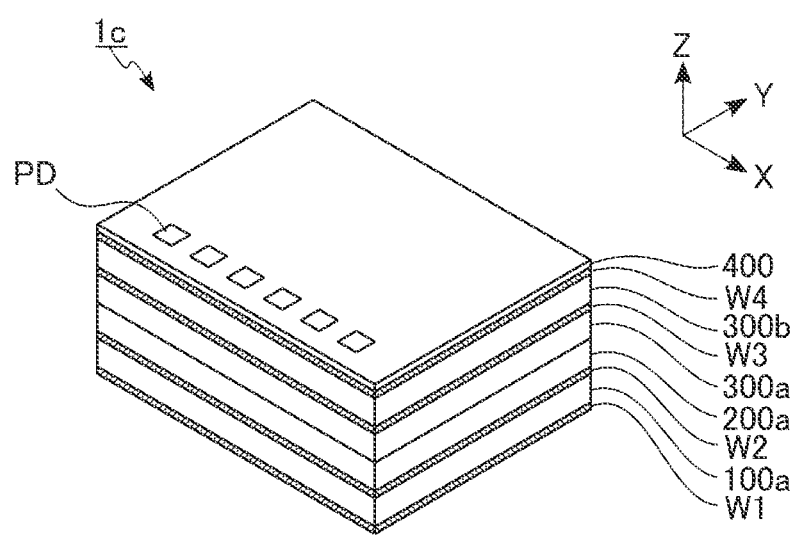
FIG. 46 is a perspective view showing an example of an appearance of a memory device according to a sixth embodiment.

FIG. 46 is a perspective view showing an example of an appearance of the memory device 1c according to the sixth embodiment. As shown in FIG. 46, the memory device 1c has a structure in which the first substrate W1, the first CMOS layer 100a, the second substrate W2, a second CMOS layer 200a, a first memory layer 300a, the third substrate W3, a second memory layer 300b, a fourth substrate W4, and the wiring layer 400 are stacked in this order from the bottom.

The first CMOS layer 100a includes a CMOS circuit formed using the first substrate W1. The second CMOS layer 200a includes a CMOS circuit formed using the second substrate W2. Each of the first CMOS layer 100a and the second CMOS layer 200a includes the input/output circuit 11, the logic controller 12, the register circuit 13, the sequencer 14, the driver circuit 15, the row decoder module 16, and the sense amplifier module 17. These circuits are disposed on either the first CMOS layer 100a or the second CMOS layer 200a. These circuits may be formed by a combination of transistors disposed on the first CMOS layer 100a and transistors disposed on the second CMOS layer 200a.

The first memory layer 300a includes the memory cell array 10 formed using the third substrate W3. The second memory layer 300b includes the memory cell array 10 formed using the fourth substrate W4. Each of the first memory layer 300a and the second memory layer 300b may include a plurality of memory cell arrays 10. The wiring layer 400 includes, as in the first embodiment, a plurality of pads PD used for connection between the memory device 1c and the memory controller 2.

Each of the first substrate W1, the second substrate W2, the third substrate W3, and the fourth substrate W4 is a silicon substrate. Each of the first substrate W1, the second substrate W2, the third substrate W3, and the fourth substrate W4 has an impurity diffusion region corresponding to a circuit design of the memory device 1c. The memory device 1c has a bonding surface between adjacent substrates. In the memory device 1c, each of a contact (boundary) portion between the first CMOS layer 100a and the second substrate W2, a contact (boundary) portion between the second CMOS layer 200a and the first memory layer 300a, and a contact (boundary) portion between the third substrate W3 and the second memory layer 300b corresponds to a bonding surface. A structure in the second embodiment or the third embodiment may be applied to the bonding surface between the first substrate W1 and the second substrate W2.

[6-2] Circuit Disposition of Memory Device 1c

Hereinafter, as variations of the circuit disposition of the memory device 1c, a first configuration example and a second configuration example of the sixth embodiment will be described in order.

[6-2-1] First Configuration Example

Figure 47:
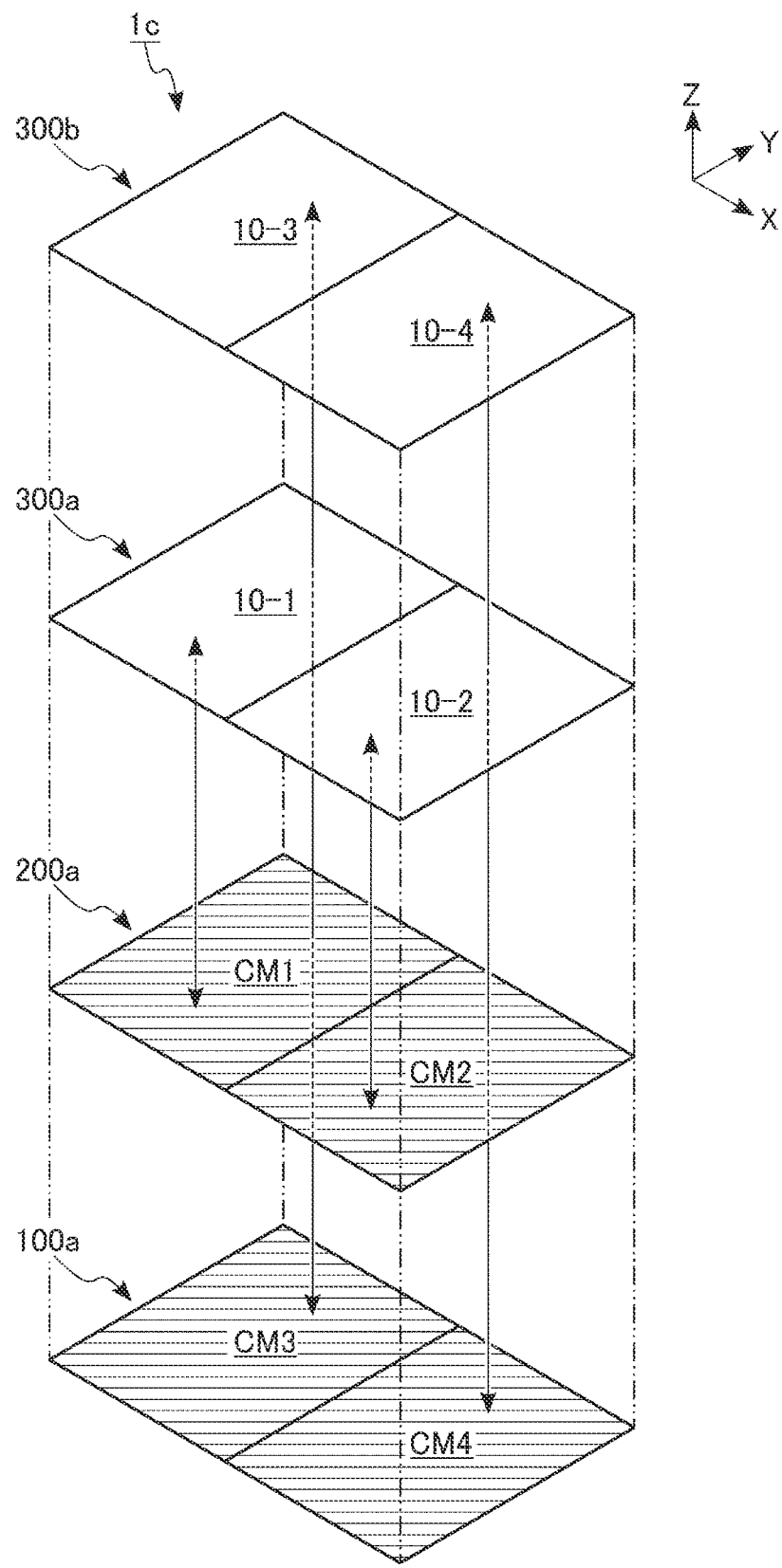
FIG. 47 depicts a first configuration example of the sixth embodiment.

FIG. 47 is a schematic view showing an example of a circuit disposition of a memory device according to the first configuration example of the sixth embodiment. As shown in FIG. 47, the memory device 1c according to the first configuration example of the sixth embodiment includes four memory cell arrays 10-1 to 10-4 and four CMOS circuit units CM1 to CM4. The memory cell arrays 10-1 to 10-4 are controlled by the CMOS circuit units CM1 to CM4, respectively.

Each memory cell array 10 has, for example, a structure of the memory region MR and the lead region HR as described in the first embodiment. Each CMOS circuit unit CM includes a circuit for controlling the associated memory cell array 10. Each CMOS circuit unit CM includes at least the row decoder module 16 and the sense amplifier module 17. Disposition of the CMOS circuits other than the row decoder module 16 and the sense amplifier module 17 (the sequencer 14, the driver circuit 15, and the like) may be appropriately changed according to the design of the memory device 1c.

The memory cell arrays 10-1 and 10-2 according to the first configuration example of the sixth embodiment are disposed on the first memory layer 300a and arranged in the X direction. The memory cell arrays 10-3 and 10-4 according to the first configuration example of the sixth embodiment are disposed on the second memory layer 300b and arranged in the X direction. The CMOS circuit units CM1 and CM2 according to the first configuration example of the sixth embodiment are disposed on the second CMOS layer 200a and arranged in the X direction. The CMOS circuit units CM3 and CM4 according to the first configuration example of the sixth embodiment are disposed on the first CMOS layer 100a and arranged in the X direction. In the first configuration example of the sixth embodiment, the memory cell arrays 10-1 and 10-3 overlap the CMOS circuit units CM1 and CM3 in the Z direction. Similarly, the memory cell arrays 10-2 and overlap the CMOS circuit units CM2 and CM4 in the Z direction.

In the first configuration example of the sixth embodiment, a set including the memory cell array 10-1 and the CMOS circuit unit CM1 and a set including the memory cell array 10-2 and the CMOS circuit unit CM2 are disposed adjacent to each other in the X direction. The set (group) including the memory cell array 10-1 and the CMOS circuit unit CM1 is disposed between the memory cell array 10-3 and the CMOS circuit unit CM3. Similarly, the set (group) including the memory cell array 10-2 and the CMOS circuit unit CM2 is disposed between the memory cell array 10-4 and the CMOS circuit unit CM4.

[6-2-2] Second Configuration Example

Figure 48:
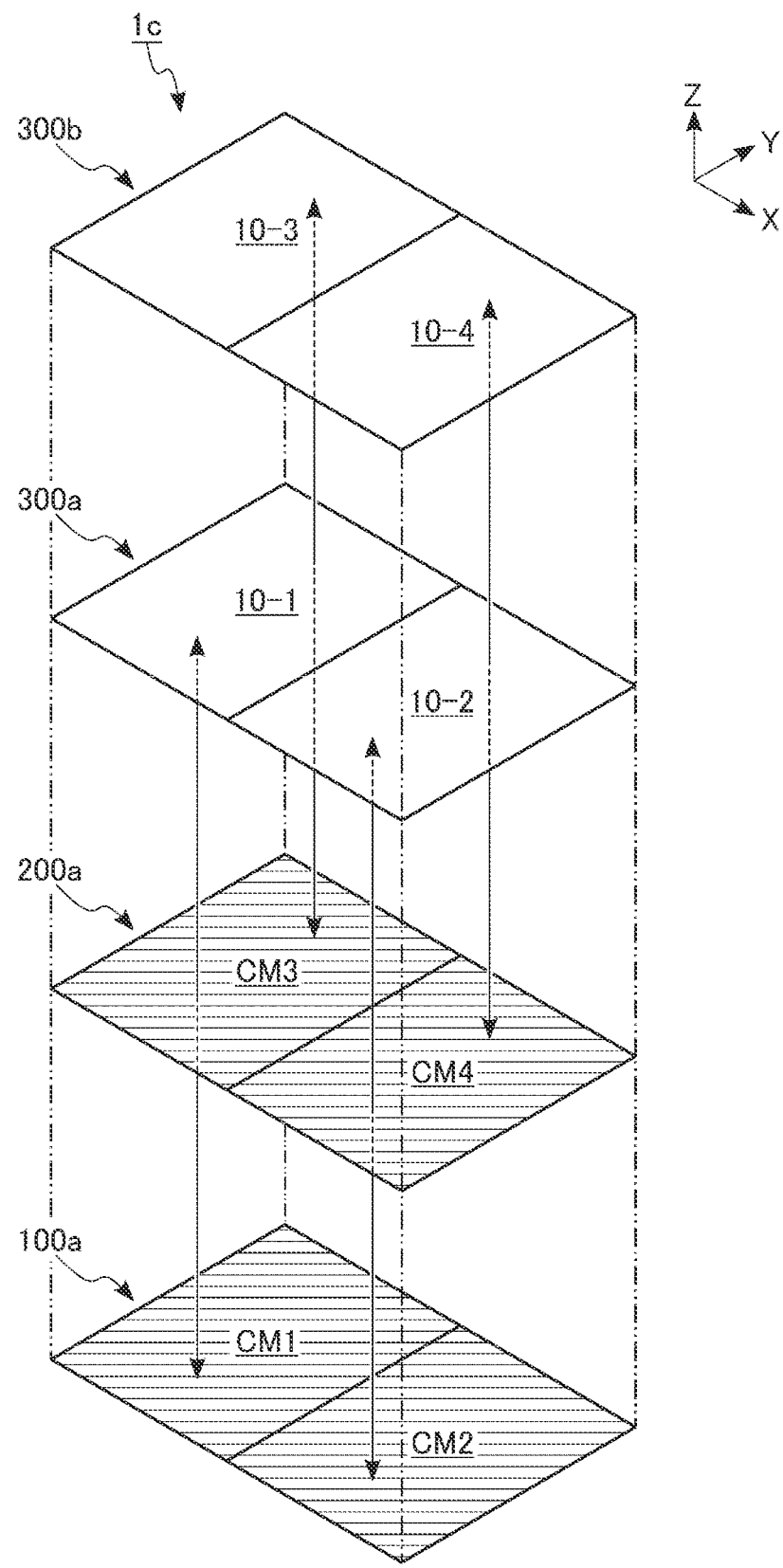
FIG. 48 depicts a second configuration example of the sixth embodiment.

FIG. 48 is a schematic view showing an example of a circuit disposition of a memory device according to the second configuration example of the sixth embodiment. As shown in FIG. 48, the memory device 1c according to the second configuration example of the sixth embodiment includes the four memory cell arrays 10-1 to 10-4 and the four CMOS circuit units CM1 to CM4 as in the first configuration example of the sixth embodiment.

The memory cell arrays 10-1 and 10-2 according to the second configuration example of the sixth embodiment are disposed on the first memory layer 300a and arranged in the X direction. The memory cell arrays 10-3 and 10-4 according to the second configuration example of the sixth embodiment are disposed on the second memory layer 300b and arranged in the X direction. The CMOS circuit units CM1 and CM2 according to the second configuration example of the sixth embodiment are disposed on the first CMOS layer 100a and arranged in the X direction. The CMOS circuit units CM3 and CM4 according to the second configuration example of the sixth embodiment are disposed on the second CMOS layer 200a and arranged in the X direction. In the second configuration example of the sixth embodiment, the memory cell arrays 10-1 and 10-3 overlap the CMOS circuit units CM1 and CM3 in the Z direction. Similarly, the memory cell arrays 10-2 and 10-4 overlap the CMOS circuit units CM2 and CM4 in the Z direction.

In the second configuration example of the sixth embodiment, the CMOS circuit unit CM3 is disposed between the memory cell array 10-1 and the CMOS circuit unit CM1. Similarly, the CMOS circuit unit CM4 is disposed between the memory cell array 10-2 and the CMOS circuit unit CM2. In the second configuration example of the sixth embodiment, the memory cell array 10-1 is disposed between the memory cell array 10-3 and the CMOS circuit unit CM3. Similarly, the memory cell array 10-2 is disposed between the memory cell array 10-4 and the CMOS circuit unit CM4. That is, in the second configuration example of the sixth embodiment, the memory cell array 10 and the CMOS circuit unit CM associated with each other are disposed such that an interval therebetween in the Z direction is constant.

[6-2] Effects of Sixth Embodiment

According to the memory device 1c in the sixth embodiment, as in the first embodiment, it is possible to reduce an increase in chip area and reduce the production cost of the memory device 1c. Details of effects of the sixth embodiment will be described below.

Figure 49:
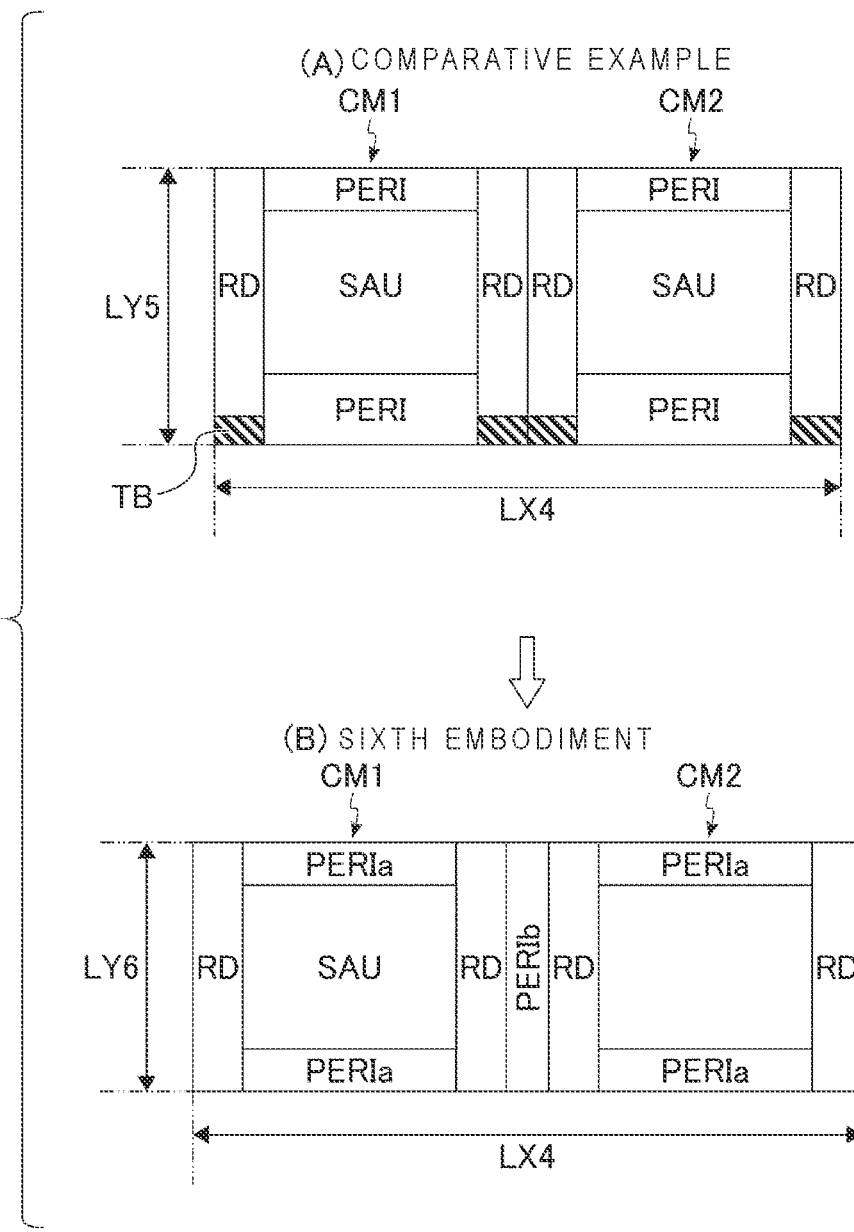
FIG. 49 depicts aspects related to a change in layout of a memory device obtained by applying a sixth embodiment.

FIG. 49 is a schematic diagram showing an example of a layout of the memory device 1 obtained by applying the sixth embodiment. (A) of FIG. 49 shows an example of a layout of CMOS circuit units of the memory device 1 according to a comparative example. (B) of FIG. 49 shows an example of a layout of CMOS circuit units of the memory device 1 when the sixth embodiment is applied.

As shown in (A) of FIG. 49, in the memory device 1 according to the comparative example, two CMOS circuit units CM1 and CM2 disposed on the same substrate can form the surplus region TB. In the comparative example, due to the layout of the CMOS circuit units CM1 and CM2, a width in the X direction is LX4, and a width in the Y direction is LY5.

On the other hand, as shown in (B) of FIG. 49, in the memory device 1c according to the sixth embodiment, a part of the peripheral circuit region PERI is disposed between two adjacent CMOS circuit units CM1 and CM2. Specifically, the CMOS circuit unit CM1 according to the sixth embodiment includes a peripheral circuit region PERIa such that the surplus region TB is not formed. The CMOS circuit unit CM2 according to the sixth embodiment includes the peripheral circuit region PERIa such that the surplus region TB is not formed. In the sixth embodiment, a peripheral circuit region PERIb is provided between the CMOS circuit units CM1 and CM2. CMOS circuits disposed in the peripheral circuit region PERIb include a circuit used by the CMOS circuit unit CM1 and a circuit used by the CMOS circuit unit CM2. In this case, in the sixth embodiment, due to the layout of the CMOS circuit units CM1 and CM2, a width in the X direction is LX5 and is larger than LX4, and a width in the Y direction is LY6 and is smaller than LY5.

As described above, in the sixth embodiment, the width in the X direction is larger than that in the comparative example, and the width in the Y direction is smaller than that in the comparative example. In the sixth embodiment, since the surplus region TB can be omitted, an area necessary for formation of the chip can be reduced as compared with the comparative example.

The surplus region TB in the comparative example may be used as a wiring region for connecting circuits provided on different substrates. In the sixth embodiment, although the case where the memory cell array 10 or the CMOS circuit unit CM corresponding to two planes PL is disposed on one substrate has been exemplified, the disclosure is not limited thereto. In the sixth embodiment, the memory cell array 10 or the CMOS circuit unit CM corresponding to one plane PL or three planes PL or more may be disposed on one substrate. In the sixth embodiment, it is most efficient that the memory cell array 10 or the CMOS circuit unit CM corresponding to four planes PL is disposed on one substrate.

[7] Modification Etc

Hereinafter, a modification of the memory device 1 described in the above embodiments will be described. The above-described embodiments may be combined with each other within a possible range. For example, the second embodiment and any one of the fourth to sixth embodiments may be combined with each other. The third embodiment and any one of the fourth to sixth embodiments may be combined with each other.

Figure 50:
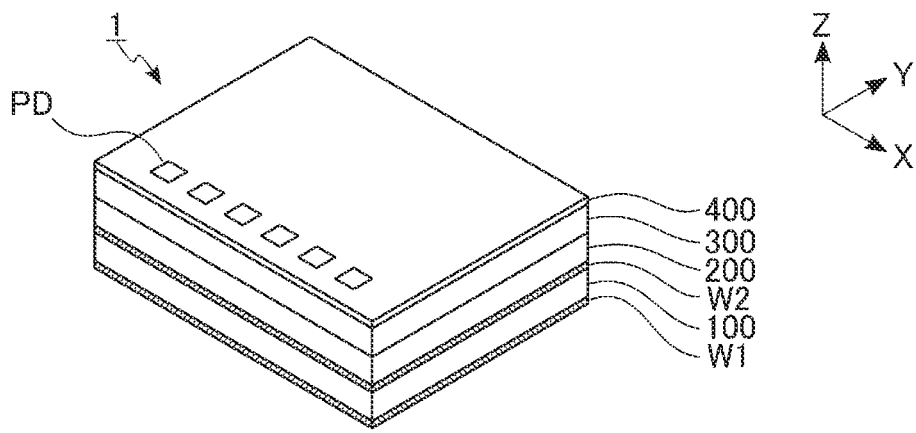
FIG. 50 is a perspective view of a memory device according to a first modification.

FIG. 50 is a perspective view showing an example of an appearance of the memory device 1 according to a first modification. As shown in FIG. 50, the memory device 1 according to the first modification has a structure in which the first substrate W1, the first CMOS layer 100, the second substrate W2, the second CMOS layer 200, the memory layer 300, and the wiring layer 400 are stacked in this order from the bottom. In this way, the memory device 1 described in the first to third embodiments may have a structure in which the third substrate W3 is omitted. That is, in the processes in S16, S26, and S34, the third substrate W3 may be completely removed. The memory device 1 described in the first to third embodiments may include at least two substrates on each of which a CMOS circuit is formed and at least one substrate on which the memory cell array 10 is formed. That is, the CMOS circuit may be disposed over three or more substrates. The memory device 1 may include a plurality of memory layers 300.

Figure 51:
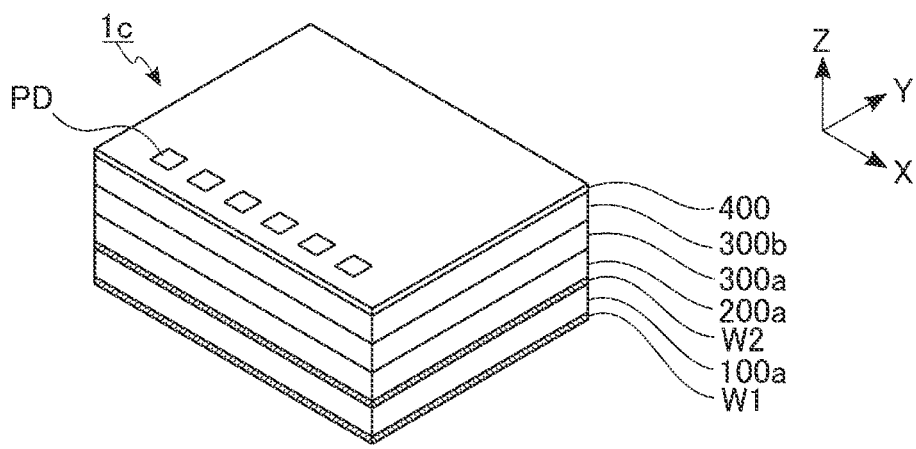
FIG. 51 is a perspective view showing of a memory device according to a second modification.

FIG. 51 is a perspective view showing an example of an appearance of the memory device 1c according to a second modification. As shown in FIG. 51, the memory device 1c according to the second modification has a structure in which the first substrate W1, the first CMOS layer 100a, the second substrate W2, the second CMOS layer 200a, the memory layer 300a, the memory layer 300b, and the wiring layer 400 are stacked in this order from the bottom. In this way, the memory device 1c described in the sixth embodiment may have a structure in which the third substrate W3 and the fourth substrate W4 are omitted. The memory device 1c described in the sixth embodiment may include at least two substrates on each of which a CMOS circuit is formed and at least two substrates on each of which the memory cell array 10 is formed. That is, the memory device 1c may have three or more CMOS layers, or may have three or more memory layers 300.

Figure 52:
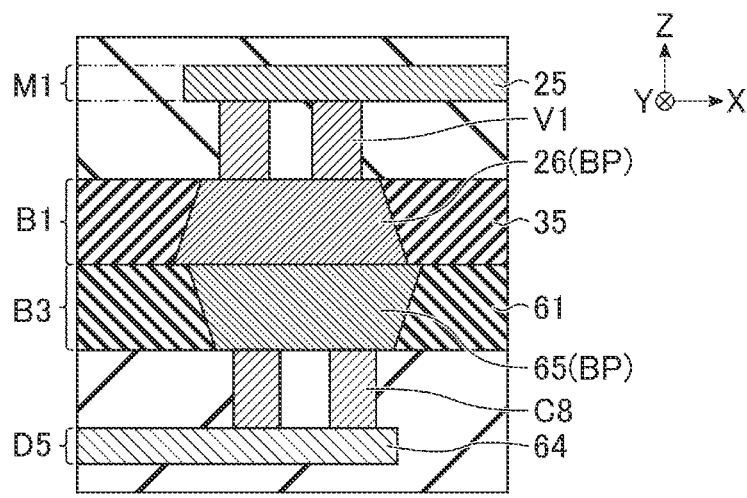
FIG. 52 is a cross-sectional view of a bonding portion of a bonding pad.

FIG. 52 is a cross-sectional view showing an example of a detailed cross-sectional structure of a bonding portion of the bonding pad BP. FIG. 52 shows the conductor layer 65 (bonding pad BP) of the second CMOS layer 200, the conductor layer 26 (bonding pad BP) of the memory layer 300, and a part of contacts and wirings connected to these bonding pads BP. As shown in FIG. 52, two bonding pads BP facing each other have different tapered shapes based on an etching direction during formation. Specifically, the conductor layer 65 (bonding pad BP) formed using the second substrate W2 has a reverse tapered shape in this example. The conductor layer 26 (bonding pad BP) formed using the third substrate W3 also has a tapered shape. Since the bonding pad BP formed in the reverse tapered shape is vertically inverted and is to be bonded by the bonding process, the bonding pad BP can be regarded as having a tapered shape when the second substrate W2 is used as a reference.

A set including two bonding pads BP facing each other can be bonded in a shifted manner depending on the alignment during the bonding process. Therefore, an upper surface of the conductor layer 65 and a lower surface of the conductor layer 26 can form a step. The set including two bonding pads BP facing each other may have a boundary or may be integrated. The bonding pad BP and a contact connected to the bonding pad BP may be integrally formed. A plurality of contacts may be connected to the bonding pad BP. For example, the conductor layer 65 (bonding pad BP) may be connected to the conductor layer 64 via a plurality of contacts C8. Similarly, the conductor layer 26 (bonding pad BP) may be connected to the conductor layer 25 via a plurality of contacts V1. Although not shown, shapes of two bonding pads BP disposed to face each other in other portions can be formed in the same manner as the conductor layers 65 and 26.

In the above embodiments, the circuit configuration, the planar layout, and the cross-sectional structure of the memory device 1 may be changed as appropriate. For example, the semiconductor layer 41 of the memory pillar MP and the source line SL may be connected via a side surface of the memory pillar MP. The memory pillar MP may have a structure in which two or more pillars are connected in the Z direction. The memory pillar MP may have a structure in which a pillar corresponding to the select gate line SGD and a pillar corresponding to the word line WL are connected to each other. Each contact may be connected by a plurality of contacts connected in the Z direction. A conductor layer may be inserted into a connecting portion of the plurality of contacts. The number of wiring layers and contacts in the memory device 1 may be changed as appropriate.

In the drawings used in the above embodiments, although the case where the memory pillars MP have the same diameter in the Z direction has been exemplified, the disclosure is not limited thereto. The memory pillar MP may have a tapered shape, a reverse tapered shape, or a bowing shape. Similarly, each of the slits SLT and SHE may have a tapered shape, a reverse tapered shape, or a bowing shape. Similarly, each contact may have a tapered shape, a reverse tapered shape, or a bowing shape. A cross-sectional structure of each of the memory pillars MP and the contacts CC and C3 may be circular or elliptical.

In the first embodiment, although the case where the memory layer 300 is provided above the first CMOS layer 100 and the second CMOS layer 200 has been exemplified, the first CMOS layer 100 and the second CMOS layer 200 may be provided above the memory layer 300. In this case, the wiring layer 400 (pad PD) can be provided on the second CMOS layer 200. The memory device 1 according to the first embodiment may include the plurality of memory layers 300. The memory device 1c according to the sixth embodiment may include three or more CMOS layers and three or more memory layers. In the sixth embodiment, one or three or more memory cell arrays 10 may be disposed in one memory layer 300. In the sixth embodiment, the number of sets including the row decoder module 16 and the sense amplifier module 17 in the CMOS layer may be changed according to the number of the memory cell arrays 10 in the associated memory layer.

In the present specification, the term "connection" indicates an electrical connection, and electrical connection via another intervening/interposed element is not excluded. An "electrical connection" may be made via an insulator (e.g., a thin native oxide or the like) as long as electrical conduction can operate in substantially the same manner as when no insulator is in the electrical connection path. The phrase "tapered shape" indicates that a shape becomes thinner (narrower) as a distance from the reference substrate or point increases. The phrase "reverse tapered shape" indicates that the shape becomes thicker as a distance from the reference substrate or point increases. The term "diameter" of a columnar shape or hole the like refers to an inner diameter of the hole or the like in a cross section parallel to a surface of a reference substrate. The term "width" refers to a dimension of an element in the X direction or the Y direction. A "semiconductor layer" may also be referred to as a "conductor layer" in some instances.

In the present specification, a "region" may be regarded as a configuration component in the reference substrate. For example, when the first substrate W1 is defined to include the memory region MR and the lead region HR, the memory region MR and the lead region HR are associated with different regions above the first substrate W1. The term "height" corresponds to, for example, an interval between component and the first substrate W1 in the Z direction. The "plane position" indicates a position of an element/component/region in the planar layout. The phrase "top (plan) view" corresponds to a view obtained by viewing the first substrate W1 from a second substrate W2 side.

[8] Seventh Embodiment

In a seventh embodiment, the memory devices 1, 1a, 1b and 1c described in the above embodiments are formed using two types of silicon wafers.

[8-1] Configuration

In the seventh embodiment, "a first silicon wafer WAF1" and "a second silicon wafer WAF2" can be used as the two types of silicon wafers. Each of the first silicon wafer WAF1 and the second silicon wafer WAF2 is a single crystal silicon wafer. In the present specification, a "notch" is a portion provided corresponding to a crystal orientation of a silicon wafer, and is used as a reference for an orientation of a semiconductor production device to hold a substrate. For example, in a photolithography process, an exposure device determines an exposure position with reference to the notch. Other structures such as an orientation flat may be used as a reference for the orientation of the semiconductor production device to hold the silicon wafer. The "silicon wafer" may also be referred to as a "silicon substrate" or a "substrate". In the present specification, an extending direction of each channel of a PMOS transistor and a NMOS transistor is provided parallel to the X direction or the Y direction.

Figure 53:
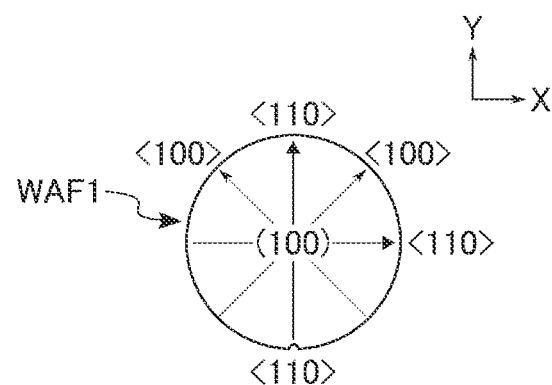
FIG. 53 is a plan view showing a configuration of a first silicon wafer used in a memory device according to a seventh embodiment.

FIG. 53 is a plan view showing an example of a configuration of the first silicon wafer WAF1 used in forming the memory devices 1, 1a, 1b and 1c. As shown in FIG. 53, a Miller index of a surface from which the first silicon wafer WAF1 is cut out is (100). In other words, a surface orientation of the first silicon wafer WAF1 is (100). In the first silicon wafer WAF1, a Miller index of the crystal orientation associated with each of the X direction and the Y direction is <110>. In other words, in the first silicon wafer WAF1, a Miller index of a crystal orientation corresponding to an extending direction of a channel of a transistor is <110>. The first silicon wafer WAF1 has a notch disposed in association with <110>. The first silicon wafer WAF1 may be referred to as a "0-degree notch wafer".

Figure 54:
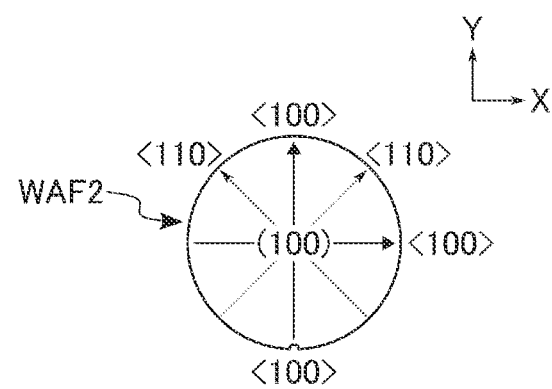
FIG. 54 is a plan view showing a configuration of a second silicon wafer used in a memory device according to a seventh embodiment.

FIG. 54 is a plan view showing an example of a configuration of the second silicon wafer WAF2 used in forming the memory devices 1, 1a, 1b and 1c. As shown in FIG. 54, a Miller index of a surface from which the second silicon wafer WAF2 is cut out is (100), similar to the first silicon wafer WAF1. In the second silicon wafer WAF2, a Miller index of the crystal orientation associated with each of the X direction and the Y direction is <100>. In other words, in the second silicon wafer WAF2, a Miller index of a crystal orientation corresponding to an extending direction of a channel of a transistor is <100>. The second silicon wafer WAF2 has a notch disposed in association with <100>. Since the second silicon wafer WAF2 has a configuration in which a notch is disposed in a portion rotated by 45 degrees with respect to the first silicon wafer WAF1, the second silicon wafer WAF2 may be referred to as a "45-degree notch wafer".

A Young's modulus of the first silicon wafer WAF1 is, for example, 170 GPa. A Young's modulus of the second silicon wafer WAF2 is, for example, 130 GPa. Thus, the Young's modulus of the second silicon wafer WAF2 is smaller than the Young's modulus of the first silicon wafer WAF1. That is, when the same structure is formed on each of the first silicon wafer WAF1 and the second silicon wafer WAF2, a warpage amount of the second silicon wafer WAF2 may be larger than that of the first silicon wafer WAF1.

In the memory device 1 according to the above embodiments, a silicon wafer having the same crystal orientation is used for each substrate (for example, the first substrate W1, the second substrate W2, the third substrate W3, and the fourth substrate W4). In the memory device 1 according to the above embodiments, the second silicon wafer WAF2 is used for at least one of the substrates used for forming the CMOS circuit. Specifically, the first silicon wafer WAF1 is used as the first substrate W1, and the second silicon wafer WAF2 is used as the second substrate W2 in this example. As the third substrate W3, either the first silicon wafer WAF1 or the second silicon wafer WAF2 may be used. As the fourth substrate W4, either the first silicon wafer WAF1 or the second silicon wafer WAF2 may be used.

[8-2] Production Method

Figure 55:
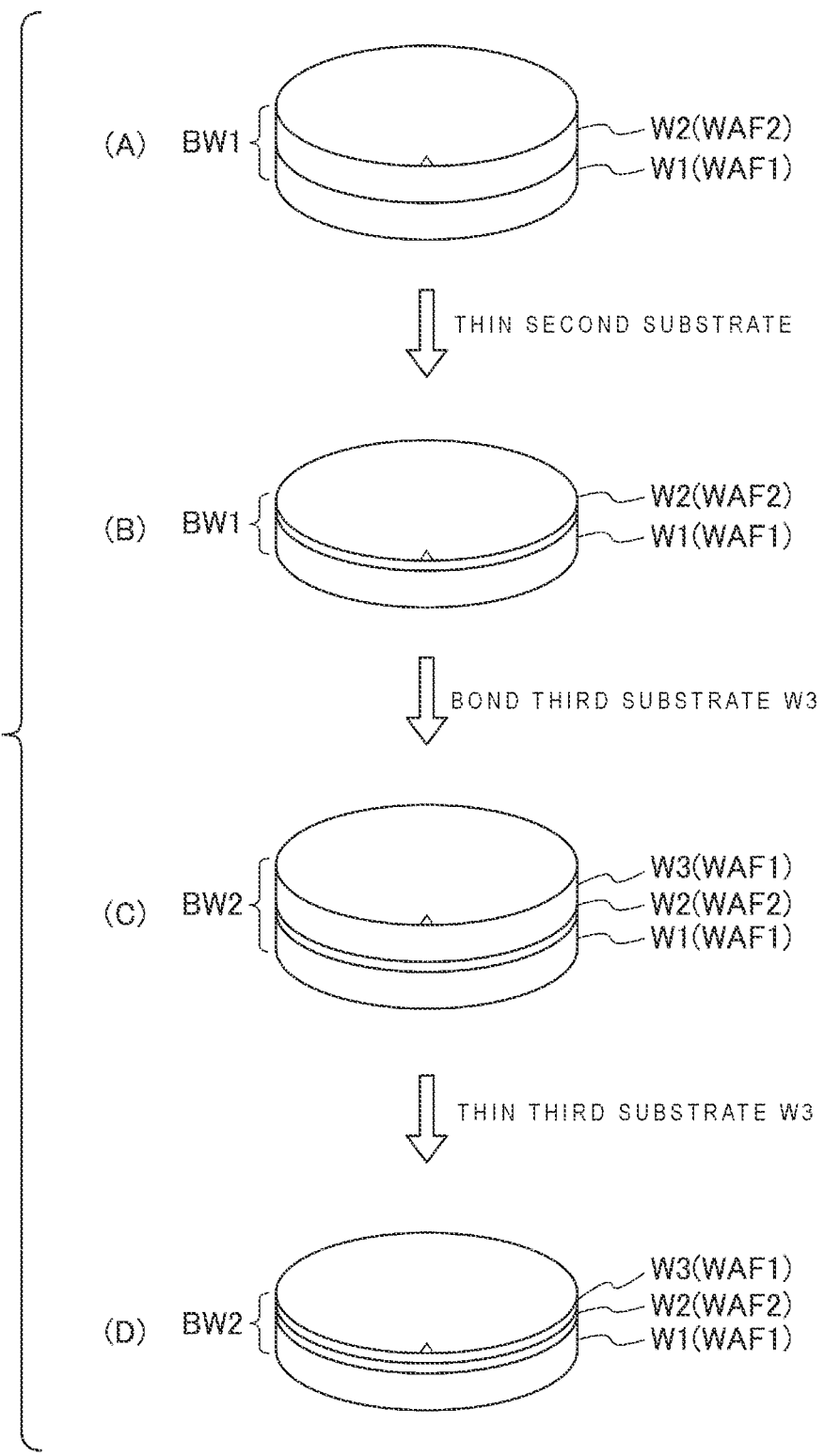
FIG. 55 is a schematic diagram showing an example of a method for producing the memory device according to the seventh embodiment.

FIG. 55 is a schematic diagram showing an example of a method for producing the memory device 1 according to the seventh embodiment. (A) to (D) of FIG. 55 correspond to a step of bonding and thinning a semiconductor substrate in the process for producing the memory device 1, and the illustration of the CMOS layer and the memory layer is omitted.

As shown in (A) of FIG. 55, the first substrate W1 and the second substrate W2 are bonded to each other such that a position of the notch of the first substrate W1 and a position of the notch of the second substrate W2 are aligned with each other, and the first bonded substrate BW1 is formed. This step corresponds to the process in S12 in FIG. 14. In this example, the first silicon wafer WAF1 is used as the first substrate W1, and the second silicon wafer WAF2 is used as the second substrate W2.

Next, as shown in (B) of FIG. 55, the second substrate W2 is thinned. This step corresponds to the process in S13 in FIG. 14. Accordingly, the second substrate W2 is thinner than the first substrate W1.

Next, as shown in (C) of FIG. 55, the first bonded substrate BW1 and the third substrate W3 are bonded to each other such that a position of a notch of the first bonded substrate BW1 and a position of a notch of the third substrate W3 are aligned with each other, and the second bonded substrate BW2 is formed. This step corresponds to the process in S15 in FIG. 14. In this example, the first silicon wafer WAF1 is used as the third substrate W3.

Next, as shown in (D) of FIG. 55, the third substrate W3 is thinned. This step corresponds to the process in S16 in FIG. 14. Accordingly, the third substrate W3 is thinner than the first substrate W1.

Thereafter, the first substrate W1 can be thinned in a subsequent step. The first substrate W1 located in a lowermost layer of the memory device 1 is left thicker than other substrates in order to ensure strength of the memory device 1.

In the above description, although the case where the memory device 1 according to the first embodiment includes a plurality of types of silicon wafers has been exemplified, the disclosure is not limited thereto. The first substrate W1 and the second substrate W2 according to the second to sixth embodiments can also include a plurality of types of silicon wafers, as in the first embodiment.

[8-3] Effects of Seventh Embodiment

In order to improve performance of the memory device, it is desired to improve characteristics of the CMOS circuit. For example, a drive current of the PMOS transistor formed on the 45-degree notch wafer is increased more than that of the PMOS transistor formed on the 0-degree notch wafer due to an influence of distortion from two directions including a direction parallel to the channel and a direction perpendicular to the channel. That is, performance of the PMOS transistor can be improved in the case where the PMOS transistor is formed on the 45-degree notch wafer as compared with in the case where the PMOS transistor is formed on the 0-degree notch wafer. Therefore, it is preferable to use the 45-degree notch wafer as a substrate on which the CMOS circuit including the PMOS transistor is to be provided.

However, since the 45-degree notch wafer has a Young's modulus smaller than that of the 0-degree notch wafer, it may be difficult to control the warpage amount of the wafer and to process a non-defective wafer in a semiconductor production process. For example, when the 45-degree notch wafer is employed, an XY difference in the warpage amount of the wafer increases. Accordingly, a process performed by the semiconductor production device may be impossible, that is, a non-defective wafer may not be produced.

Therefore, in the seventh embodiment, in the memory device 1 having a plurality of substrates on which the CMOS circuits are formed, the 45-degree notch wafer is used for at least one of the plurality of substrates on which the CMOS circuits are formed. For example, in the seventh embodiment, the notch wafer is used as the first substrate W1, and the notch wafer is used as the second substrate W2. In this case, the 45-degree notch wafer is thinned by, for example, the process in S13 in FIG. 14, and is thinner than the 0-degree notch wafer. That is, in the entire memory device 1, a ratio of the 0-degree notch wafer having a Young's modulus higher than that of the 45-degree notch wafer is higher.

Accordingly, warpage caused by the 45-degree notch wafer is reduced by the 0-degree notch wafer, and the warpage amount of the entire memory device 1 can be reduced. As a result, in the memory devices 1, 1a, 1b, and 1c to which the seventh embodiment is applied, it is possible to improve warpage characteristics of the wafer, and a non-defective wafer can be produced. In the memory devices 1, 1a, 1b, and 1c to which the seventh embodiment is applied, the performance of the PMOS transistor can be improved by disposing the PMOS transistor on the 45-degree notch wafer. Therefore, in the seventh embodiment, it is possible to achieve both the improvement of the warpage characteristics of the wafer and the improvement of the characteristics of the CMOS circuit.

The NMOS transistor may be disposed on the 45-degree notch wafer. On the 45-degree notch wafer, a PMOS transistor (low breakdown voltage PMOS transistor) that is desirably operated at least at a high speed may be disposed. In the CMOS circuit included in the memory device 1, a ratio of an area occupied by the NMOS transistor and an area occupied by the PMOS transistor may be different from each other. For example, the area occupied by the NMOS transistor is larger than the area occupied by the PMOS transistor. In this case, a circuit using the PMOS transistor and a part of a circuit using the NMOS transistor may be disposed on the 45-degree notch wafer, and a remaining circuit using the NMOS transistor may be disposed on the 0-degree notch wafer. Accordingly, the area of the CMOS circuit on the first substrate W1 and the area of the CMOS circuit on the second substrate W2 can be designed to be substantially the same, and a chip size of the memory device 1 can be reduced.

When the seventh embodiment and the seventh configuration example of the fourth embodiment are combined with each other, an LV transistor is disposed on the 45-degree notch wafer, and an HV transistor is disposed on the 0-degree notch wafer. Accordingly, in the combination of the seventh embodiment and the seventh configuration example of the fourth embodiment, performance required for each of the LV transistor and the HV transistor can be more easily optimized. By dividing the substrate on which the LV transistor is formed and the substrate on which the HV transistor is formed, a parasitic capacitance caused by the contact CS in the LV transistor can be reduced. As a result, in the combination of the seventh embodiment and the seventh configuration example of the fourth embodiment, operation performance of the memory device 1 can be improved.

In the seventh embodiment, although the case where the first silicon wafer WAF1 is used as the first substrate W1 and the second silicon wafer WAF2 is used as the second substrate W2 has been exemplified, the disclosure is not limited thereto. As long as the warpage amount does not cause a problem in the process for producing the memory device 1, the second silicon wafer WAF2 may be used for both the first substrate W1 and the second substrate W2. The second silicon wafer WAF2 may be used as the first substrate W1, and the first silicon wafer WAF1 may be used as the second substrate W2. Since each of the memory devices 1, 1a, 1b, and 1c has a configuration in which the CMOS circuit including the PMOS transistor is disposed on the second silicon wafer WAF2, the performance of the PMOS transistor can be improved, and the performance of the memory device can be improved.

In the present specification, a warpage amount of a substrate (wafer) may be expressed as a difference between a height of an outer peripheral portion of the wafer and a height of a central portion of the wafer. For example, micrometer (μm) is used as a unit of the warpage amount of the wafer. The warpage amount of the wafer may also or instead be expressed by a signed (+/−) distance from a three-point reference plane based on a measurement result of a height of a center of the wafer. For example, the warpage amount of the wafer is set to be positive when the measured wafer height is above the three-point reference plane, and to be negative when the measured wafer height is below the three-point reference plane. The warpage amount of the wafer can also or instead be measured by calculating a wafer shape (warpage) by measuring a height of each coordinate (or at a plurality of coordinates) on the wafer using, for example, a laser displacement meter, a confocal point displacement gauge, a capacitive displacement gauge, a heterodyne interferometer, or a Fizeau interferometer.

In the present specification, a "high breakdown voltage PMOS transistor" or a "P-type HV transistor" can refer to a transistor in which a gate oxide film has a thickness of 20 nm or more, a P-type carrier is implanted into a source/drain region beside a gate, a N-type carrier is implanted into a channel region below the gate, and a voltage is applied to the gate to invert the channel region, thereby obtaining a current. A "low breakdown voltage PMOS transistor" or a "P-type LV transistor" can refer to a transistor in which a threshold voltage is lower than that of the high breakdown voltage PMOS transistor. For example, such a low breakdown voltage PMOS transistor has a gate oxide film with a thickness of 10 nm or less, a P-type carrier implanted into a source/drain region beside a gate, a N-type carrier implanted into a channel region below the gate, and a voltage applied to the gate to invert the channel region, thereby obtaining a current. A "high breakdown voltage NMOS transistor" or a "N-type HV transistor" can refer to a transistor in which a gate oxide film has a thickness of 20 nm or more, a N-type carrier is implanted into a source/drain region beside a gate, a P-type carrier is implanted into a channel region below the gate, and a voltage is applied to the gate to invert the channel region, thereby obtaining a current. A "low breakdown voltage NMOS transistor" or a "N-type LV transistor" can refer to a transistor in which a threshold voltage is lower than that of the high breakdown voltage NMOS transistor. For example, such low breakdown voltage NMOS transistor has a gate oxide film with a thickness of 10 nm or less, a N-type carrier implanted into a source/drain region beside a gate, a P-type carrier implanted into a channel region below the gate, and a voltage applied to the gate to invert the channel region, for obtaining a current.

Some or all of the above-described embodiments may be described as in the following appendixes, but this disclosure is not limited thereto.

Appendix 1

A memory device including:
a first silicon substrate on which a first CMOS circuit is formed;
a second silicon substrate which is provided above the first silicon substrate and on which a second CMOS circuit is formed; and
a first memory cell array provided above the second silicon substrate, connected to the first CMOS circuit and the second CMOS circuit, and including a plurality of memory cells arranged in a stacking direction of the first silicon substrate and the second silicon substrate, in which
a group including the first silicon substrate and the second silicon substrate includes a third silicon substrate having a surface orientation of (100) and provided with a PMOS transistor, and
an extending direction of a channel of the PMOS transistor is provided parallel to a crystal orientation <100> of the third silicon substrate.

Appendix 2

The memory device according to appendix 1, in which
the group including the first silicon substrate and the second silicon substrate includes a fourth silicon substrate having a surface orientation of (100) and provided with a NMOS transistor, and
an extending direction of a channel of the NMOS transistor is provided parallel to a crystal orientation <110> of the fourth silicon substrate.

Appendix 3

The memory device according to appendix 2, in which
the fourth silicon substrate corresponds to the first silicon substrate, and
the third silicon substrate corresponds to the second silicon substrate.

Appendix 4

The memory device according to appendix 2, in which
the PMOS transistor is a low breakdown voltage PMOS transistor.

Appendix 5

The memory device according to appendix 4, in which
the NMOS transistor is a high breakdown voltage NMOS transistor.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory device, comprising:
   a first silicon substrate on which a first CMOS circuit is formed;
   a second silicon substrate on which a second CMOS circuit is formed, the second silicon substrate being above the first silicon substrate in a stacking direction; and
   a first memory cell array above the second silicon substrate in the stacking direction, connected to the first CMOS circuit and the second CMOS circuit, and including a plurality of memory cells arranged in the stacking direction, wherein
   the second silicon substrate is between the first silicon substrate and the first memory cell array,
   the first memory cell array is not between the first and second silicon substrates in the stacking direction,
   the first silicon substrate has a first surface and a second surface opposite the first surface,
   the first CMOS circuit is formed on the first surface,
   the second silicon substrate has a third surface and a fourth surface opposite the fourth surface,
   the second CMOS circuit is formed on the third surface, and
   the first surface and the fourth surface face each other.

2. The memory device according to claim 1, further comprising:
   a through-silicon via for connecting the first CMOS circuit and the second CMOS circuit or the first CMOS circuit and the first memory cell array.

3. The memory device according to claim 2, further comprising:
   a first bonding layer between the first silicon substrate and the second silicon substrate;
   a first bonding pad in the first bonding layer; and
   a wiring of the first CMOS circuit connecting the first bonding layer and the second silicon substrate via the first bonding pad.

4. The memory device according to claim 2, further comprising:
   a first bonding layer between the first silicon substrate and the second silicon substrate;
   a wiring of the first CMOS circuit between the first bonding layer and the first silicon substrate; and
   a first bonding pad contained in the first bonding layer, wherein
   the wiring is connected to the second CMOS circuit or the first memory cell array via the first bonding pad and the through-silicon via.

5. The memory device according to claim 2, further comprising:
   a second bonding layer between the second silicon substrate and the first memory cell array; and
   a second bonding pad in the second bonding layer, wherein
   the first memory cell array is connected to the first CMOS circuit or the second CMOS circuit via the second bonding pad.

6. The memory device according to claim 5, wherein the second bonding pad includes a first portion having a reverse tapered shape and a second portion on the first portion and having a tapered shape.

7. The memory device according to claim 1, further comprising:
   a plurality of row decoders grouped into a first group of row decoders and a second group of row decoders, wherein
   the first memory cell array includes a plurality of blocks correspondingly connected to the plurality of row decoders,
   the first group of row decoders is in the first CMOS circuit, and
   the second group of row decoders is in the second CMOS circuit.

8. The memory device according to claim 1, further comprising:
   a plurality of row decoders, wherein
   the first memory cell array includes a plurality of blocks correspondingly connected to the plurality of row decoders,
   a plurality of elements in the plurality of row decoders, the plurality of elements being grouped into a first element group and a second element group,
   the first element group is in the first CMOS circuit, and
   the second element group is in the second CMOS circuit.

9. The memory device according to claim 1, further comprising:
   a plurality of sense amplifiers grouped into a first group of sense amplifiers and a second group of sense amplifiers, wherein
   the first memory cell array includes a plurality of bit lines correspondingly connected to the plurality of sense amplifiers,
   the first group of sense amplifiers is in the first CMOS circuit, and
   the second group of sense amplifiers is in the second CMOS circuit.

10. The memory device according to claim 1, further comprising:
    a plurality of sense amplifiers, wherein
    the first memory cell array includes a plurality of bit lines correspondingly connected to the plurality of sense amplifiers,
    a plurality of elements in the plurality of sense amplifiers being grouped into a third element group and a fourth element group,
    the third element group is in the first CMOS circuit, and
    the fourth element group is in the second CMOS circuit.

11. The memory device according to claim 1, further comprising:
    a plurality of row decoders; and
    a plurality of sense amplifiers, wherein
    the first memory cell array includes a plurality of word lines correspondingly connected to the plurality of row decoders and a plurality of bit lines correspondingly connected to the plurality of sense amplifiers,
    the plurality of row decoders are in one of the first CMOS circuit or the second CMOS circuit, and
    the plurality of sense amplifiers are in the other of the first CMOS circuit or the second CMOS circuit.

12. The memory device according to claim 1, wherein
    one of the first CMOS circuit or the second CMOS circuit includes a low breakdown voltage transistor, and
    the other of the first CMOS circuit or the second CMOS circuit includes a high breakdown voltage transistor that has a breakdown voltage higher than a breakdown voltage of the low breakdown voltage transistor.

13. The memory device according to claim 12, further comprising:
    a plurality of row decoders; and
    a plurality of sense amplifiers, wherein
    the first memory cell array includes a plurality of word lines correspondingly connected to the plurality of row decoders and a plurality of bit lines correspondingly connected to the plurality of sense amplifiers, the plurality of row decoders are in one of the first CMOS circuit or the second CMOS circuit, the plurality of sense amplifiers are in the other of the first CMOS circuit or the second CMOS circuit, and one of the first CMOS circuit or the second CMOS circuit includes a plurality of first high breakdown voltage transistors configured to connect the plurality of sense amplifiers and the plurality of bit lines.

14. The memory device according to claim 12, wherein the low breakdown voltage transistor and the high breakdown voltage transistor have different stacked structures of gate electrodes.

15. A memory device, comprising:

a first silicon substrate on which a first CMOS circuit is formed;

a second silicon substrate on which a second CMOS circuit is formed, the second silicon substrate being above the first silicon substrate in a stacking direction; and a first memory cell array above the second silicon substrate in the stacking direction, connected to the first CMOS circuit and the second CMOS circuit, and including a plurality of memory cells arranged in the stacking direction, wherein one of the first CMOS circuit or the second CMOS circuit includes a low breakdown voltage transistor, the other of the first CMOS circuit or the second CMOS circuit includes a high breakdown voltage transistor that has a breakdown voltage higher than a breakdown voltage of the low breakdown voltage transistor, the low breakdown voltage transistor and the high breakdown voltage transistor have different stacked structures of gate electrodes, the gate electrode of the low breakdown voltage transistor contains nickel platinum silicide, and the gate electrode of the high breakdown voltage transistor contains tungsten silicide or tungsten nitride.

16. The memory device according to claim 1, wherein the first silicon substrate includes a first active region formed with a first pitch, the second silicon substrate includes a second active region formed with a second pitch different from the first pitch, and a resistance element in the memory device includes at least one first active region and at least one second active region connected in series.

17. The memory device according to claim 1, wherein the first CMOS circuit includes a plurality of first gate electrodes each having a first gate width, the second CMOS circuit includes a plurality of second gate electrodes each having a second gate width different from the first gate width, and a resistance element in the memory device includes at least one first gate electrode and at least one second gate electrode connected in series.

18. The memory device according to claim 1, further comprising:

a first conductor and a second conductor in a layer in which the first CMOS circuit is formed, the first conductor and the second conductor being in parallel; and a third conductor and a fourth conductor in a layer in which the second CMOS circuit is formed, the third conductor and the fourth conductor being in parallel, wherein the first conductor and the third conductor are connected to each other via a first through-silicon via, the second conductor and the fourth conductor are connected to each other via a second through-silicon via, the first conductor and the third conductor function as one electrode of a capacitive element, and the second conductor and the fourth conductor function as another electrode of the capacitive element.

19. The memory device according to claim 1, further comprising:

a second memory cell array above the first memory cell array in the stacking direction, wherein the second CMOS circuit is configured to control the first memory cell array, and the first CMOS circuit is configured to control the second memory cell array.

20. The memory device according to claim 1, further comprising:

a second memory cell array above the first memory cell array in the stacking direction, wherein the first CMOS circuit is configured to control the first memory cell array, and the second CMOS circuit is configured to control the second memory cell array.

* * * * *